(12) United States Patent
Gold et al.

(10) Patent No.: US 11,203,413 B2
(45) Date of Patent: Dec. 21, 2021

(54) ADVANCED PROPELLER ASSEMBLIES

(71) Applicants: Henry Joyner Gold, Amherst, MA (US); Steven Kenneth Gold, Amherst, MA (US)

(72) Inventors: Henry Joyner Gold, Amherst, MA (US); Steven Kenneth Gold, Amherst, MA (US)

(73) Assignee: N99 LLC, Amherst, MA (US)

( * ) Notice: Subject to any disclaimer, the term of this patent is extended or adjusted under 35 U.S.C. 154(b) by 89 days.

(21) Appl. No.: 16/676,104

(22) Filed: Nov. 6, 2019

(65) Prior Publication Data
US 2020/0070957 A1 Mar. 5, 2020

Related U.S. Application Data

(60) Provisional application No. 62/771,161, filed on Nov. 25, 2018, provisional application No. 62/757,145, filed on Nov. 7, 2018.

(51) Int. Cl.
*B64C 11/00* (2006.01)
*B64C 11/18* (2006.01)

(52) U.S. Cl.
CPC ............ *B64C 11/18* (2013.01); *B64C 11/001* (2013.01)

(58) Field of Classification Search
CPC ..... B64C 11/001; B64C 11/005; B64C 27/20; B64C 29/326; B63H 1/16
See application file for complete search history.

(56) References Cited

U.S. PATENT DOCUMENTS

| | | | |
|---|---|---|---|
| 855,131 A | 5/1907 | Preidel | |
| 987,624 A | 3/1911 | Hansen | |
| 1,518,501 A | 12/1924 | Gill | |
| 1,739,866 A | 12/1929 | Schuh | |
| 2,091,677 A | 8/1937 | Fredericks | |
| 2,411,271 A | 11/1946 | Jackson | |
| 2,724,544 A | 11/1955 | Hardigg | |
| 3,549,272 A | 12/1970 | Bauger et al. | |
| 4,767,270 A | 8/1988 | Seidel | |
| 5,096,382 A | 3/1992 | Gratzer | |
| 6,736,600 B1 * | 5/2004 | Bannasch | B64C 27/00 416/129 |
| 10,836,466 B2 | 11/2020 | Sebastian et al. | |

FOREIGN PATENT DOCUMENTS

| | | | | |
|---|---|---|---|---|
| DE | 102007057077 A1 * | 5/2009 | ............ | F03D 1/0666 |
| GB | 2507773 A * | 5/2014 | ............ | F04D 19/002 |

OTHER PUBLICATIONS

Machine Translation. DE-102007057077-A1. Acessed EPO website, Mar. 31, 2021. 17 Pages. (Year: 2021).*

* cited by examiner

*Primary Examiner* — Richard A Edgar
(74) *Attorney, Agent, or Firm* — McKee, Voorhees & Sease, PLC

(57) ABSTRACT

Embodiments of the invention relate to advanced propeller assemblies that include a pressure modifying element that modifies its aerodynamic characteristics. Embodiments of the invention may provide benefits including but not limited to: increased thrust per rotation, greater efficiency, modified aerodynamics, and the ability to use such propellers for novel applications. Practical applications for embodiments of propellers of the invention include use with aircraft, drones, watercraft, autogyros, fans, blowers, pumps, generators, compressors, mixers, and blenders.

20 Claims, 53 Drawing Sheets

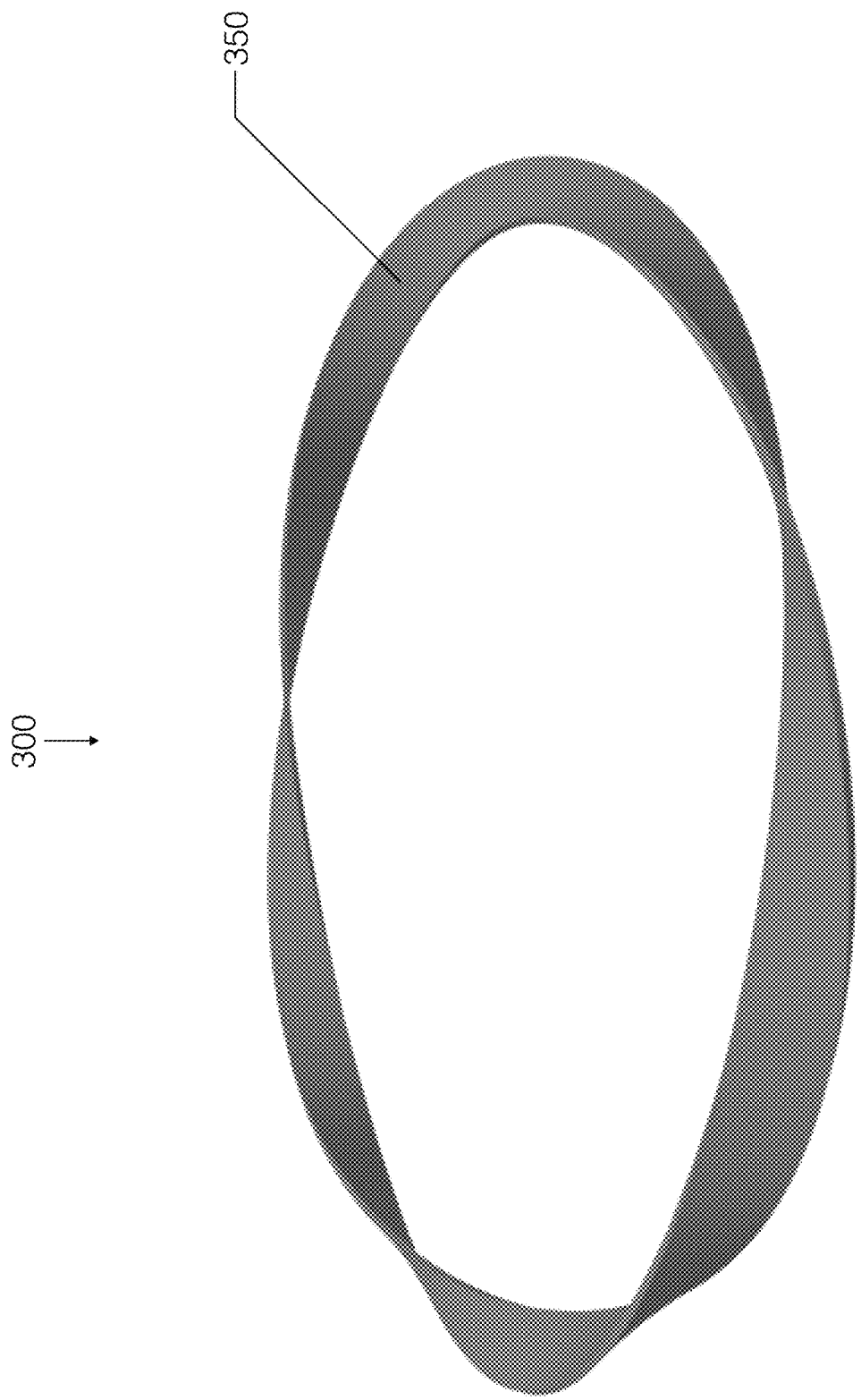

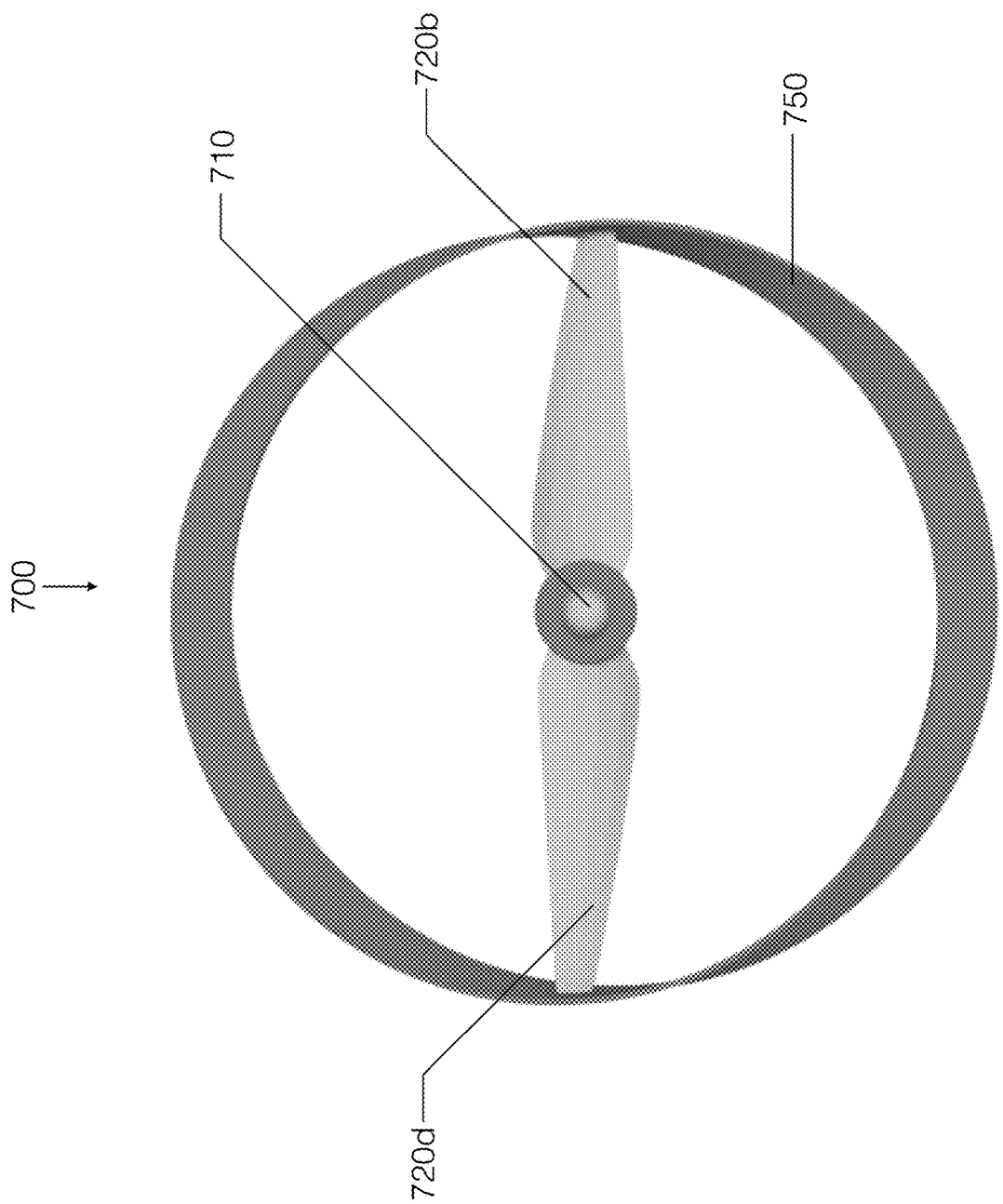

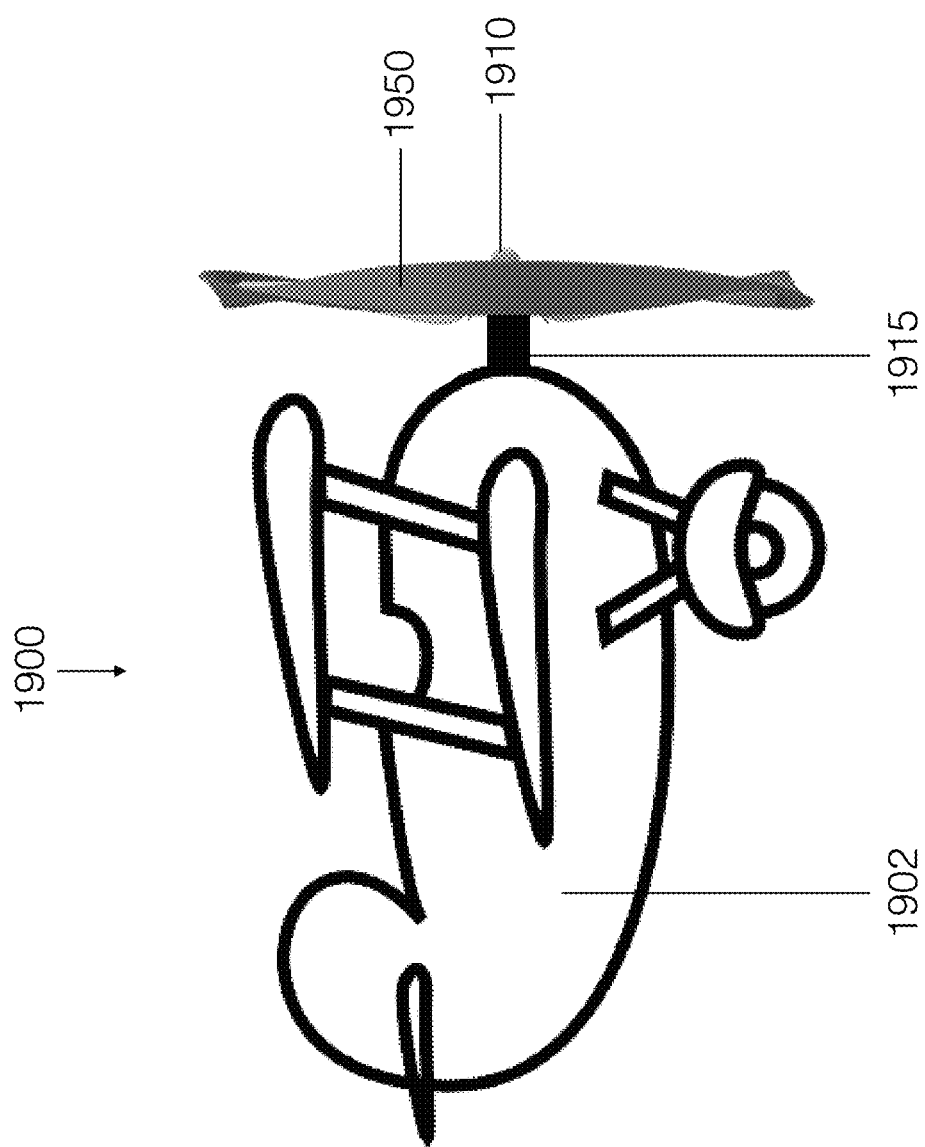

ADVANCED PROPELLER ASSEMBLIES

CROSS-REFERENCE TO RELATED APPLICATIONS

This patent application claims priority from and hereby incorporates by reference the following patent applications:

U.S. Prov. Pat. App. No. 62/757,145, entitled, "Propellers Comprising Pressure-Modifying Elements," filed on Nov. 7, 2018; and U.S. Prov. Pat. App. No. 62/771,161, entitled, "Advanced Propeller Assemblies," filed on Nov. 25, 2018.

BACKGROUND

A propeller is a structure that converts the rotational motion of the structure into primarily perpendicular (to the plane of rotation) movement of a fluid. Such fluid movement may be characterized, for example, as thrust (e.g., an airplane propeller), or lift (e.g., a helicopter or drone propeller). A propeller may also be useful to convert movement of a fluid through (or in proximity to) the propeller structure into rotational motion (e.g., a wind-driven propeller), for example. In general, a propeller is comprised of a central hub that is typically connected to a shaft (and the shaft may subsequently be connected to a motor, transmission, generator, or other mechanism). A blade is a structure that emanates outward from a hub and acts upon (or is acted upon by) a fluid during rotation. In general, propellers have two or more blades, and the two or more blades are typically evenly spaced about the hub.

Propeller blades exist as a variety of designs, shapes, sizes, materials, placements on a hub (including blade attachment means), spacing of blades, controllability (e.g., angle of attack adjustability), and cross-sectional profiles (which may change along the length of a blade). Blades may include aerodynamic cross-sections designed to enhance thrust as the propeller rotates. A blade may include a blade twist (e.g., a change in the angle of attack along the longitudinal axis of the blade). Propeller blades may also be curved. A curved propeller blade may include a clockwise curve of its longitudinal centerline typically generally within a plane of rotation of the blades of the particular propeller, for example. Some propellers have stacked or layered blades (e.g., two sets of blades, with each set of blades rotating within a different yet parallel plane of rotation, including stacked counter-rotating propellers that rotate in opposite directions, each propeller in such an arrangement being associated with a different shaft, e.g., the first propeller's blades rotate clockwise, and the second propeller's blades rotate counterclockwise). A propeller may have generally fixed blades (in regard to their position relative to the hub), or a propeller may include blades that are adjustable, such as to change the pitch (and angle of attack) of one or more of its blades. One type of adjustable pitch propeller can cause the adjustment of all of its blades in unison (such as those used on some fixed-wing aircraft). Another type of adjustable pitch propeller can enable differential pitch of its various blades (such as those used on some rotorcraft). Propellers can be made from any of a wide range of materials and combinations of materials, including but not limited to: wood, metal, plastic, composites, ceramic, and combinations of these.

In general, propellers rotate within a fluid, such as air or water. Fluids that can be acted upon by a propeller may also include pseudo-fluids, such as granular compositions (e.g., sand). In cases where a fluid is acted upon by a rotating propeller, the fluid may be displaced (such as when a propeller is fixed in position, e.g., a propeller associated with a stationary room fan). Alternatively, the propeller (and its associated elements) may be displaced (such as when a propeller is moveable or displaceable, e.g. a propeller associated with an aircraft in flight). Additionally, both the fluid and the propeller may be displaced (e.g., an aircraft in flight).

Propellers are, in general, useful to cause the motion of a fluids (e.g., gas, liquid, pseudo-fluid, particulated solid), as well as the propulsion of watercraft, aircraft, and drones, as just a few examples.

Propellers are also useful to transform the motion of a fluid into rotational energy that may be used for yet another purpose, such as the generation of electricity by means of a propeller-driven electric generator. Propellers may be stationary (e.g., a fixed-position blower, wind generator, fan), or they may be displaceable (e.g., associated with a moving object, such as an aircraft, drone, watercraft, drilling means). Propellers have many practical applications.

With respect to the current state of the art, it is desired to have propellers with novel structures that modify or improve a propeller's desired practical characteristics during its rotation, e.g., to improve a propeller's fluid movement during rotation, increase efficiency, modify fluid flow, better direct fluid flow, reduce cost of manufacture, and enable new applications.

SUMMARY

The present invention is directed to novel propellers having novel structures called pressure modifying elements (PMEs). Embodiments of pressure modifying elements of the invention modify aerodynamic characteristics and/or the performance of propellers of the invention. In general, pressure modifying elements are structures that redirect the flow of a fluid in order to modify a propeller's practical characteristics, e.g., optimize aerodynamic characteristics (e.g., airflow through or in proximity to the propeller structure), improve thrust, increase efficiency, modify fluid flow, better direct (or redirect) fluid flow, and enable new uses. Embodiments of propellers of the invention increase fluid pressure in regions at a first side of a plane of rotation, and decrease fluid pressure in regions at a second side of the plane of rotation, during rotation of the propeller. Embodiments of the invention (also called "Advanced Propeller Assemblies") of the invention provide propellers with functional benefits useful for fans, pumps, watercraft, aircraft, rotorcraft, drones, autogyros, engines, turbines, medical devices, drills, and more.

BRIEF DESCRIPTION OF THE DRAWINGS

FIG. 3A shows a perspective view of an embodiment of a continuous Pressure Modifying Element having 720 degrees of counterclockwise twist over its entire arc.

FIG. 7B shows a top down view of an embodiment of a 2 blade propeller with a continuous Pressure Modifying Element having a 180 degree counterclockwise twist between adjacent blades, and that is attached to the blade tips in an orientation that is perpendicular to the plane of rotation.

FIG. 19 shows a side view of an embodiment of a propeller of the invention attached to an aircraft by means of a shaft.

DETAILED DESCRIPTION OF THE INVENTION

Figure 1A:
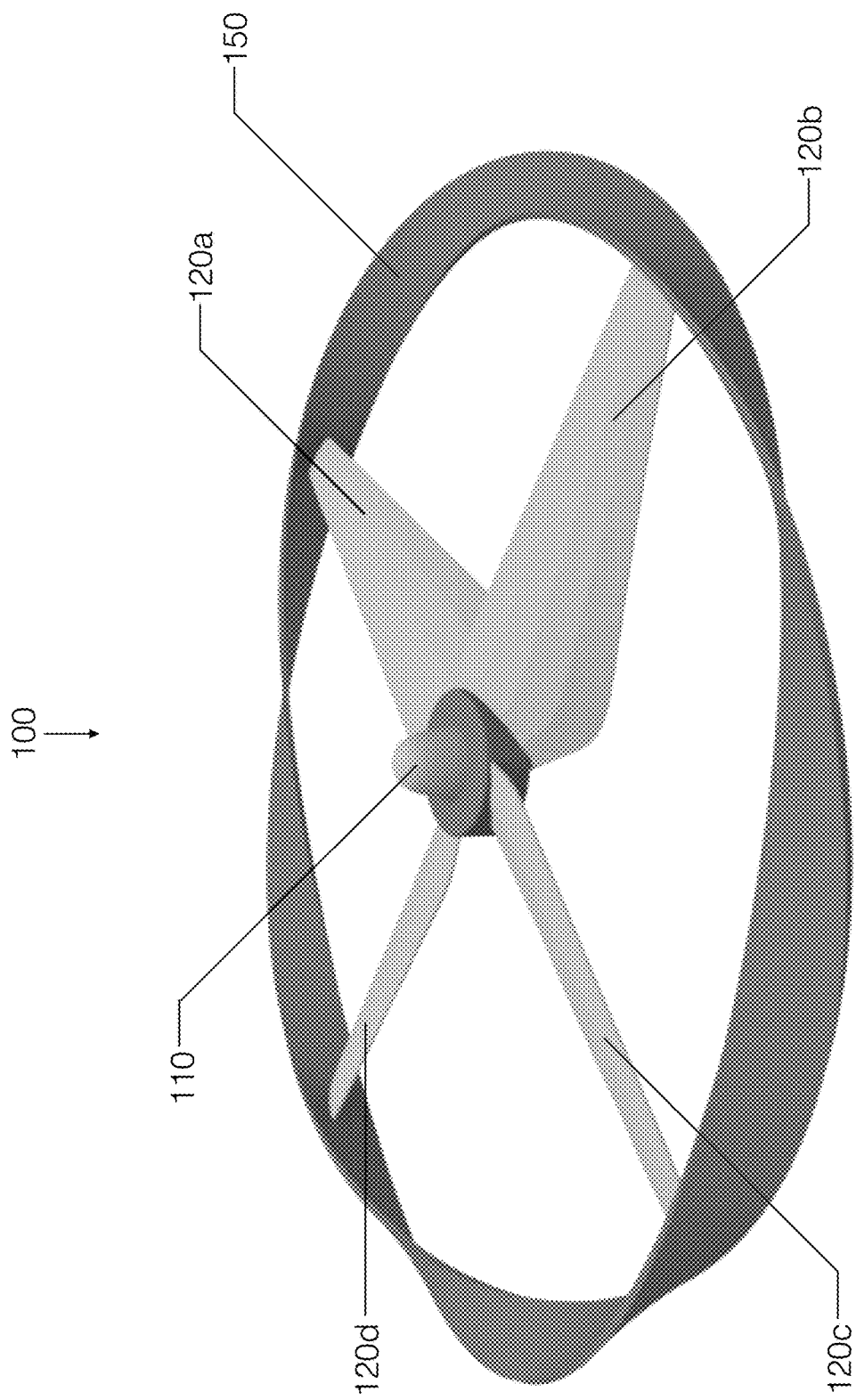
FIG. 1A shows a perspective view of an embodiment of a 4 blade propeller with a continuous Pressure Modifying Element having a 180 degree counterclockwise twist between adjacent blades, and that is attached to the blade tips in an orientation that is perpendicular to the plane of rotation.

A propeller, in one embodiment, is a structure that converts rotational motion of the structure into perpendicular (to the plane of rotation) and other movement of a fluid within which the propeller is rotating. Such movement of a fluid may be characterized, for example, as thrust (e.g., an airplane propeller), or lift (e.g., a helicopter or drone propeller), and in this disclosure the terms "thrust" and "lift" are used interchangeably (e.g., to describe the movement of a fluid relative to a rotating propeller). A propeller, in another embodiment, is useful to convert the movement of a fluid into rotational motion (e.g., air movement through a propeller causing the propeller to rotate), for example. Other movements of a fluid relative to a propeller structure are possible. In general, an embodiment of a propeller has a central hub (or hub). Embodiments of a hub are made of one or more elements (for example, a first hub element may screw onto or attach to a second hub element). Embodiments of a hub also include a spinner, which is a (streamlined) fairing that is built into, or fits over, a propeller hub. Embodiments of a hub are connected to a shaft, and (in certain embodiments) the shaft may subsequently be connected to a motor, transmission, generator, or other mechanism. A blade, in one embodiment, is a structure that is attached to a hub, and emanates outward from the hub to act upon a fluid during rotation (or be acted upon by a fluid during rotation). Embodiments of propellers have at least two blades (e.g., three blades, four blades, five blades, etc.). Embodiments of propellers have blades that are generally evenly spaced about a hub. Other embodiments of propellers have blades that are not generally evenly spaced about a hub. Other propeller-related elements and structures are possible and anticipated by the invention. For purposes of this disclosure, the terms "thrust" and "lift" are used interchangeably.

Embodiments of propeller blades include a diverse variety of designs, shapes, sizes, materials, blade placements on a hub (including blade attachment means), blade spacing(s) about a hub, controllability (e.g., angle of attack adjustability), flexibility, and cross-sectional profiles (which may change along the length of a blade). A blade, in one embodiment, includes aerodynamic cross-sections that are designed to influence the movement of a fluid as the propeller rotates and the blade moves through the fluid. An embodiment of a blade includes a blade twist (e.g., a change in the angle of attack along the longitudinal axis of the blade). Blade embodiments may also be curved or flexible. A curved propeller blade may, for example, include a clockwise curve of its longitudinal centerline, typically generally within a plane of rotation of the blades of the particular propeller, for example. Certain embodiments of propellers have stacked or layered blades (e.g., two sets of blades, with each set of blades rotating within different yet parallel planes of rotation; these may include stacked counter-rotating propellers that rotate in opposite directions, with each propeller in such an arrangement being associated with its own shaft, e.g., the first propeller's blades rotate clockwise, and the second propeller's blades rotate counterclockwise). An embodiment of a propeller has fixed blades (in regard to their position relative to the hub). Another embodiment of a propeller has blades that are adjustable, such as to enable a change to the pitch (and angle of attack) of one or more of its blades. One type of adjustable pitch propeller causes the adjustment of all of its blades in unison (such as certain variable pitch propellers used on some fixed-wing aircraft). Another type of adjustable pitch propeller enables differential pitch of its blades (such as propellers used on some rotorcraft). Embodiments of propellers are made with any of a range of materials, including but not limited to: wood, metal, plastic, composites, ceramic, and combinations of these. Embodiments of propellers can also be manufactured using a variety of techniques, including but not limited to: pressing, forming, layering, molding, injection molding, bending, cutting, trimming, finishing, heat treating, painting, coating, and assembling. Other techniques are also possible. Notably, embodiments of individual elements of the invention (e.g., hub, blade, PME) are made of at least one material. Furthermore, embodiments of the invention can include combinations of elements. For example, a hub and (some or all of) its associated blades may be manufactured as a single piece, e.g., using three-dimensional printing (3D printing). As another example, a set of blades and an associated PME may be manufactured as a single unit. As another example, an entire propeller of the invention, including at least the propeller's hub, blades and PME, may be manufactured as a single unit, e.g., by means of injection molding, 3D printing, and more. The present invention anticipates these and other assemblies, and methods of making them.

In general, embodiments of propellers rotate within a fluid, such as air or water, as examples. Fluids that can be acted upon by a propeller may also include pseudo-fluids, such as granular compositions (e.g., sand). In embodiments of a rotating propeller that act upon a fluid, the fluid is displaced (e.g., a propeller associated with a stationary room fan). In other embodiments, a rotating propeller is displaceable and is displaced (e.g. a propeller associated with an aircraft in flight). Additionally, an embodiment of a propeller may both act upon a fluid to displace the fluid, and also be displaced itself (e.g., an aircraft in flight). The rotation (rotational movement) of a propeller (and its blades), and displacement (linear movement) of a propeller structure (including its ancillary structures, e.g., an engine that is causing the rotation, fuselage of an aircraft or body of a drone), are distinct in embodiments of the invention.

Embodiments of propellers are, in general, useful to displace fluids (e.g., gas, liquid, pseudo-fluid, particulated solid), as well to propel watercraft, aircraft, and drones, as a few examples. Embodiments of propellers are also useful to transform the motion of a fluid into rotational energy that is useful for yet another purpose, such as the generation of electricity by means of a wind-driven electric generator. Propellers may be generally stationary (e.g., a fixed-position blower, wind generator, fan—even if they rotate), or they may be displaceable (e.g., associated with a moving object, such as an aircraft, drone, watercraft, drilling means). Propellers have many practical consumer, commercial, industrial, scientific, military, and other applications.

The present invention is directed to embodiments of propellers that include a novel structure called a pressure modifying element (PME). While certain embodiments of the invention have a single (e.g., continuous) pressure modifying element, other embodiments of the invention have multiple pressure modifying elements (PMEs). Embodiments of pressure modifying elements modify aerodynamic characteristics and/or the performance of propellers of the invention. In general, embodiments of pressure modifying elements are structures that redirect the flow of a fluid in order to modify at least one of a propeller's characteristics, e.g., optimize aerodynamic characteristics (e.g., airflow through or in proximity to the propeller structure), improve thrust, increase efficiency, modify fluid flow, better direct (or redirect) fluid flow, and enable new uses. Certain embodiments of the invention include a PME that counter-intuitively modifies one or more characteristics of a propeller, e.g., increases drag, and counter-intuitive modifications are useful for certain applications. Embodiments of the invention provide propellers with functional benefits that are applicable to, and useful for: fans, pumps, watercraft, aircraft, rotorcraft, drones, autogyros, engines, turbines, medical devices, drills, mixers, and more.

Embodiments of the invention include propellers with a central hub (hub). Embodiments have two or more blades that emanate outward from the hub. Alternatively, in lieu of a blade, an embodiment has a non-blade attachment means to attach a PME to a hub. An embodiment has one (a single) pressure modifying element, such as a full-circumference or continuous pressure modifying element. Another embodiment has multiple pressure modifying elements, such as a partial-circumference PME attached to the end of each blade, for example. As used herein, the term "attached" can mean that a first element of the invention and a second element of the invention are attached, connected, coupled, joined, or otherwise associated (either directly or indirectly) with one another. For example, an embodiment of the invention includes a PME that is directly attached to (or possibly integrated with, or built into) a blade. As another example, an embodiment of the invention includes a PME that is indirectly attached to a blade, possibly by means of a post or intermediate structure. Attachment may be permanent or temporary. As will be apparent to one skilled in the art, various combinations, configurations and variations of the various elements of embodiments of propellers of the invention—including blades (or other attachment means) and PMEs—are possible and anticipated by the invention.

For clarity, the following words may be applied in the following ways, as they are used herein. In an embodiment, a "central hub" or "hub" is a propeller's central structure, capable of rotation, and about which the blades of the propeller rotate. A "shaft" is an elongated structure that can be attached to (or is continuous or integrated with) a central hub. Embodiments of a shaft are directly or indirectly attached or connected with a power source, such as a motor or engine that is capable of causing the shaft and hub to rotate, or with a generator, or may freely rotate, as examples. An embodiment of a shaft can also be caused to rotate by rotation of a propeller (that is being caused to rotate by wind, for example). Embodiments of a shaft may rotate freely. An embodiment of a "blade" is an elongated structure that, when rotated about a hub, causes a fluid (e.g., air, water) to be displaced (flow). Such displacement may be in a direction that is generally perpendicular to the plane of rotation of the propeller, generally in a plane that is parallel to the plane of rotation of the propeller, or otherwise. Such fluid flow may cause thrust, or lift, as examples. Such fluid flow may be smooth or turbulent. Turbulent fluid flow may be desirable for some applications of propellers of the invention. Embodiments of a blade may also be acted upon by a moving fluid, to cause rotation of the blade. In an embodiment, a "post" is an elongated structure that emanates from a hub and does not generally cause lift or thrust. At least one post is used in embodiments of the invention. A "pressure modifying element" is, in one embodiment, a structure attached to at least one blade (or post) of a propeller, and that modifies the flow of a fluid during rotation of the propeller (or, alternatively, modifies the flow of a fluid that is causing an embodiment of a propeller of the invention to rotate). In one embodiment, a pressure modifying element associated with a propeller rotating in a fluid causes an increase in the fluid pressure (in a space) at one side of a plane of rotation of the propeller. In another embodiment, a pressure modifying element associated with a propeller rotating in a fluid causes a decrease in the fluid pressure (in a space) at one side of a plane of rotation of the propeller. In yet another embodiment, a pressure modifying element associated with a propeller rotating in a fluid causes an increase in the fluid pressure on one side of a plane of rotation of the propeller, and a decrease in the fluid pressure on the other side of the plane of rotation. In yet another embodiment of the invention, a pressure modifying element that is rotating in a fluid causes an increase in the fluid pressure (in a space) on both sides of the plane of rotation. In still another embodiment, a pressure modifying element that is rotating in a fluid causes a decrease in the fluid pressure (in a space) on both sides of the plane of rotation. Embodiments of a pressure modifying element produce a centrifugal vortex during rotation of propeller, to thereby cause modification of fluid flow generally along (parallel to) the plane of rotation. Other embodiments of propellers with PMEs cause other fluid effects. In reference to embodiments of the invention fluid pressure may be absolute (e.g., an absolute increase or decrease in a fluid pressure), or relative (meaning, for example, a fluid pressure caused by a standard propeller that is without a pressure modifying element, relative to the same propeller with a pressure modifying element). As an example of this, an embodiment of a particular propeller without a PME turning at 1,000 revolutions per minute (RPM) will generate a high pressure of h at a first side of the propeller's plane of rotation, and a low pressure of l at a second (opposite) side of the propeller's plane of rotation; and if that same propeller includes an embodiment of a PME of the invention, the propeller of the invention (that includes at least one pressure modifying element) will then generate a high pressure that is greater than h (e.g., a higher pressure in relative terms) at the first side of the propeller's plane of rotation, and a low pressure that is less than l (a lower or reduced pressure in relative terms) at the second side of the propeller's plane of rotation.

The region of a propeller blade positioned closest to a hub (when the blade is attached to the hub) is referred to as the base (or proximal end) of the blade, and the region of a blade that resides farthest away from the hub is referred to as the tip (or distal end) of the blade. The region of a propeller blade structure that is located in between its base and tip is referred to as its mid-section (or middle). In general, an embodiment of a propeller blade is attached to the propeller's central hub, and emanates outward from the hub. A hub may be further attached to a shaft (or a hub and shaft may be integrated, as a single unit, for example), and a shaft may be associated with an engine, motor, transmission, gears, generator, turbine, or other mechanism or combination of mechanisms. In an embodiment, an engine or motor provides a means of rotating a shaft, which in turn rotates a propeller and associated PME(s) of the invention. In general, each blade has a leading edge (e.g., clockwise-facing edge of a blade during clockwise rotation of the propeller blade; counterclockwise-facing edge of a blade during counterclockwise rotation of the blade), and a trailing edge (e.g., counterclockwise-facing edge of a blade during clockwise rotation of the blade; clockwise-facing edge of a blade during counterclockwise rotation of the blade). The leading and trailing edge of a blade may switch due to a change in the direction of rotation of the blade (e.g., an embodiment whereby the clockwise edge of a blade is considered its leading edge during clockwise rotation of the blade, and the counterclockwise edge is then considered the leading edge of the same blade during counterclockwise rotation of the same propeller), for purposes of this disclosure. In general, propeller blades are attached to (and emanate out from) the propeller's central hub. Also, in general, a hub is a structure to which a propeller's blades are attached, in some way, and which is in turn attached to a shaft. Hub and shaft structures may be a single integrated structure, for example (and may even be referred to alternatively solely as a shaft). Notably, some embodiments of propellers of the invention have a single pressure modifying element (PME), while other embodiments of the invention have multiple pressure modifying elements (PMEs). In certain embodiments, a single (e.g., continuous) PME or multiple PMEs may replace a propeller's (traditional) blades, and such a propeller may produce thrust or lift without blades (only by means of its PME or PMEs) during rotation. In such embodiments, a PME may be attached to a hub by attachment means other than a blade, such as a post, or the attachment means may be a modified blade, or some combination of a blade (traditional or modified) and other attachment means (e.g., one transitioning into the other). Certain embodiments of propellers of the invention include a central hub, two or more blades, and one or multiple pressure modifying elements. Other embodiments of the invention include a hub, one (or two) or more attachment means (e.g., posts), and one or multiple pressure modifying elements. Yet other embodiments of propellers of the invention have a central hub, one or more blades, one or more attachment means (e.g., posts), and one or more pressure modifying elements. Other element combinations and embodiments are possible and anticipated by the invention.

Embodiments of propeller blades exist in a wide variety of designs, shapes, sizes, materials, placements on a hub, spacings about a hub, attachment to a hub, controllability (e.g., ability to adjust angle of attack), flexibility (e.g., flex of a blade out of the plane of rotation), and cross-sectional profiles (which may change along the length of a blade). Embodiments of blades may include aerodynamic cross-sections designed to enhance thrust as a propeller rotates. A blade may include a blade twist (e.g., a change in the angle of attack along the longitudinal axis of the blade). Propeller blades may also be curved. A curved blade may include a clockwise curve of its longitudinal centerline approximately parallel to (and generally within) the plane of rotation of the blades of the particular propeller, for example. Embodiments of propellers have stacked or layered blades (e.g., two sets of blades, with each set of blades rotating within a different yet parallel plane of rotation, including stacked counter-rotating propellers that rotate in opposite directions, e.g., the first propeller's blades rotate clockwise, and the second propeller's blades rotate counterclockwise). Embodiments of a propeller have generally fixed blades (relative to the hub), or have blades that are adjustable, such as to change the pitch (and angle of attack) of one or more of its blades. A first type of adjustable pitch propeller causes the adjustment of all of its blades in unison (e.g., propellers used on some fixed-wing aircraft). A second type of adjustable pitch propeller enables differential pitch of its various blades (e.g., propellers used on some rotorcraft), which can be used to cause more or less left under certain areas of the propeller. A third embodiment of an adjustable pitch propeller can cause each blade (or a first set of blades) to be adjustable (e.g., have their angle of attack changed) independent of another blade (or a second set of blades) Propellers can be made from any of a wide range of materials, including but not limited to: wood, metal, plastic, composites, ceramic, and combinations of these. In an embodiment, a propeller is controlled, e.g., by mechanical or electromechanical means). In another embodiment, a propeller is controlled dynamically based on at least one condition or parameter, e.g., temperature, forces on the blade, rotational speed, amount of thrust or lift being generated, material composition, and more. Such dynamic control may be enabled by means of a responsive material, electrically controlled material, and other means. Embodiments of a propeller of the invention may include an electrical or other conduit that enables control (e.g., change in shape) of a PME associated with the distal end of the blade.

Embodiments of blades of the invention produce a desired aerodynamic effect, such as thrust or lift, during rotation, for example. Other embodiments of the invention include blades that are acted upon by a fluid, e.g., to cause a propeller to turn. Embodiments of the invention that include blades may have the blades serve as an attachment means. An attachment means is a structure that attaches (connect or joins) one element of an embodiment of the invention to another element of an embodiment of the invention. For example, an embodiment of a blade may serve as an attachment means for a pressure modifying element of the invention, thereby serving to associate a pressure modifying element with a hub, for example. In such an example, an embodiment of an attachment means attaches a hub and one pressure modifying element. Alternatively, an embodiment of an attachment means can associate a hub with two or more pressure modifying elements. Multiple attachment means are also used, in embodiments, to attach a pressure modifying element (such as a continuous PME) to a hub. Other embodiments of attachment means of the invention can attach a pressure modifying element to a blade, for example. In such an embodiment, the attachment means may retain a pressure modifying element in a position spaced away from the propeller blade structure, for example, e.g., out in front of the blade, behind the blade, or out beyond the tip of the blade. As one example, an embodiment of a propeller of the invention may have three blades and two pressure modifying elements, a first PME positioned to a first side of a plane of rotation by a first set of attachment means, and a second PME positioned to a second side of a plane of rotation by a second set of attachment means. Attachment means of the invention may take any of a variety of forms, or be other types of structures. For example, an embodiment of an attachment means of the invention is magnetic, e.g., uses a magnetic force to hold a pressure modifying element in place.

Embodiments of attachment means enable permanent attachment of a pressure modifying element. Other embodiments of attachment means enable temporary attachment of a pressure modifying element. Certain embodiments of attachment means provide the ability to attach and detach pressure modifying elements of the invention, possibly with ease (e.g., with a simple human action or gesture). For example, an embodiment of the invention enables reversible attachment of a pressure modifying element to a blade (or to multiple blades), and detachment of the same pressure modifying element (such as when the pressure modifying element is damaged or worn). Reversible or temporary attachment may utilize any of a variety of attachment/detachment means, e.g., latch, pin, adhesive, magnet, clip. An embodiment of a pressure modifying elements may also be held in place by a force, such as the force of a fluid that retains the PME in place (e.g., in its proper position), or a centripetal or other force.

Certain embodiments of propellers of the invention include two blades. Other embodiments of the invention have three blades. Other embodiments of the invention have another number of blades, such as four or five or six or more blades. Other embodiments of the invention have one or more pressure modifying elements that are attached to a hub using attachment means (that are other than blades), and no blades. In embodiments of the invention having blades, each blade emanates from a hub, and blades are positioned about the hub. Embodiments of the invention include two or more blades that are evenly positioned about a hub, such as two blades positioned 180 degrees apart, or three blades positioned 120 degrees apart. Other embodiments of propellers of the invention have blade arrangements with blades that are not evenly disposed (positioned) about a hub, e.g., the blades may be clustered, such six blades arranged in three clusters 120 degrees apart, with each cluster having two blades.

In one embodiment of the invention including blades, a blade is a structure that produces (or contributes to the production of, or facilitates) a desired aerodynamic effect. One such effect is thrust. Another possible effect is lift. In embodiments of propellers of the invention having two or more blades capable of producing thrust or lift, when the hub rotates, its blades also rotate and—by virtue of their structure, orientation and movement relative to a fluid—transform rotational energy (such as rotational energy that is provided by a power source, e.g., engine or electric motor, and transmitted by means of a shaft to the hub and blades) into thrust or lift. In other embodiments, a propeller may, by virtue of having fluid move through it (e.g., around or between its structural elements), be caused to rotate (e.g., a propeller that is used to turn a shaft in order to generate electrical energy by means of an electrical generator). Thrust and lift are, in general, the result of the creation of a higher fluid pressure region generally on one side of a plane of rotation of the propeller in proximity to the propeller's blades, and the creation of a lower fluid pressure region (relative to the higher fluid pressure region) generally on the other side the same plane of rotation of the same propeller. Relative to certain embodiments of the invention, a "plane of rotation" is defined as a plane that is perpendicular to the longitudinal axis of a propeller hub (and shaft) and intersects the hub where the blades are attached to the hub. A plane of rotation may be defined differently for another embodiment of the invention. For example, a "plane of rotation" can also be defined as a plane through which a propeller's blades (or posts) rotate. Another definition of a plane of rotation relating to propellers of the invention is the plane within which a specified location on each blade—such as a point at each blade's tip—rotates. In embodiment of propellers of the invention, as the propeller moves through space the location and orientation of its plane of rotation will also change.

Notably, embodiments of the invention may provide desirable effects in addition to (or other than) thrust or lift. For example, an embodiment of the invention may provide lift that is useful for autogyro operation. As another example, an embodiment of the invention may be useful to produce turbulence, such as for use in a mixing or blending operation. As yet another example, an embodiment of the invention may be designed to optimize drag, or even to maximize drag (e.g., per unit of area), such as for a sea anchor or turbulence-inducing application. As realized by one skilled in the art, in addition to (and as a result of) the many variations in the physical structures and arrangements of embodiments of the invention, there are many practical applications for which these embodiments are useful and provide valuable benefits.

In an embodiment of a propeller of the invention, a stationary fan produces thrust and creates airflow, such as to circulate air within a space, such as a room. In another embodiment of a propeller of the invention, a propeller and its associated objects (e.g., engine, fuselage) are free to move through space, and the propeller's conversion of rotational motion into thrust moves (propels) the propeller and all of its associated objects through the space, e.g., an aircraft that is pulled or pushed through the air by a propeller of the invention. In yet another embodiment of a propeller of the invention, an external force, such as wind (e.g., air moving through earth's atmosphere), acts upon the blades of such a propeller to thereby rotate the propeller blades, hub, and shaft, to operate a generator and produce electricity. Embodiments of the invention provide propellers with functional benefits useful for aircraft, rotorcraft, drones, watercraft, turbines, generators, autogyros, fans, pumps, mixers, drills, medical devices, and more. As previously discussed, such applications and benefits are provided by certain embodiments of the invention that include blades and one or more PMEs, and also by other embodiments of the invention that have one or more PMEs attached to a hub or shaft by attachment means other than a blade, as examples. Other embodiments are possible and anticipated by the invention, and different sets of benefits are made possible by virtue of an embodiment's unique structure and function, as well as its operation (e.g., speed of rotation per motor shaft rotational speed).

Embodiments of the invention have one pressure modifying element. Other embodiments of the invention have two or more pressure modifying elements. An embodiment of a pressure modifying element (PME) modifies airflow in proximity to the PME during rotation of the PME. In another embodiment, a PME modifies airflow while the PME is not rotating, in situations where fluid is flowing due to forces external to or unassociated with the PME. Embodiments of pressure modifying elements provide novel propeller structures with novel performance and operating characteristics. Such novel characteristics include, but are not limited to: more desirable aerodynamics, optimized thrust (e.g., per rotation), better efficiency, modified fluid flow, altered drag, altered optimal operating (e.g., rotation) speed (ranges), and more.

In an embodiment, a pressure modifying element is a structure attached to one or more blades of a propeller (or otherwise attached to the hub of a propeller), and modifies the fluid pressure of the lower fluid pressure region and/or the higher fluid pressure region during rotation of the propeller. In an embodiment of a propeller of the invention that includes one or more pressure modifying element(s), airflow is produced in a direction of movement toward and/or away from the hub of the propeller along a path that is generally parallel to a plane of rotation of the propeller (although fluid movement may be moved or directed in other directions, as well). In other embodiments of a propeller of the invention that has one or more pressure modifying element(s) (which may be the same embodiment), airflow is produced in a direction toward and/or away from the hub of the propeller along a path that is generally perpendicular to a plane of rotation of the propeller (and fluid movement may occur in other directions, as well). Such airflow modifications (e.g., by means of pressure modifying elements of the invention) may be used to alter, modify, revise, improve, optimize or maximize one or more aerodynamic or other functional or operational characteristics of a propeller of the invention. Notably, in one embodiment of a pressure modifying element of the invention, a pressure modifying element is attached (or attachable) to a blade of the invention (or to multiple blades of the invention). In another possible embodiment of a pressure modifying element of the invention, the pressure modifying element is attached (or attachable) to an attachment means of the invention. In one embodiment of the invention, such attachment means is attached to a blade, to thereby enable attachment between a blade and a pressure modifying element. In another embodiment of the invention, attachment means is attached to the hub, to enable the attachment of a pressure modifying element and hub (and further embodiments of such propellers of the invention may have no blades, meaning that the pressure modifying elements generates the aerodynamic effect, e.g., thrust, without the need for blades). Other arrangements of pressure modifying elements and attachment means are anticipated by the invention.

In an embodiment, a pressure modifying element is a secondary propeller-like structure (or screw, or twisted elongated structure) that is directly or indirectly attached in a stationary (not capable of rotating about its own secondary propeller-like center or hub) manner to a blade or other structure of a propeller. In such an embodiment, a propeller of the invention includes a central hub with at least two blades, and such a secondary propeller-like structure. In this embodiment, the secondary propeller-like structure modifies the flow of a fluid within which the propeller is rotating, during rotation of the propeller. In one embodiment, the modification of the flow of a fluid means that the fluid pressure is increased (in a relative sense, meaning versus the same propeller operating identically in the same fluid environment without a PME) to a first side of a plane of rotation of the propeller during rotation of the propeller. In an embodiment, the modification of the flow of a fluid means that the fluid pressure is decreased (in a relative sense, meaning versus the same propeller operating identically in the same fluid environment without a PME) to a second side of a plane of rotation of the propeller during rotation of the propeller. In another embodiment, the modification of the flow of a fluid means that the fluid flow is directed inwards, towards the propeller's central hub (in a relative sense, meaning versus the same propeller operating identically in the same fluid environment without a PME) during rotation of the propeller. In yet another embodiment, the modification of the flow of a fluid means that the fluid flow is directed outwards, away from the propeller's central hub (again, in a relative sense, meaning versus the same propeller operating identically in the same fluid environment without a PME) during rotation of the propeller. These embodiments and descriptions of fluid flow serve as examples, and other structures and fluid flows are possible and anticipated by the invention.

Embodiments of pressure modifying elements of the invention are designed to rotate as the propeller (to which a PME is attached) rotates. Such rotation may be caused by virtue of the attachment of a pressure modifying element to a rotating hub or shaft, or to blades that are attached to a rotating shaft or hub, for example. Rotation of a pressure modifying element is, in embodiments of the invention, directly correlated to the rotation of a propeller's hub or shaft (e.g., the PME and the hub or shaft rotate at the same speed). In other embodiments of the invention, a pressure modifying element may rotate at a speed that is different from the speed of rotation of a hub or shaft, or of at least some of the propellers, such as in the case where a dynamic attachment means or energy transmission mechanism is included in such design.

In an embodiment a pressure modifying element of the invention, the pressure modifying element includes a twist along its length. In one embodiment, a "twist" is a progressive change in the chord angle of a PME, along the length of the PME. In such an embodiment, such a twist causes fluid to flow during rotation of the pressure modifying element within the fluid. In a first embodiment, fluid flow direction is out of (or away from) a lower fluid pressure region (e.g., in order to decrease the pressure in the lower fluid pressure region). In a second embodiment, fluid flow direction is out of (or away from) a higher fluid pressure region (e.g., in order to decrease the pressure in the higher fluid pressure region). In a third embodiment, fluid flow direction is into (or toward) a lower fluid pressure region (e.g., in order to increase the pressure in the lower fluid pressure region). In a fourth embodiment, fluid flow direction is into (or toward) a higher fluid pressure region (e.g., in order to increase the pressure in the higher fluid pressure region). Embodiments of pressure modifying elements may cause one or more of the above fluid flow effects, depending on the structure, design and direction of rotation of such an embodiment. In an embodiment, fluid "flow" means displacement of the fluid. Embodiments of propellers of the invention cause fluid flow (displacement) in at least one direction.

In one embodiment of a pressure modifying element of the invention, the pressure modifying element—during rotation within a fluid—causes displacement of the fluid along a path that is generally parallel to the plane of rotation of the pressure modifying element. In another embodiment of a pressure modifying element of the invention, the pressure modifying element—during rotation within a fluid—causes displacement of the fluid along a path that is generally parallel to the plane of rotation of the pressure modifying element and also generally toward the hub or center of the propeller. In yet another embodiment of a pressure modifying element of the invention, the pressure modifying element—during rotation within a fluid—causes displacement of the fluid along a path that is generally parallel to the plane of rotation of the pressure modifying element and also generally away from the hub or center of the propeller. In yet another embodiment of a pressure modifying element of the invention, the pressure modifying element—during rotation within a fluid—causes displacement of the fluid along a path that is generally parallel to the plane of rotation of the pressure modifying element, and also generally toward and away from the hub or center of the propeller. In yet another embodiment of a pressure modifying element of the invention, the pressure modifying element—during rotation within a fluid—causes displacement of the fluid along a path that is generally perpendicular to the plane of rotation of the pressure modifying element. In yet another embodiment of a pressure modifying element of the invention, the pressure modifying element—during rotation within a fluid—causes displacement of the fluid along a path that is generally perpendicular to the plane of rotation of the pressure modifying element, and also generally toward and away from the hub or center of the propeller. In yet another embodiment of a pressure modifying element of the invention, the pressure modifying element—during rotation within a fluid—causes displacement of the fluid along a path that is generally parallel to a tangent to a circle described by the rotation of the pressure modifying element.

In one embodiment of a pressure modifying element of the invention, the pressure modifying element's longitudinal axis is curved (e.g., longitudinal axis of a an embodiment of a continuous type pressure modifying element is generally circular in overall shape), and a tangent line to the curved axis (for such an embodiment) is perpendicular to a line that intersects both the point of intersection of the tangent line to the curved axis of the pressure modifying element, and a point at the center of the propeller (e.g., point representing a center of mass of the propeller's hub, point representing a center of mass of all of the propeller's pressure modifying elements). In another embodiment of a pressure modifying element, the pressure modifying element's longitudinal axis includes a curved segment, and a tangent line at two or more points along the curved segment are generally perpendicular to a line that intersects both such a point of intersection of the tangent line to the longitudinal axis's curved segment, and a point at the center of the propeller (e.g., point at the center of mass of the propeller's central hub, point at the center of mass of all of the propeller's pressure modifying elements of the invention). Embodiments of (continuous) pressure modifying elements are circular in overall shape. Other embodiments of (continuous) pressure modifying elements are elliptical in overall shape. Other embodiments of pressure modifying elements may be non-continuous, and such embodiments may have either a straight or curved longitudinal (elongated) axis. Embodiments of pressure modifying elements include a twist (e.g., progressive change in chord) along (about) this axis.

In an embodiment of the invention, a propeller having a pressure modifying element of the invention produces additional thrust per revolution per minute ("rpm") of the propeller (e.g., versus thrust per rpm produced by substantially the same propeller without a pressure modifying element). While this functional improvement is one possible utility of propellers of the invention, other embodiments offer other functional advantages. As an example, it may be desirable to use embodiments of performance-modifying elements (e.g., such as those having a reverse twist or other structural variation) to decrease the thrust per rpm of a propeller, which may be desirable for certain practical applications. Embodiments of propellers and pressure modifying elements of the invention may be used to modify various structural and performance characteristics of propellers of the invention to benefit a wide range of practical applications.

In an embodiment of the invention, a "twist" is defined as a progressive change in a series of measures of cross-sectional angles of a pressure modifying element (along its elongated or longitudinal axis), wherein each of the cross-sectional angles (in the series) is viewed in a series of axial planes. In an embodiment, an "axial plane" is defined as a plane that is perpendicular to the plane of rotation of a set of blades of a propeller, and that intersects with a point at the center (e.g., center of mass) of the hub of the propeller to which the set of blades is attached (e.g., extending out from). In another embodiment, "axial plane" is a plane that is perpendicular to a plane of rotation of an embodiment of a propeller of the invention, and that intersects with the propeller's center of rotation. In yet another embodiment, an "axial plane" is defined as a plane that is perpendicular to an elongated or longitudinal axis of a pressure modifying element (e.g. a centerline that defines the overall curve or shape of the pressure modifying element). In an embodiment of a propeller of the invention, a "plane of rotation" is defined as a plane through which a pressure modifying element. In another embodiment, a "plane of rotation" is defined as a plane through which a specified point on a pressure modifying element rotates. In an embodiment, a plane of rotation of a propeller of the invention also intersects with a point representing the center of mass of a propeller. Notably, a plane of rotation of a propeller of the invention will move (along with the propeller) as the propeller moves through space, or as the propeller's orientation in space changes. In the case of an embodiment of a propeller of the invention that includes a hub (even if the hub is a bare shaft) and attachment means (e.g., magnetic attachment means) that attach the hub to the one or more pressure modifying elements, the plane of rotation may be defined as the plane through which the propeller's pressure modifying element(s) travel during rotation, or through which analogous points of a propeller's multiple pressure modifying elements travel. While these definitions are intended to be helpful for a practical understanding of structures of the invention (and their orientations and relationships to one another), these definitions are not limiting. For each embodiment of a pressure modifying element of the invention, its twist may be expressed as the change in the number of degrees of twist between one position to another position along the length of the pressure modifying element, e.g., x degrees change in twist per y degrees change in arc. For example, a pressure modifying element that is said to have 1 degree of twist per each 1 degree of arc means that if the pressure modifying element is continuous and extends around the entire periphery of a propeller of the invention it will make one complete twist (360 degrees of twist over 360 degrees of arc, or over the full circle). As another example, if a propeller of the invention includes four blades, and has one "half-turn" of pressure modifying element twist between each set of two adjacent blades, this may be stated as 180 degrees of twist (a "half turn") per (for) the 90 degrees of arc of the pressure modifying element (representing a 90 degree angle between each of two adjacent blades in a four-bladed propeller having even distribution of its blades), and could be expressed as a twist of 2 degrees per (for each) 1 degree of arc along the particular pressure modifying element's length. Certain embodiments of pressure modifying elements of the invention twist continuously (without discrete breaks in twist), and so these representations of measures of twist are primarily intended to provide an indication of the amount of twist per length (or segment), irrespective of surface smoothness. In embodiments, the twist of a pressure modifying element is uniform. In other embodiments, the twist of a pressure modifying element is not uniform, meaning that the twist is x degrees of twist per 1 degree of arc for a first portion (or first segment) of the pressure modifying element, and y degrees of twist per 1 degree of arc for a second portion (or second segment) of the same pressure modifying element, where x and y are different. PME twist may change progressively, e.g., gradually, or may change dramatically, including with breaks between segments. A PME, in one embodiment, includes at least a portion that has a twist that is other than (greater than, or less than) zero degrees for each degree of arc. Other embodiments of PMEs include portions that are flat, and portions with a twist that is other than zero degrees per degree of arc. A PME can have various segments (portions) with different twist. For example, in one embodiment, a PME can be flat (with zero degrees of twist) for a portion in proximity to each blade tip, and then include intervening portions with 180 degrees of twist between adjacent intervening portions at each of the blade tips. In embodiments of the invention, a section of a PME that is located in proximity with a blade tip—whether such a section is flat or has twist—may be oriented in a plane that is parallel to the plane of rotation of the propeller, in a plane that is perpendicular to the plane of rotation of the propeller, or in some other plane relative to the plane of rotation of the propeller, or in various other (same or different) planes. For example, in an embodiment, a pressure modifying element encircles the periphery of a four blade propeller (having each of its four blades evenly spaced 90 degrees apart), and with a continuous twist of one degrees per each degree of arc (or 360 degrees of twist for the full circle), and each of the portions of the PME in proximity with blade tips alternate between being in a plane that is parallel to the plane of rotation and a plane that is perpendicular to the plane of rotation. In another embodiment, a pressure modifying element encircles the periphery of a four blade propeller (having each of its four blades evenly spaced about its hub at 90 degrees apart), with a twist of 180 degrees per 90 degrees of arc, such that every portion of the PME in proximity with a blade tip is oriented at the same angle relative to the plane of rotation of the propeller, e.g., parallel to the plane of rotation, perpendicular to the plane of rotation, x degrees relative to the plane of rotation (where x is a number between zero and 360), as examples. As may be seen by these examples, embodiments of the invention can include various PMEs with various twists, twist patterns, flat sections, attachment means orientations, and more. A PME, in one embodiment, may exist in sections (also referred to as portions, segments, lengths of a PME). Such segments may be attached to a blade, e.g., one PME section per blade. An embodiment wherein the sections are joined to form a complete circle is considered a continuous PME. An embodiment wherein sections in the same plane and with the same radius are not joined (ends touching, connected, attached to one another) is considered a discontinuous or segmented PME. In an embodiment of a discontinuous PME, its segments can have the same design (e.g., length and twist). In an embodiment of a discontinuous PME, its segments can have a different design (e.g., length and twist). In the case of a continuous PME embodiment, the twist can be substantially consistent throughout the entire length of the PME (e.g., one degree of twist per each degree of arc). As another example of a continuous PME embodiment, the twist can vary (with different segments of the PME having different twist). In yet another example of a PME embedment, segments are interrupted (e.g., a first section having a first twist and a second section having a second twist are interrupted by a PME segment that has no twist, or is a non-PME structure, or is a space).

Furthermore, for purposes of notation and describing the amount of twist associated with embodiments of various pressure modifying elements of the invention, the use of a "+" or "−" preceding a measurement of degrees (of angle or arc) denotes a direction. For example, stating that a twist is +1.0 degree per+1.0 degree of arc means that the twist of a particular PME of the invention progresses clockwise by 1.0 degree for every 1.0 degree clockwise change in location along the length (arc) of the particular PME. This approach provides for the same measure of twist irrespective of whether an embodiment of a PME is being viewed from above or below, e.g., from one side of its plane of rotation or the other side of its plane of rotation, for example. If another PME has a twist of −1.0 degree for every +1.0 degree of arc, this would mean that the twist progresses counterclockwise for every 1.0 degree clockwise change in location along the length (arc) of the particular PME. In certain embodiments of the invention having blades, pressure modifying elements may have twist that is a multiple of 45 degrees between adjacent blades (e.g., +45 degrees of twist for each +90 degrees of arc in a four-blade propeller; −180 degrees for each 120 degrees of arc in a three-bladed propeller; +765 degrees of twist for every 180 degrees of arc in a two-blade propeller, etc.). Other embodiments of PMEs of the invention have other amounts of twist. Notably, the concept of a clockwise or counterclockwise twist of a PME is consistent irrespective of from which side of the plane of rotation (of the propeller or associated PME) is viewed. In other words, in embodiments of the invention, a clockwise twist will be seen as a clockwise twist irrespective of whether the propeller and an associated PME are viewed from one side of the plane or rotation, or the other side of the plane of rotation, and a counterclockwise twist will be seen as counterclockwise irrespective of whether the propeller and an associated PME are viewed from one side of the plane or rotation, or the other side of the plane of rotation. Notably, a measure of PME (segment) twist is independent of direction of rotation of the PME, e.g., an embodiment of a PME with a clockwise twist may be rotated (e.g., as part of a rotating propeller of the invention) in a clockwise direction or a counterclockwise direction; and an embodiment of a PME with a counterclockwise twist may be rotated (e.g., as part of a rotating propeller of the invention) in a clockwise or a counterclockwise direction.

Embodiments of a PME of the invention have at least an absolute value of 0.01 degree of twist per one degree of arc; at least an absolute value of 0.05 degrees of twist per one degree of arc; at least an absolute value of 0.10 degree of twist per one degree of arc; at least an absolute value of 0.15 degrees of twist per one degree of arc; at least an absolute value of 0.20 degrees of twist per one degree of arc; at least an absolute value of 0.25 degrees of twist per one degree of arc; at least an absolute value of 0.50 degrees of twist per one degree of arc; at least an absolute value of 0.75 degrees of twist per one degree of arc; at least an absolute value of 1 degree of twist per one degree of arc; at least an absolute value of 2 degrees of twist per one degree of arc; at least an absolute value of 3 degrees of twist per one degree of arc; at least an absolute value of 4 degrees of twist per one degree of arc; at least an absolute value of 5 degrees of twist per one degree of arc; and other degrees of twist that are greater than, less than, and in between, these specified degrees of twist per degree of arc. Embodiments of a PME of the invention have at most (meaning less than) an absolute value of 0.01 degree of twist per one degree of arc; at least an absolute value of 0.05 degrees of twist per one degree of arc; at least an absolute value of 0.10 degree of twist per one degree of arc; at least an absolute value of 0.15 degrees of twist per one degree of arc; at least an absolute value of 0.20 degrees of twist per one degree of arc; at least an absolute value of 0.25 degrees of twist per one degree of arc; at least an absolute value of 0.50 degrees of twist per one degree of arc; at least an absolute value of 0.75 degrees of twist per one degree of arc; at least an absolute value of 1 degree of twist per one degree of arc; at least an absolute value of 2 degrees of twist per one degree of arc; at least an absolute value of 3 degrees of twist per one degree of arc; at least an absolute value of 4 degrees of twist per one degree of arc; at least an absolute value of 5 degrees of twist per one degree of arc; and other degrees of twist that are greater than, less than, and in between, these specified degrees of twist per degree of arc. For purposes of this specification, "a degree of arc" may also mean a length of a segment (portion, section) of a PME that is described (falls within) a degree of arc, e.g., irrespective of any curve of the segment. For example, an embodiment of a PME of the invention that has a twist of 1 degree per each degree of arc is considered to have that amount of twist (within the region described by the arc arising from a point at the center of the plane of rotation, whether such PME is curved or straight, for example. As discussed, the twist of a PME embodiment may vary over its length.

As one example, in an embodiment of a propeller of the invention that includes three blades (positioned about the hub every 120 degrees) and three pressure modifying elements, each pressure modifying element having a 120 degree twist between each of two adjacent blades to which it is attached, the cross-sectional angle of the pressure modifying element will change by substantially +1.0 degree for each +1.0 degree of arc, meaning that over 120 degrees of arc (the arc between a first point of attachment of a pressure modifying element or section to a first blade of the three-bladed propeller, and a second point of attachment of the same pressure modifying element or section to a second adjacent blade of the three-bladed propeller), such pressure modifying element of the invention will have a twist of 120 degrees. Notably, such an embodiment of a pressure modifying element of the invention may be discrete (e.g., one such pressure modifying element per blade), or continuous (e.g., considered as three sections).

As another example, in an embodiment of a propeller of the invention that includes three blades (positioned about the hub every 120 degrees) and three pressure modifying elements, each pressure modifying element having a 180 degree twist between each of two adjacent blades to which it is attached, the cross-sectional angle of the pressure modifying element will change by substantially +1.5 degree for each +1.0 degree of arc, meaning that over 120 degrees of arc (the arc between a first point of attachment of a pressure modifying element or section to a first blade of the three-bladed propeller, and a second point of attachment of the same pressure modifying element or section to a second adjacent blade of the three-bladed propeller), such pressure modifying element of the invention will have a twist of 180 degrees. Notably, such an embodiment of a pressure modifying element of the invention may be discrete (e.g., one such pressure modifying element associated with each blade), or continuous (e.g., considered as three sections of a single continuous structure).

As yet another example, in an embodiment of a propeller of the invention that includes four blades (positioned about the hub every 90 degrees) and four pressure modifying elements, each pressure modifying element having a 45 degree twist between each of two adjacent blades to which it is attached, the cross-sectional angle of the pressure modifying element will change by substantially +0.5 degree for every +1.0 degree of arc, meaning that over 90 degrees of arc (the arc between a first point of attachment of a pressure modifying element or section to a first blade of the four-bladed propeller, and a second point of attachment of the same pressure modifying element or section to a second adjacent blade of the four-bladed propeller), such pressure modifying element of the invention will have a twist of 45 degrees.

Notably, such an embodiment of a pressure modifying element of the invention may be discrete (e.g., one such pressure modifying element per blade, irrespective of the number of blade attachment points), or continuous (e.g., considered as four sections).

In one embodiment, a propeller of the invention designed to rotate clockwise to produce thrust or some other benefit includes one or more pressure modifying element having a clockwise direction of twist, meaning a positive degree change in a measure of cross-sectional angle per positive degree of arc as measured in a clockwise direction (e.g., the direction of intended rotation of the propeller). In another embodiment, a propeller of the invention designed to rotate clockwise to produce thrust or some other benefit includes one or more pressure modifying elements with a counterclockwise direction of twist, meaning a negative degree change in a measure of cross-sectional angle per positive degree of arc as measured in a clockwise direction (e.g., the direction of intended rotation of the propeller).

In another embodiment, a propeller of the invention designed to rotate counterclockwise to produce thrust or some other benefit includes one or more pressure modifying element having a clockwise direction of twist, meaning a positive degree change in a measure of cross-sectional angle per positive degree of arc as measured in a counterclockwise direction (e.g., direction of intended rotation of the propeller). In another embodiment, a propeller of the invention designed to rotate counterclockwise to produce thrust or some other benefit includes one or more pressure modifying elements with a counterclockwise direction of twist, meaning a negative degree change in a measure of cross-sectional angle per positive degree of arc as measured in a counterclockwise direction (e.g., direction of intended rotation of the propeller).

To be sure, a pressure modifying element with a clockwise twist will retain its clockwise twist irrespective of its direction of rotation (clockwise or counterclockwise direction of rotation), and a pressure modifying element with a counterclockwise twist will retain its counterclockwise twist irrespective of its direction of rotation (clockwise or counterclockwise direction of rotation). As discussed previously, a twist direction (clockwise or counterclockwise) is a concept that stays the same for a given PME (or PME segment) irrespective of the point from which it is viewed. Another way of stating this is that, for a given PME segment with a consistent direction of twist, if one travels down the elongated (longitudinal or long) axis of the PME segment, then the direction of the twist (clockwise or counterclockwise, e.g., change from one PME cross section to the next) is the same irrespective of direction of travel down the elongated axis of the PME.

Embodiments of the invention can include pressure modifying elements that have twist in both directions (e.g., a first pressure modifying element having a twist of +X degrees per +1 degree of arc, and a second pressure modifying element having a twist of −Y degrees per +1 degree of arc). Other embodiments of the invention can include a first pressure modifying element with a twist of x degrees in one direction, and a second pressure modifying element with a twist of y degrees in the same or opposite direction, where x and y are different or the same. Other twist configurations and variations are possible. For example, a single continuous PME can include different segments (sections, portions) having different twists, e.g., a first segment with a twist of a degrees per degree of arc, and a second segment with a twist of b degrees per degree of arc, where a and b have different values. Various combinations and variations relating to twist direction, extent, and variation are anticipated by embodiments of the invention.

An embodiment of a propeller of the invention includes a PME that has secondary blade-like structures (different from a propeller's blades), e.g., a first secondary blade-like structure that is positioned to one side of a plane of rotation that directs fluid flow inward (toward the hub), and a second secondary blade-like structure positioned to the other side of a plane of rotation that directs fluid flow outward (away from the hub). An embodiment includes a series of secondary blade-like structures mounted onto (or integrated into) a ringed support structure attached to a propeller's blades or posts. In such an embodiment, the secondary blade-like structure is a bisected PME having a space between its bisected portions. Each secondary blade-like structure may have additional (e.g., tertiary) blade-like structures arising therefrom.

An embodiment of the invention comprises at least one pressure modifying element. Another embodiment of the invention comprises at least two pressure modifying elements. Yet another embodiment of the invention comprises at least three pressure modifying elements. And yet another embodiment of the invention comprises four or more pressure modifying elements. Other embodiments of propellers of the invention include other greater numbers of pressure modifying elements. Notably, embodiments of propellers of the invention may have multiple pressure modifying elements that are substantially the same, or that are different.

An embodiment of the invention having blades has at least one pressure modifying element per blade. Another embodiment of the invention having blades has at least two pressure modifying elements per blade. Yet another embodiment of the invention having blades has at least three pressure modifying elements per blade. And yet another embodiment of the invention having blades includes at least four pressure modifying elements per blade. Other embodiments of propellers of the invention may include other numbers of pressure modifying elements per blade or attachment means (if other than a blade). Furthermore, embodiments of propellers of the invention may have pressure modifying elements that attach to one blade only, or that attach to two adjacent blades, or that attach to two non-adjacent blades (such as by extending over or around one or more intervening blades), or that attach to more than two blades. Embodiments of pressure modifying elements of the invention that attach to two or more blades may attach to the same or different locations at each blade to which they attach.

An embodiment of the invention comprises a propeller with two or more pressure modifying elements having substantially the same cross-sectional profiles (substantially the same amount of twist). Another embodiment of the invention is a propeller having two or more pressure modifying elements with different cross-sectional profiles (e.g., different degrees of twist).

The progression of twist of a pressure modifying element of an embodiment of the invention may be consistent (e.g., x degrees of twist per y degrees of arc is the same in a first segment of a pressure modifying element and a second segment of the same pressure modifying element). In another embodiment of the invention, the progression of twist of a pressure modifying element may not be consistent (e.g., x degrees of twist per y degrees of arc in a first segment of a pressure modifying element, and z degrees of twist per y degrees of arc in a second segment of the same pressure modifying element). In yet other embodiments of a pressure modifying element of the invention, the twist angle at a first position in an arc, and the twist angle at a second adjacent position in an arc, may be different (e.g., there can be a break in the twist). Such a break in twist may result from two separate pressure modifying elements being next to one another (e.g., end-to-end), or due to a space between two pressure modifying elements, as examples. Other variations of pressure modifying elements are possible and anticipated.

An embodiment of the invention comprises pressure modifying elements that do not overlap. An "overlap" means, for example, that a first pressure modifying element structure ends at a blade, or between two adjacent blades, before a second pressure modifying element structure starts (e.g., relative to an arc in a plane of rotation for a set of blades). For example, a possible embodiment of a propeller of the invention has three blades and three pressure modifying elements that do not overlap. Certain embodiments of the invention with non-overlapping pressure modifying elements may have the same number of blades and pressure modifying elements. Other embodiments of the invention with non-overlapping pressure modifying elements may have a different number of blades and pressure modifying elements.

Other embodiments of the invention include pressure modifying elements that do overlap. For example, an embodiment of a propeller of the invention may have ten blades and ten pressure modifying elements that overlap. As another example, a propeller of the invention may have ten blades along with twenty pressure modifying elements that overlap. Other embodiments of the invention with overlapping pressure modifying elements have the same number of blades and pressure modifying elements. Yet other embodiments of the invention having overlapping pressure modifying elements have a whole number (positive integer greater than zero) multiple of blades to pressure modifying elements (or of pressure modifying elements to blades), And in yet other embodiment, other ratios of pressure modifying elements to blades are possible.

Embodiments of a propeller of the invention may include two or more pressure modifying elements that reside in a single plane of rotation. Other embodiments of a propeller of the invention may include two or more pressure modifying elements that reside in different planes of rotation. Yet other embodiments have pressure modifying elements that extend out from a plane of rotation and into another plane of rotation (and possibly back into the first plane).

Embodiments of the invention can have a single, continuous pressure modifying element. As an example of such an embodiment, pressure modifying element is a single circular structure that has a 360 degree arc. As an example of this, an embodiment of a propeller of the invention has a continuous pressure modifying element attached to blades of the propeller at or near the tip of one or more (or possibly all) of the blades. In a related embodiment, a continuous pressure modifying element embodiment of the invention may include a continuous pressure modifying element that overlaps with a second pressure modifying element. A possible embodiment of the invention includes two continuous pressure modifying elements (e.g., that are arranged concentrically), meaning in essence that the two pressure modifying elements have 100% overlap. Other embodiments having non-overlapping and/or overlapping pressure modifying element configurations are possible and anticipated by the invention. Pressure modifying elements of the invention may exist substantially in the plane of rotation of a propeller, or in another plane, e.g., in a plane that is parallel to a plane of rotation of a propeller. In certain embodiments, a pressure modifying element may be positioned to one side of (or the other side of) the plane of rotation of the propeller, and may be attached to the propeller blades or hub using any of a wide range of possible attachment elements or means.

Embodiments of the invention have at least one pressure modifying element. Embodiments of a pressure modifying element (PME) of the invention include at least some twist, meaning that the twist of each such PME, whether the PME is a continuous 360 degree ring or a PME segment, have clockwise or counterclockwise twist greater than zero degrees for each degree of arc (if the segment is curved) or distance of length (if the segment is straight). Beyond having at least one PME, an embodiment of the invention can include a ring element or ring segment elements that have no twist, however these are not PMEs of the invention.

An embodiment of a PME has a single radius, e.g., the PME is attached to the tips of multiple blades of the same length. Another embodiment includes a PME with a decreasing radius, such that the PME (its longitudinal axis) spirals inwards, for example. Another embodiment includes a PME that has an increasing radius, such that the particular PME (its longitudinal axis) spirals outward, for example. Other PME designs are possible and anticipated by the invention.

In an embodiment of the invention, attachment of a pressure modifying element to a blade may be direct, meaning, for example, that the blade structure and pressure modifying element structure intersect (and at such points of intersection may be the same physical structure). In another embodiment of the invention, attachment of a pressure modifying element to a blade may be indirect, meaning, for example, that an intervening or connecting structure or element (e.g., joint, fin, pin, strut, non-aerodynamic structure) joins a blade structure and a pressure modifying element structure. In an embodiment, an intervening structure may be significantly aerodynamically neutral (e.g., designed for minimized fluid resistance) under certain conditions. In yet another possible embodiment, a pressure modifying element may be attachable and/or detachable from a propeller (e.g., hub and blades, or hub and attachment means), such as by attachment means that enable detachment. Such means are useful for easy (or easier) change or replacement of a pressure modifying element to a blade or propeller hub, which may be desirable in various practical or operating situations. Removeable or replaceable pressure modifying elements may be removeable, replaceable, attachable, and/or detachable by any of a wide range of means or element types, including but not limited to those that include at least one: screw, pin, lever, latch, magnet, adhesive, etc. Attachment means may be flexible, rigid, deformable, stretchable, compressible, controllable, self-healing, dynamically controlled, and more. Also, an embodiment of a PME (or portion of a PME) may be flexible, rigid, deformable, stretchable, compressible, controllable, self-healing, dynamically controlled, and more. For example, in the case of a rotor propeller having blades that independently tilt, the attachment means and/or the pressure modifying element may deform (e.g., flex, stretch, bend) in a way that enables such independent blade tilt. Furthermore, such deformation may operationally enhance the propeller embodiment's aerodynamic characteristics, e.g., production of lift.

In one embodiment of a propeller of the invention having blades, each pressure modifying element is attached to a single blade only (e.g., one pressure modifying element per blade). In such an embodiment, a pressure modifying element may be attached at (or near) the tip of a blade, as one example. In such an embodiment, the arc of a propeller's pressure modifying embodiment may be less than the arc between adjacent blades of the propeller. For example, the arc of a pressure modifying element of this type of embodiment used with a four-blade propeller (having 90 degrees of arc between each of its blades) may be 15 degrees. In another possible embodiment of a propeller with blades, a pressure modifying element is attached mid-blade, meaning at a position along the length of the blade that is located between the base and the tip of the blade. In other embodiments of pressure modifying elements having blades, each pressure modifying element is attached to two (or more) blades, such as a first blade and also a second adjacent blade. Pressure modifying elements of such embodiments may be attached at or near the tip of each blade, or at other positions on each blade (e.g., from mid-blade to mid-blade). In other embodiments of the invention, a pressure modifying element is attached at a first position on a first blade (e.g., at or near the tip of the first blade) and a second different position on a second blade (e.g., mid-blade of the second blade, or possibly even in proximity to the base of the second blade). In other embodiments, pressure modifying elements may be attached to more than two blades, and may be attached at the same or different positions on each blade. An example of such an embodiment has one or more pressure modifying elements that spiral inward (or outward). Embodiments of the invention include a pressure modifying element that is attached to each blade (to which the pressure modifying element is attached) in the same manner, e.g., directly to a blade, indirectly by means of a strut that connects the particular pressure modifying element and blade. Other embodiments of the invention include propellers having a pressure modifying element that is attached to each blade (to which the pressure modifying element is attached) in a different manner, e.g., direct at a first attachment point to a first blade, and indirect at a second attachment point to a second blade. As noted, other embodiments of propellers of the invention may have one or more PMEs, attachment means that connect each PME to the propeller's hub (or shaft), and no blades.

In a first possible embodiment of a three-blade propeller having a first blade, a second blade, and a third blade, one possible configuration of pressure modifying elements is: a single pressure modifying element is attached to the first blade, the second blade, and the third blade. In such an embodiment, the single continuous pressure modifying element may be attached to each blade at or near the respective blade's tip, mid-section or base. Furthermore, in such an embodiment, attachment of the pressure modifying element to each blade may be direct or indirect. Alternatively, a single pressure modifying element may spiral inward (or outward) throughout its arc, e.g., be attached to each blade at a different position.

In a second possible embodiment of a three-blade propeller having a first blade, a second blade, and a third blade, a second possible configuration of pressure modifying elements is: a first pressure modifying element is attached to the first blade; a second pressure modifying element is attached to the second blade; and a third pressure modifying element is attached to the third blade. In such an embodiment, each pressure modifying element may be attached to each blade at or near the respective blade's tip, mid-section or base (and may be the same or different at each blade). In such an embodiment, each pressure modifying element may be attached to only one blade (a configuration of one pressure modifying element per blade). Furthermore, in such an embodiment, attachment of a pressure modifying element to each blade may be direct or indirect (and may be the same or different at each blade).

In a third possible embodiment of a three-blade propeller having a first blade, a second blade, and a third blade, a third possible configuration of pressure modifying elements is: a first pressure modifying element is attached to the first blade and the second blade; a second pressure modifying element is attached to the second blade and the third blade; and a third pressure modifying element is attached to the third blade and the first blade. In such an embodiment, each pressure modifying element may be attached to each blade at or near the respective blade's tip, mid-section or base (and may be the same or different at each blade). Furthermore, in such an embodiment, attachment of a pressure modifying element to each blade may be direct or indirect (and may be the same or different at each blade).

In a fourth possible embodiment of a three-blade propeller having a first blade, a second blade, and a third blade, a fourth possible configuration of pressure modifying elements is: a first pressure modifying element is attached to the first blade at or near its tip, and the second blade at or near its mid-point, and the third blade at or near its base; a second pressure modifying element is attached to the second blade at or near its tip, and the third blade at or near its mid-point, and the first blade at or near its base; and a third pressure modifying element is attached to the third blade at or near its tip, and the first blade at or near its mid-point, and the second blade at or near its base. Furthermore, in such an embodiment, attachment of a pressure modifying element to each blade may be direct or indirect, and may have the same or different means of attachment at each element and/or blade.

In a first possible embodiment of a four-blade propeller having a first blade, a second blade, a third blade, and a fourth blade, one possible configuration of pressure modifying elements is: a first continuous pressure modifying element is attached to the first blade, the second blade, the third blade, and the fourth blade. In such an embodiment, a single continuous pressure modifying element may be attached to each blade at or near the respective blade's tip, mid-section or base (same for all blades). Furthermore, in such an embodiment, attachment of the pressure modifying element to each blade may be direct or indirect. Alternatively, a single pressure modifying element may spiral inward (or outward) throughout its arc.

In a second possible embodiment of a four-blade propeller having a first blade, a second blade, a third blade, and a fourth blade, a possible configuration of pressure modifying elements is: a first pressure modifying element is attached to the first blade; a second pressure modifying element is attached to the second blade; a third pressure modifying element is attached to the third blade; and a fourth pressure modifying element is attached to the fourth blade. In such an embodiment, each pressure modifying element may be attached to each blade at or near the respective blade's tip, mid-section or base (and may be the same or different at each blade). Furthermore, in such an embodiment, attachment of a pressure modifying element to each blade may be direct or indirect (and may be the same or different at each blade). In such an embodiment, each pressure modifying element may be attached to only one blade, e.g., a configuration whereby each blade has only one pressure modifying element attached.

In a third possible embodiment of a four-blade propeller having a first blade, a second blade, a third blade, and a fourth blade, a possible configuration of pressure modifying elements is: a first pressure modifying element is attached to the first blade and the second blade; a second pressure modifying element is attached to the second blade and the third blade; a third pressure modifying element is attached to the third blade and the fourth blade; and a fourth pressure modifying element is attached to the fourth blade and the first blade. In such an embodiment, each pressure modifying element may be attached to a blade at or near each respective blade's tip, mid-section or base (and may be the same or different at each blade). Furthermore, in such an embodiment, attachment of a pressure modifying element to each blade may be direct or indirect (and may be the same or different at each blade).

In a fourth possible embodiment of a four-blade propeller having a first blade, a second blade, a third blade, and a fourth blade, a possible configuration of pressure modifying elements is: a first pressure modifying element is attached to the first blade and the second blade and the third blade; a second pressure modifying element is attached to the second blade and the third blade and the fourth blade; a third pressure modifying element is attached to the third blade and the fourth blade and the first blade; and a fourth pressure modifying element is attached to the fourth blade and the first blade and the second blade. In such an embodiment, each pressure modifying element may be attached to a blade at or near each respective blade's tip, mid-section or base (and may be the same or different at each blade). Furthermore, in such an embodiment, attachment of a pressure modifying element to each blade may be direct or indirect (and may be the same or different at each blade).

In a fifth possible embodiment of a four-blade propeller having a first blade, a second blade, a third blade, and a fourth blade, a possible configuration of pressure modifying elements is: a first pressure modifying element is attached to all of the blades; a second pressure modifying element is attached to all of the blades; and a third pressure modifying element is attached to all of the blades. In such an embodiment, each pressure modifying element may be attached to each blade at or near the respective blade's tip, mid-section or base (and may be the same or different at each blade). Furthermore, in such an embodiment, attachment of a pressure modifying element to each blade may be direct or indirect (and may be the same or different at each blade). Such embodiments may include pressure-modified elements configured in an inward (or outward) spiraled arrangement, or configurations whereby each of the multiple pressure modifying elements are arrange concentrically.

Embodiments of pressure modifying elements of the invention may be static, meaning their position and shape remain substantially unchanged (or unchangeable) during rotation. Other embodiments of pressure modifying elements of the invention may be dynamic in nature, meaning that their position and/or shape changes during operation (e.g., rotation). Such dynamic PME characteristics may result from the material construction of an embodiment of a pressure modifying element (e.g., made of a material that is responsive to various forces), or by means of mechanisms, such as dynamic attachment means that change shape or position with certain parameter changes (e.g., ambient temperature, propeller RPMs, airflow direction or speed), as examples. As one example, a flexible polymer pressure modifying element changes shape as the speed of propeller rotation increases. Such a change in shape may create specific aerodynamic changes, possibly to cause desired performance characteristics at different speeds of rotation, or operation of a propeller under varying conditions. Other embodiments of PMEs may be attached to a propeller using means that enable the pressure modifying element to change position relative to a blade or other structure of the propeller. Such pressure modifying element positional changes may be induced by forces experienced during operation (e.g., rotation) of the propeller. Movement of a PME relative to other propeller elements (e.g., blades or posts) may be facilitated by flexible attachment means, flexible struts, hinges, and other possible arrangements or types of materials and attachment means. Certain embodiments of the invention include pressure modifying elements that flex to thereby change shape and/or position during operation (e.g., rotation) of the propeller to which they are attached. A PME embodiment may be designed to be flexible or rigid, depending on its intended application.

Embodiments of pressure modifying elements may have cross-sections that are generally flat, symmetric, asymmetric, aerodynamic (e.g., similar to a cross-section of a traditional aircraft wing or blade), or otherwise. Shape, thickness and chord of a pressure modifying element of the invention may be generally consistent along a length (e.g., arc), or may vary. For example, an embodiment of a pressure modifying element may include a flat wide segment at or near its points of attachment to adjacent propeller blade tips, and a less wide (and possibly also less flat) segment in between these points of attachment. An embodiment of a pressure modifying element of the invention may have a first cross-sectional profile at or near a first point of attachment to a first attachment means, and a second cross-sectional profile at or near a second point of attachment to a second attachment means. Embodiments have cross-sections that produce a desired aerodynamic or fluid flow effects during operation (e.g., rotation).

PME cross sections can have other designs and shapes. In an embodiment, a PME cross section is symmetric. In an embodiment, a PME cross section is asymmetric. Embodiments of PMEs can include the same cross section throughout, or varying (same or different) cross sections. In an embodiment, a cross section may star shaped (e.g., having three, four, five, or more 'points' that emanate from a central region of the cross section). Many other cross sectional designs are possible and anticipated by the invention. Embodiments of PMEs also include appendages. An example of an appendage is a (stabilizer) tab. Another example of an appendage is a structure that improves or otherwise modifies the flow of a fluid over a surface of a PME. Embodiments of pressure modifying elements of the invention can include modifications to a surface. An embodiment of a PME of the invention can include any one or more of these elements: tabs, indents, holes, channels, textures, surface modifications, or combinations of these. Any of these elements may be useful to facilitate smoother or more turbulent flow of a fluid during operation—e.g., rotation—of the propeller including the PME, to thereby further modify the operational characteristics of the particular propeller, for example.

The aforementioned embodiments of the invention serve as examples for how the invention may be implemented for propellers having at least two blades (or attachment means other than blades). This includes embodiments of propellers of the invention with a single continuous pressure modifying element attached to all blades (or attachment means other than blades); embodiments of propellers having a pressure modifying element that is attached to a single blade, e.g., one pressure modifying element per blade for some or all blades of a propeller (or attachment means other than blades); embodiments of propellers of the invention having pressure modifying elements that are attached to at least two blades, e.g., adjacent blades (or attachment means other than blades); and embodiments of propellers of the invention having pressure modifying elements attached to all blades, possibly including multiple PMEs attached to all blades (or to attachment means other than blades). Other configurations of blades (or attachment means that are other than blades, e.g., posts) and pressure modifying elements—including their numbers, locations and means of attachment—are possible and anticipated by the invention. Embodiments of the invention anticipate pressure modifying elements with different shapes, curvatures, lengths, cross-sectional profiles, means of attachment, points of attachment (e.g., to blades), twist (e.g., degree of twist per degree of arc), twist variation (e.g., consistency or inconsistency in twist along a length of a pressure modifying element), twist direction (e.g., clockwise, counterclockwise), differences in twist of one or more pressure modifying elements of a propeller, materials, surface features and textures (e.g., to modify airflow), tabs, appendages, control surfaces, sensors, dynamic response(s), and more.

Embodiments of elements (e.g., hub, blades, pressure modifying elements) the invention can be made with any of a diverse range of materials, including but not limited to: metal, plastic, polymer, composite, ceramic, biological material, and other materials, and combinations of these, as examples. Elements of the invention can be made (manufactured, fabricated) using any of a variety of techniques, including but not limited to: molding (e.g., injection molding), extrusion, three-dimensional (3-D) printing, forming, stamping, plating (e.g., electroplating), assembling, fabricating, finishing, coating, painting, layering, and various other manufacturing techniques, including combinations of these. Embodiments of propellers of the invention can be made using three-dimensional printing techniques. Embodiments of the invention can have two blades, three blades, four blades, five blades, more than five blades, or no blades. Certain embodiments of the invention may only have a hub and attachment means for one or more pressure modifying elements (e.g., no blades). Embodiments of the invention have a radius of x, where 0.001 centimeter≤x≤1.0 centimeter. Other embodiments of the invention may have a radius of y, where 1.0 centimeter≤y≤1.0 meter. Yet other embodiments of the invention may have a radius of z, where 1.0 meter≤z≤10.0 meters. Embodiments of the invention have an overall diameter that is at least (greater than) zero centimeters, 1 centimeter, 5 centimeters, 10 centimeters, 50 centimeters, 1 meter, 5 meters, 10 meters, 25 meters, 50 meters, 100 meters, as well as other possible overall diameters and dimensions. Furthermore, embodiments of the invention have an overall diameter that is less than 1 centimeter, 5 centimeters, 10 centimeters, 50 centimeters, 1 meter, 5 meters, 10 meters, 25 meters, 50 meters, and 100 meters, as a few examples. In addition, PMEs of the invention can have overall (maximum) cross sectional measurements that are at least (greater than) zero centimeters, 1 centimeter, 5 centimeters, 10 centimeters, 50 centimeters, 1 meter, 5 meters, 10 meters, 25 meters, 50 meters, 100 meters, and more. Furthermore, embodiments of PMEs of the invention have an overall diameter that is less than 1 centimeter, 5 centimeters, 10 centimeters, 50 centimeters, 1 meter, 5 meters, and 10 meters, as a few examples. Any of these dimensions, as minimums or maximums, can apply to other elements of embodiments of propellers of the invention. Smaller and larger dimensions are possible for embodiments of the invention. For example, embodiments of the invention used for wind power generation may have dimensions that are in excess of 10 meters. Embodiments of the invention used for scientific or medical device applications may have overall dimensions that are less than 0.1 centimeter. An embodiment of the invention has an overall diameter of 1.0 meter and a PME cross-section maximum measurement of 5 centimeters. Embodiments of the invention, in general, may assume their dimensions, irrespective of any specific configurations, use of blades, existence of blades, etc. Dimensions of an embodiment may change during the operation (e.g., rotation) of a propeller, or for other reasons, or due to other causes (e.g., an input from a control, or output from an actuator). Furthermore, embodiments of airfoils of the invention may include any of a wide range and variety of chord lengths, cross-sectional profiles (e.g., airfoils, either symmetric or asymmetric), twist angles and profiles, materials, and more. The dimensions of various elements of embodiments may be consistent, or may vary.

In embodiments of the invention, a propeller includes a hub, one or more pressure modifying elements, and attachment means that connect the one or more pressure modifying elements to the hub. In one such embodiment, the pressure modifying element is sufficient to produce thrust (or lift), such as in the case that the propeller is rotated for such purpose, e.g., a novel bladeless propeller that pulls or pushes an aircraft through the air. In another embodiment, a pressure modifying element is caused to rotate by a fluid, such as a wind, to turn a shaft in order to produce or store energy (e.g., electric), for example. In propeller embodiments of the invention without blades, attachment means may be substantially stable, or flexible. Flexible attachment means may be: tethers, lines, cables, ropes, flexible struts, as examples.

In an embodiment of the invention, the relationship between a blade and a pressure modifying element is generally fixed, meaning the blade and pressure modifying element do not generally move relative to one another. In other possible embodiments of the invention, the relationship between a blade and a pressure modifying element is dynamic, meaning that the blade and the pressure modifying element can move relative to one another. In one possible embodiment of a dynamic relationship between a blade and an associated pressure modifying element, a hinge allows for movement between these elements. In another possible embodiment of a dynamic relationship between a blade and an associated pressure modifying element, a structure may enable controlled movement of one of the elements relative to the other of the elements, such as controlled rotation of a blade (e.g., to change its pitch or angle of attack) within an outer-ring (attached at the blade tips) continuous pressure modifying element by means of an appendage at the end of a blade, and a receptacle for the appendage (that allows for rotation of the blade) positioned at an inner-facing surface of the pressure modifying element. This enables certain embodiments of the invention to accommodate variable-pitch propeller blades—and some of these embodiments can be used to stabilize variable-pitch propeller blades during operation.

Embodiments of propellers of the invention having at least one pressure modifying element cause fluid pressure at a first side of a plane of rotation to increase during rotation, and fluid pressure at the second (opposite) side of the plane of rotation to decrease during rotation. In certain embodiments the invention, such increase or decrease in pressure may be absolute. In other embodiments of the invention, such increase or decrease in pressure may be relative, e.g., relative to what the pressure would be without a pressure modifying element of the invention, for example. The extent to which fluid pressure is increased or decreased depends, at least in part, on the design of the propeller including its PME(s), rotation speed (revolutions per minute), direction of rotation of the propeller (e.g., clockwise, counterclockwise), pressure modifying elements (e.g., design, shape, size, number), and fluid characteristics. Other factors will also influence the operational characteristics of embodiments of the invention, including ambient parameters, e.g., pressure, temperature, preexisting fluid flow, and more.

Pressure modifying elements of the invention may include one or more sensors. Each sensor may be embedded within a pressure modifying element structure, or positioned at its surface. Each sensor may sense any one or more of a variety of parameters, including but not limited to: operating cycles, speed, position, location, movement, acceleration, temperature, airflow, flex of an element, and more. Embodiments of sensors of the invention communicate (e.g., transmit and/or receive) sensed, derived or stored data using wired or wireless means (e.g., Bluetooth). Data may be used to modify the structure of the propeller or otherwise control the propeller. Sensed information may also be utilized directly, e.g., a sensor that changes shape to thereby cause a response in a PME (e.g., change in position of the PME, change in shape), For example, a sensor may be used to determine that a PME of the invention is causing suboptimal airflow, and such determination may be used to control the shape of the PME in order to improve airflow. Embodiments of the invention can employ any of a wide range of sensors.

Embodiments of propellers of the invention incorporate electronic, electromechanical, and hydraulic means, as well. For example, an embodiment of a pressure modifying element of the invention may include an electric heating element. Alternatively, for example, an embodiment of a propeller of the invention may include an electromechanical actuator that enables the repositioning of a pressure modifying element relative to a blade or attachment means. An embodiment of the invention may also include channels or conduits for fluid transfer. Such channels or conduits may be useful for distribution or dissemination of a second fluid that is different from the first fluid in which the propeller embodiment is operating.

Embodiments of propellers of the invention may also include ionic propulsion means, such as an ion thruster, ion drive or ionic wind technology, to thereby provide synergistic thrust or other benefits. Other propulsion means are also possible and anticipated by the invention. Embodiments of propellers of the invention are also useful within casings. In this case, the casing may enable (free or controlled) rotation of a PME within the casing, possibly using attachment means that are (or are attached to) an interior surface of such an enclosure. For example, an embodiment of a continuous pressure modifying element of the invention has attachment means that connect the PME to a ring or other structure that enables rotation of the PME within a casing (and in such an embodiment the PME may not be attached to a hub, and such an embodiment may not include a central hub). This type of embodiment enables novel turbine designs and configurations that do not necessitate or use turbine blades. In one embodiment, a PME is rotatably secured within an enclosure by magnetic means.

Embodiments of pressure modifying elements of the invention may be (directly or indirectly) attached to a hub or shaft, in order to facilitate their rotation. Other embodiments of pressure modifying elements may be rotated by other structures or means. For example, one possible embodiment of a propeller of the invention may have an external structure (and a central open space) that retains and rotates a continuous circular pressure modifying element within its central open space. Such retention and rotation could be facilitated by magnetic means, for example. In yet other embodiments of pressure modifying elements of the invention, such pressure modifying elements are rotated by propulsion means incorporated onto (or otherwise associated with) the pressure modifying element, such thrust-producing mechanisms attached to an outer perimeter of a pressure modifying element. Such a pressure modifying element may be attached to other objects via a hub and shaft, or using other attachment means, such as magnetic attachment means, or flexible attachment means, etc. An embodiment of a pressure modifying element may float within a structure or driver means, or casing or enclosure.

An embodiment of a propeller of the invention comprises two pressure modifying elements, a first pressure modifying element having a positive twist (e.g., +x degrees per +1 degree of arc), and a second pressure modifying element (of substantially the same overall dimensions) with a negative twist (e.g., −x degrees per +1 degree of arc, wherein the arc is measured in the same direction for both the first and second pressure modifying elements), and a space (or gap) in between the first pressure modifying element and the second pressure modifying element, wherein the two pressure modifying elements are stacked (meaning they both rotate around substantially the same axis). Embodiments of such propellers of the invention can have more than two pressure modifying elements, with additional elements being stacked or concentric. In embodiments where multiple pressure modifying elements are stacked, adjacent pressure modifying elements have opposite twist directions (e.g., a first PME that has a positive twist direction, a second adjacent PME that has a negative twist direction, a third PME with a positive direction of twist, a fourth PMD with a negative direction of twist, etc.). Other embodiments of stacked-PMEs can also include concentric PMEs, meaning that a smaller-diameter pressure modifying element may reside within (e.g., at the interior of) a larger pressure modifying element of the invention. Certain such embodiments of propellers having stacked PMEs of the invention have the ability to create inward thrust (e.g., propel a fluid outward between two opposite-twist PMEs during rotation). Certain other such embodiments of propellers having stacked PMEs of the invention have the ability to create outward thrust (e.g., propel a fluid outward between two opposite-twist PMEs during rotation). Yet certain other embodiments of propellers having (e.g., three or more) stacked PMEs of the invention have the ability to create both inward and outward thrust (e.g., propel a fluid outward between two opposite-twist PMEs during rotation), and provide novel benefits for mixing or blending applications, for example.

FIG. 1A shows a perspective view of an embodiment of a 4 blade propeller 100 with a continuous pressure modifying element 150 having a 180 degree counterclockwise twist between adjacent blades 120a, 120b, 120c, 120d (2.0 degrees of clockwise twist for every 1.0 degree of arc moving in a clockwise direction). In FIG. 1A, the propeller 100 has a central hub 110, and each of four blades 120a, 120b, 120c, 120d extend out from the hub 110. The continuous pressure modifying element 150 is attached to each blade 120a, 120b, 120c, 120d distal end in an orientation (of the long axis of the cross-section of the pressure modifying element 150) that is substantially perpendicular to the plane of rotation of the propeller embodiment 100.

Figure 1B:
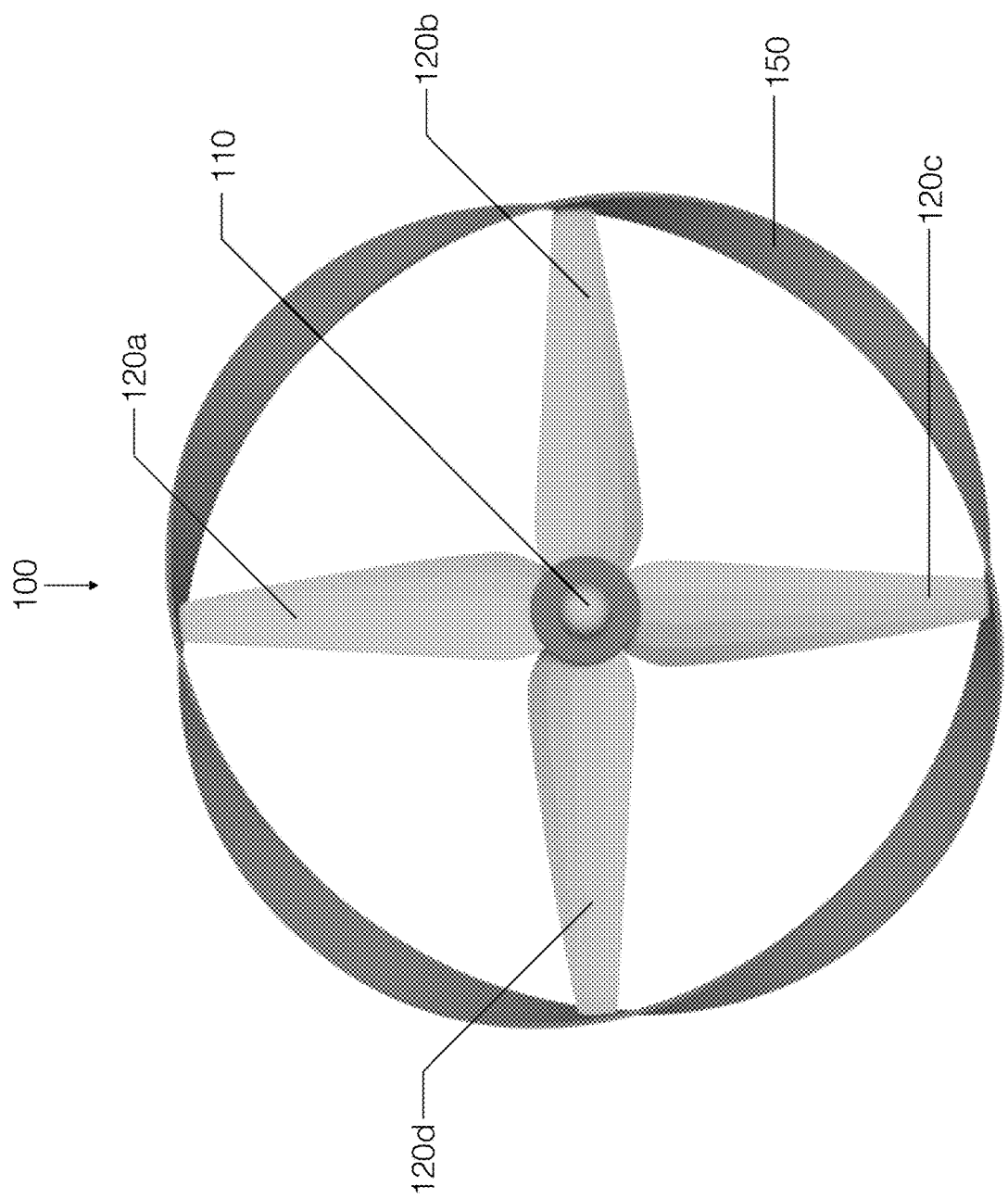
FIG. 1B shows a top down view of an embodiment of a 4 blade propeller with a continuous Pressure Modifying Element having a 180 degree counterclockwise twist between adjacent blades, and that is attached to the blade tips in an orientation that is perpendicular to the plane of rotation.

FIG. 1B shows a top down view of an embodiment of a 4 blade propeller 100 with a continuous pressure modifying element 150 having a 180 degree counterclockwise twist between adjacent blades 120a, 120b, 120c, 120d (2.0 degrees of clockwise twist for every 1.0 degree of arc moving in a clockwise direction). In FIG. 1B, the propeller 100 has a central hub 110, and each of four blades 120a, 120b, 120c, 120d extend out from the hub 110. The continuous pressure modifying element 150 is attached to each blade 120a, 120b, 120c, 120d distal end in an orientation (of the long axis of the cross-section of the pressure modifying element 150) that is substantially perpendicular to the plane of rotation of the propeller embodiment 100.

Figure 1C:
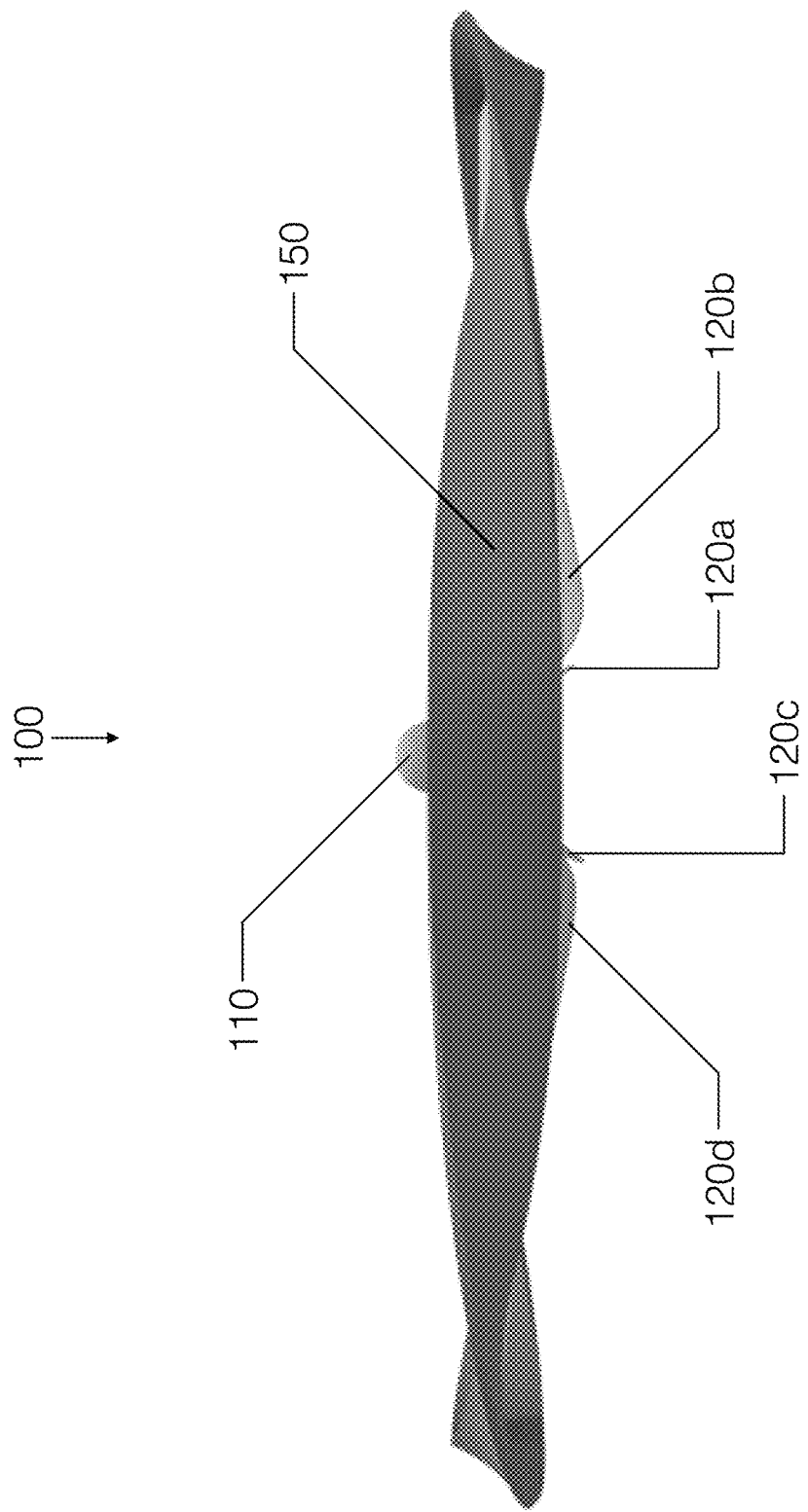
FIG. 1C shows a side view of an embodiment of a 4 blade propeller with a continuous Pressure Modifying Element having a 180 degree counterclockwise twist between adjacent blades, and that is attached to the propeller tips in an orientation that is perpendicular to the plane of rotation.

FIG. 1C shows a side view of an embodiment of a 4 blade propeller 100 with a continuous pressure modifying element 150 having a 180 degree counterclockwise twist between adjacent blades 120a, 120b, 120c, 120d (2.0 degrees of clockwise twist for every 1.0 degree of arc moving in a clockwise direction). In FIG. 1C, the propeller 100 has a central hub 110, and each of four blades 120a, 120b, 120c, 120d extend out from the hub 110. The continuous pressure modifying element 150 is attached to each blade 120a, 120b, 120c, 120d distal end in an orientation (of the long axis of the cross-section of the pressure modifying element 150) that is substantially perpendicular to the plane of rotation of the propeller embodiment 100.

Figure 2A:
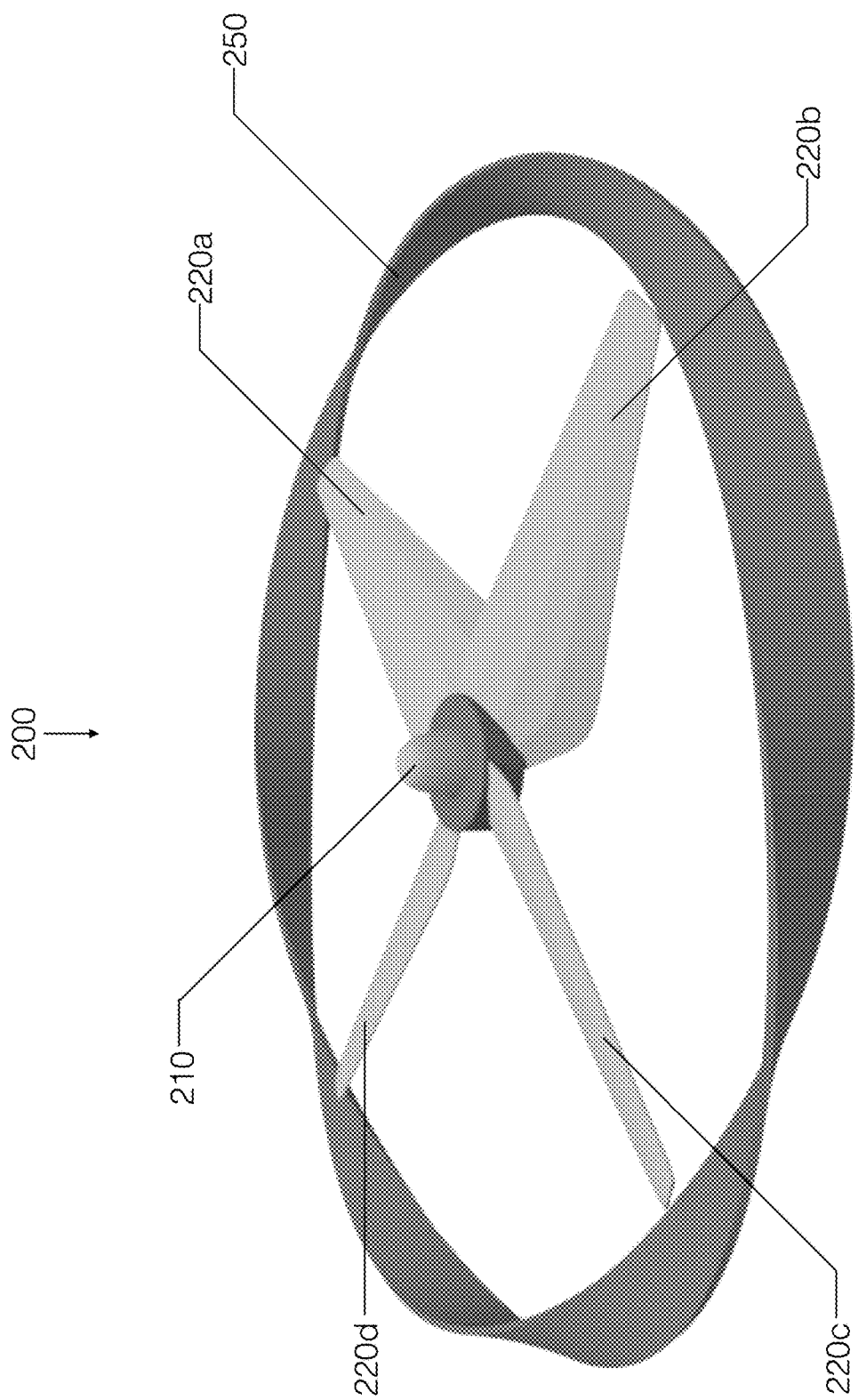
FIG. 2A shows a perspective view of an embodiment of a 4 blade propeller with a continuous Pressure Modifying Element having a 180 degree counterclockwise twist between adjacent blades, and that is attached to the blade tips in an orientation that is parallel to the plane of rotation.

FIG. 2A shows a perspective view of an embodiment of a 4 blade propeller 200 with a continuous pressure modifying element 250 having a 180 degree counterclockwise twist between adjacent blades 220a, 220b, 220c, 220d (2.0 degrees of clockwise twist for every 1.0 degree of arc moving in a clockwise direction). In FIG. 2A, the propeller 200 has a central hub 210, and each of four blades 220a, 220b, 220c, 220d extend out from the hub 210. The continuous pressure modifying element 250 is attached to each blade 220a, 220b, 220c, 220d distal end in an orientation (of the long axis of the cross-section of the pressure modifying element 250) that is substantially parallel to the plane of rotation of the propeller embodiment 200.

Figure 2B:
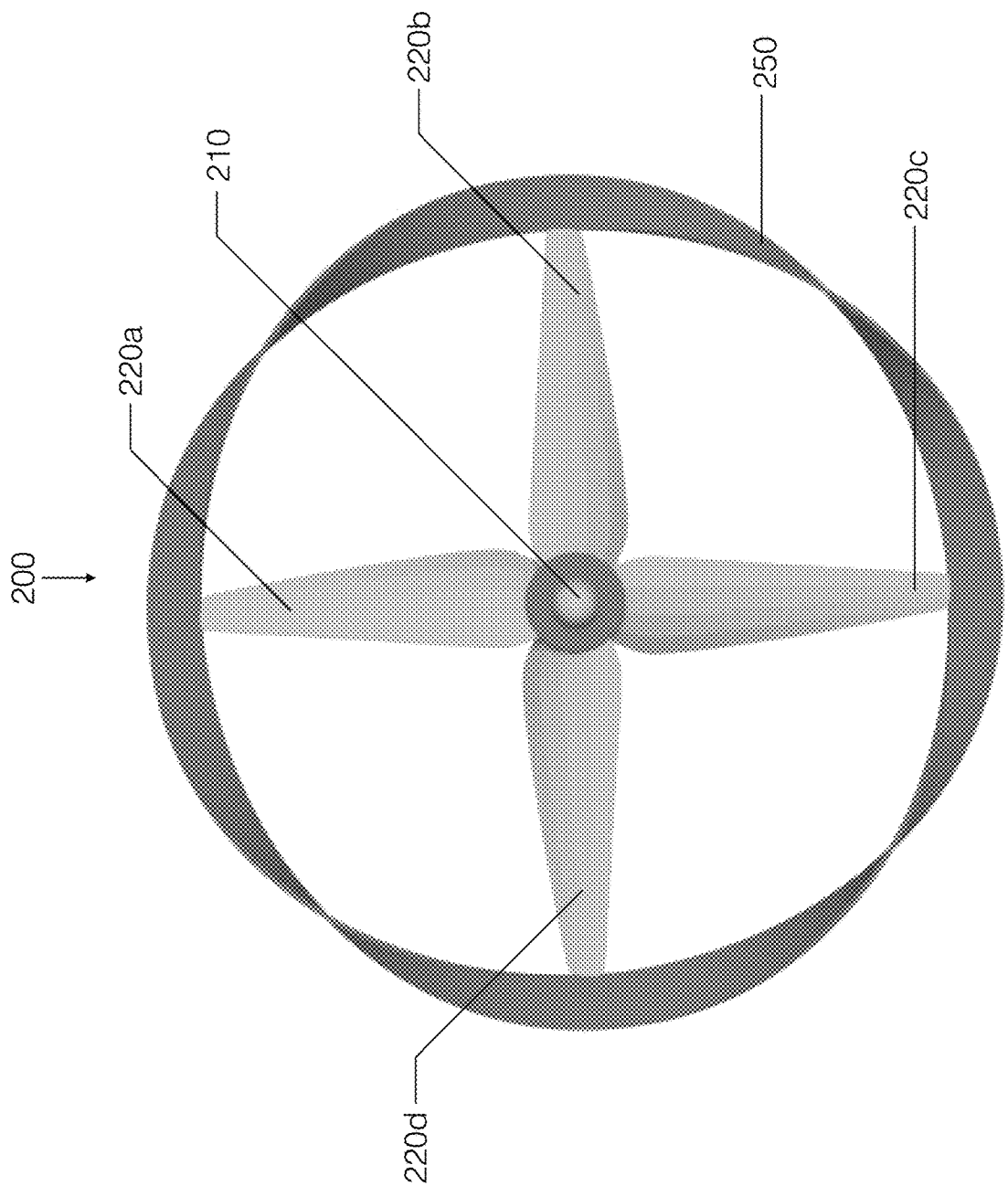
FIG. 2B shows a top down view of an embodiment of a 4 blade propeller with a continuous Pressure Modifying Element having a 180 degree counterclockwise twist between adjacent blades, and that is attached to the blade tips in an orientation that is parallel to the plane of rotation.

FIG. 2B shows a top down view of an embodiment of a 4 blade propeller 200 with a continuous pressure modifying element 250 having a 180 degree counterclockwise twist between adjacent blades 220a, 220b, 220c, 220d (2.0 degrees of clockwise twist for every 1.0 degree of arc moving in a clockwise direction). In FIG. 2B, the propeller 200 has a central hub 210, and each of four blades 220a, 220b, 220c, 220d extend out from the hub 210. The continuous pressure modifying element 250 is attached to each blade 220a, 220b, 220c, 220d distal end in an orientation (of the long axis of the cross-section of the pressure modifying element 250) that is substantially parallel to the plane of rotation of the propeller embodiment 200.

Figure 2C:
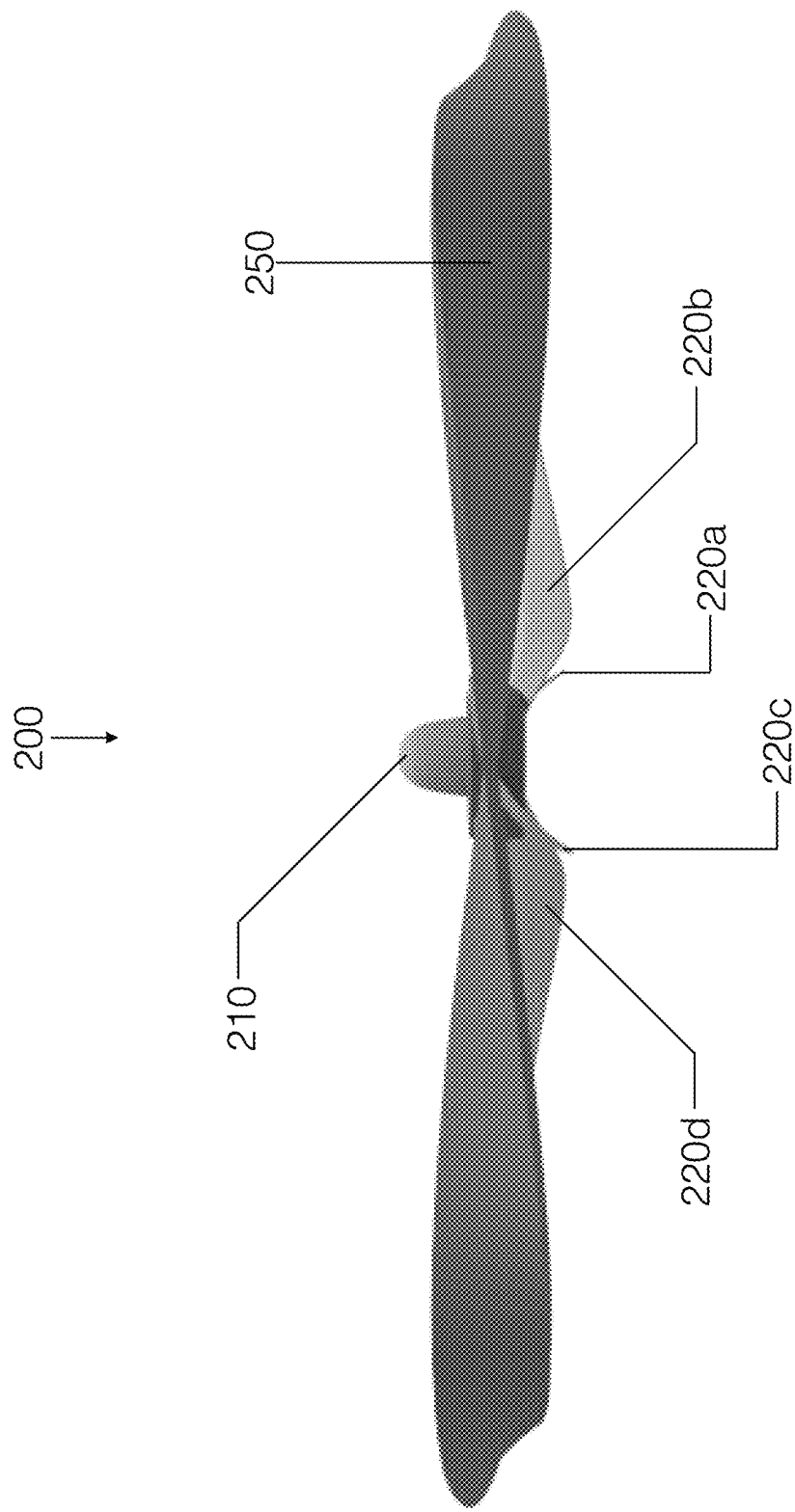
FIG. 2C shows a side view of an embodiment of a 4 blade propeller with a continuous Pressure Modifying Element having a 180 degree counterclockwise twist between adjacent blades, and that is attached to the blade tips in an orientation that is parallel to the plane of rotation.

FIG. 2C shows a side view of an embodiment of a 4 blade propeller 200 with a continuous pressure modifying element 250 having a 180 degree counterclockwise twist between adjacent blades 220a, 220b, 220c, 220d (2.0 degrees of clockwise twist for every 1.0 degree of arc moving in a clockwise direction). In FIG. 2C, the propeller 200 has a central hub 210, and each of four blades 220a, 220b, 220c, 220d extend out from the hub 210. The continuous pressure modifying element 250 is attached to each blade 220a, 220b, 220c, 220d distal end in an orientation (of the long axis of the cross-section of the pressure modifying element 250) that is substantially parallel to the plane of rotation of the propeller embodiment 200.

FIG. 3A shows a perspective view 300 of an embodiment of a continuous Pressure Modifying Element 350 having 720 degrees of counterclockwise twist over its entire arc.

Figure 3B:
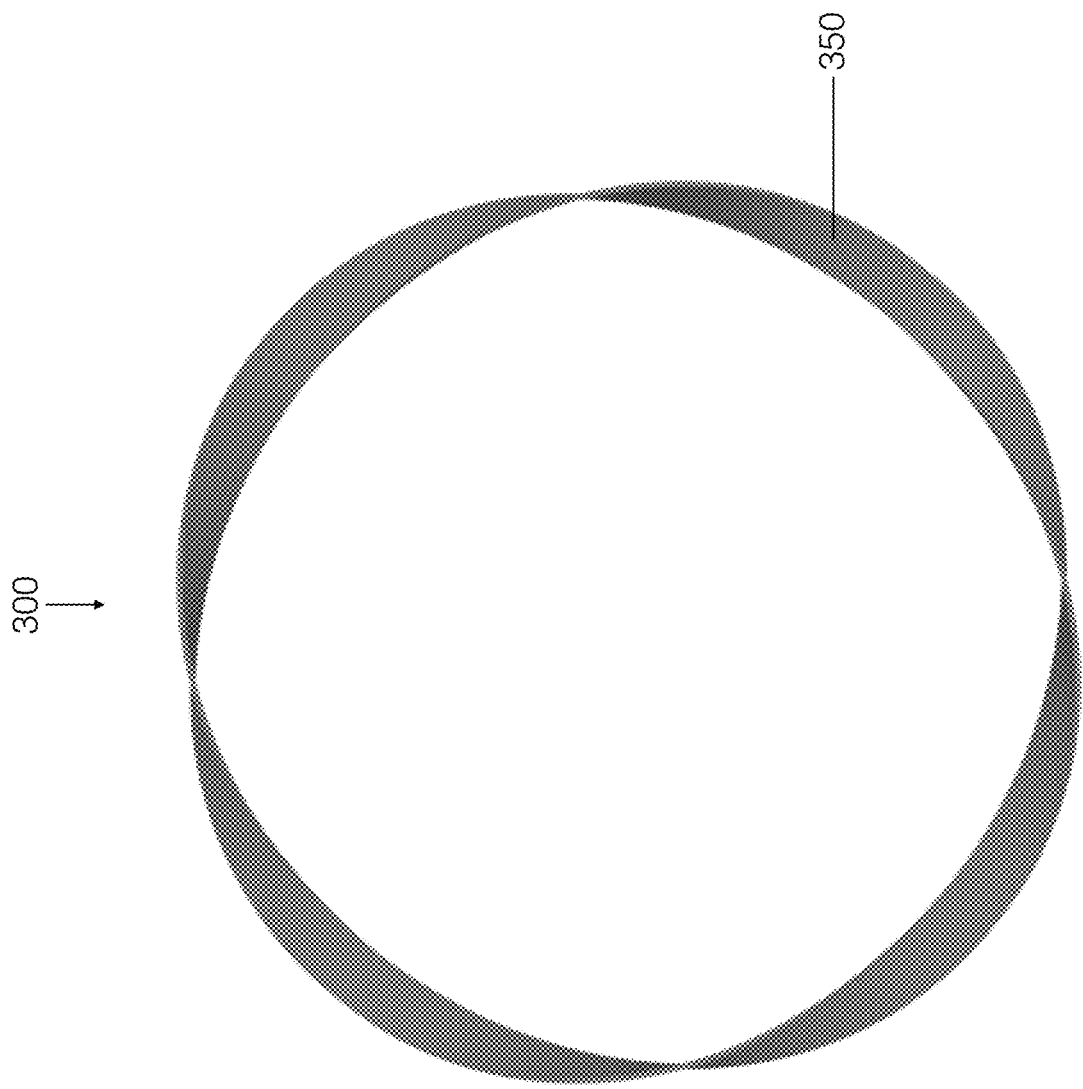
FIG. 3B shows a top down view of an embodiment of a continuous Pressure Modifying Element having 720 degrees of counterclockwise twist over its entire arc.

FIG. 3B shows a top down view 300 of an embodiment of a continuous Pressure Modifying Element 350 having 720 degrees of counterclockwise twist over its entire arc.

Figure 3C:
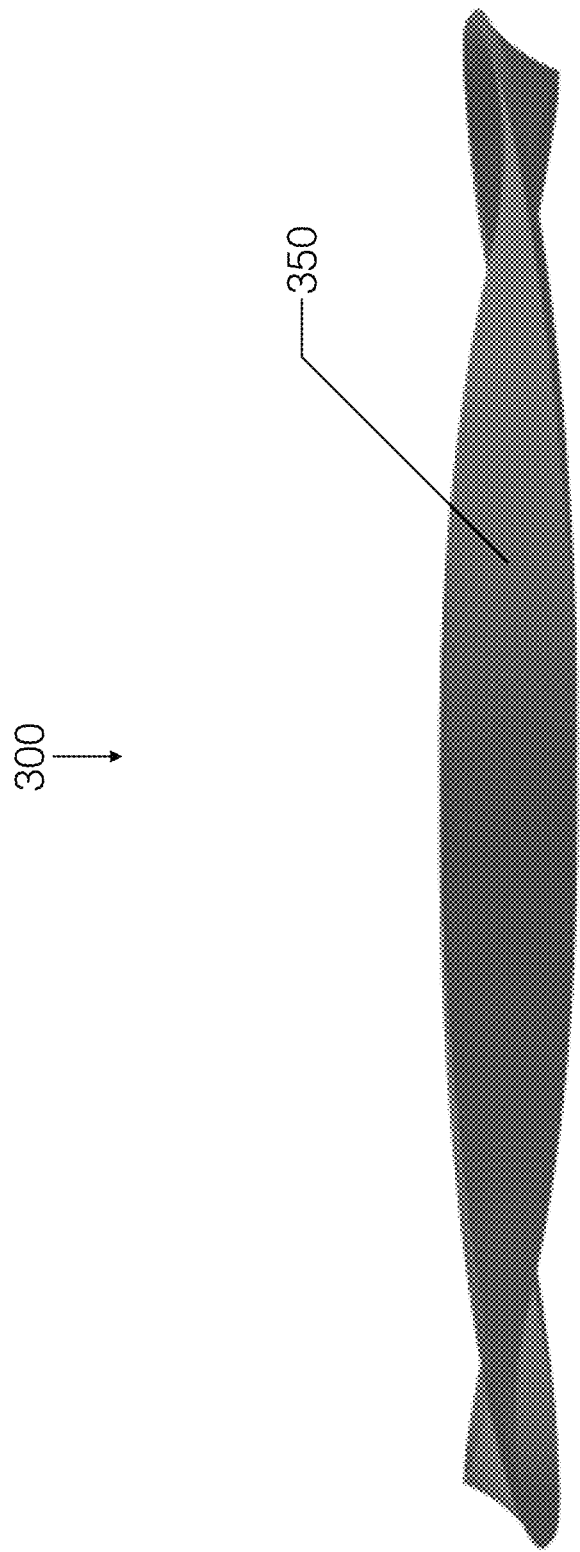
FIG. 3C shows a side view of an embodiment of a continuous Pressure Modifying Element having 720 degrees of counterclockwise twist over its entire arc.

FIG. 3C shows a side view 300 of an embodiment of a continuous Pressure Modifying Element 350 having 720 degrees of counterclockwise twist over its entire arc.

Figure 4A:
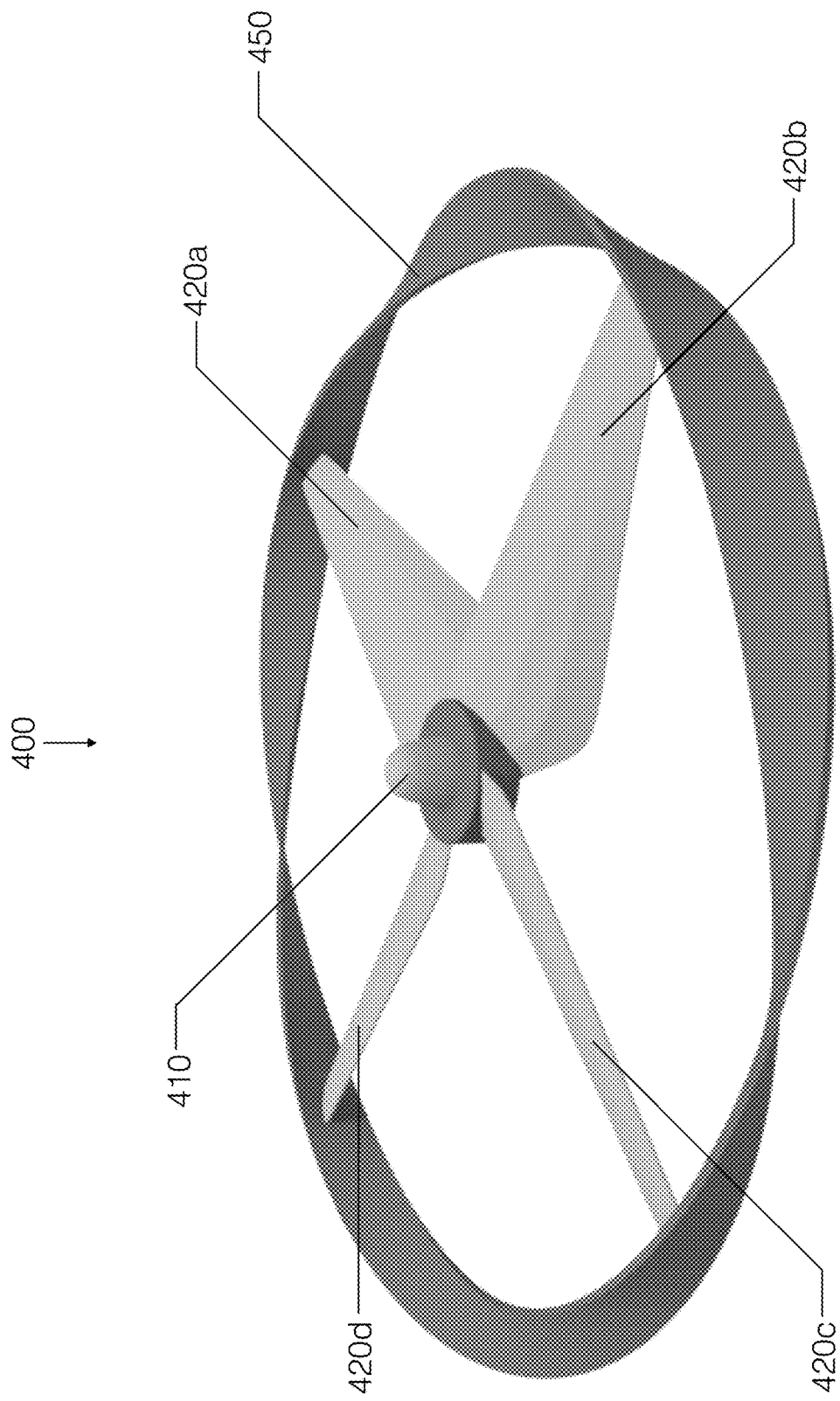
FIG. 4A shows a perspective view of an embodiment of a 4 blade propeller with a continuous Pressure Modifying Element having a 180 degree clockwise twist between adjacent blades, and that is attached to the blade tips in an orientation that is perpendicular to the plane of rotation.

FIG. 4A shows a perspective view of an embodiment of a 4 blade propeller 400 with a continuous pressure modifying element 450 having a 180 degree clockwise twist between adjacent blades 420a, 420b, 420c, 420d (2.0 degrees of clockwise twist for every 1.0 degree of arc moving in a clockwise direction). In FIG. 4A, the propeller 400 has a central hub 410, and each of four blades 420a, 420b, 420c, 420d emanate out from the hub 410. The continuous pressure modifying element 450 is attached to each blade 420a, 420b, 420c, 420d distal end in an orientation (of the long axis of the cross-section of the pressure modifying element 450) that is substantially perpendicular to the plane of rotation of the propeller embodiment 400.

Figure 4B:
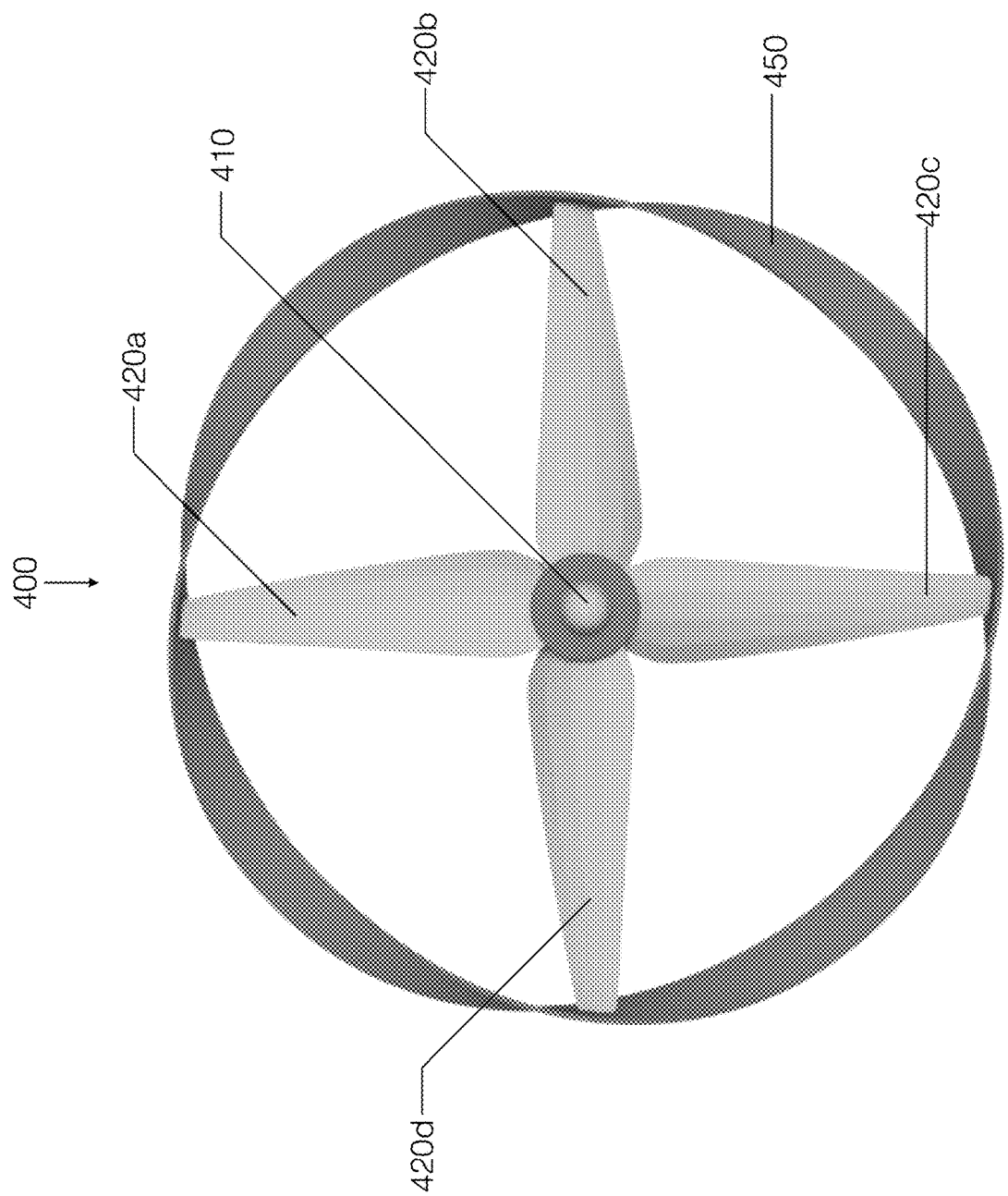
FIG. 4B shows a top down view of an embodiment of a 4 blade propeller with a continuous Pressure Modifying Element having a 180 degree clockwise twist between adjacent blades, and that is attached to the blade tips in an orientation that is perpendicular to the plane of rotation.

FIG. 4B shows a top down view of an embodiment of a 4 blade propeller 400 with a continuous pressure modifying element 450 having a 180 degree clockwise twist between adjacent blades 420a, 420b, 420c, 420d (2.0 degrees of clockwise twist for every 1.0 degree of arc moving in a clockwise direction). In FIG. 4B, the propeller 400 has a central hub 410, and each of four blades 420a, 420b, 420c, 420d emanate out from the hub 410. The continuous pressure modifying element 450 is attached to each blade 420a, 420b, 420c, 420d distal end in an orientation (of the long axis of the cross-section of the pressure modifying element 450) that is substantially perpendicular to the plane of rotation of the propeller embodiment 400.

Figure 4C:
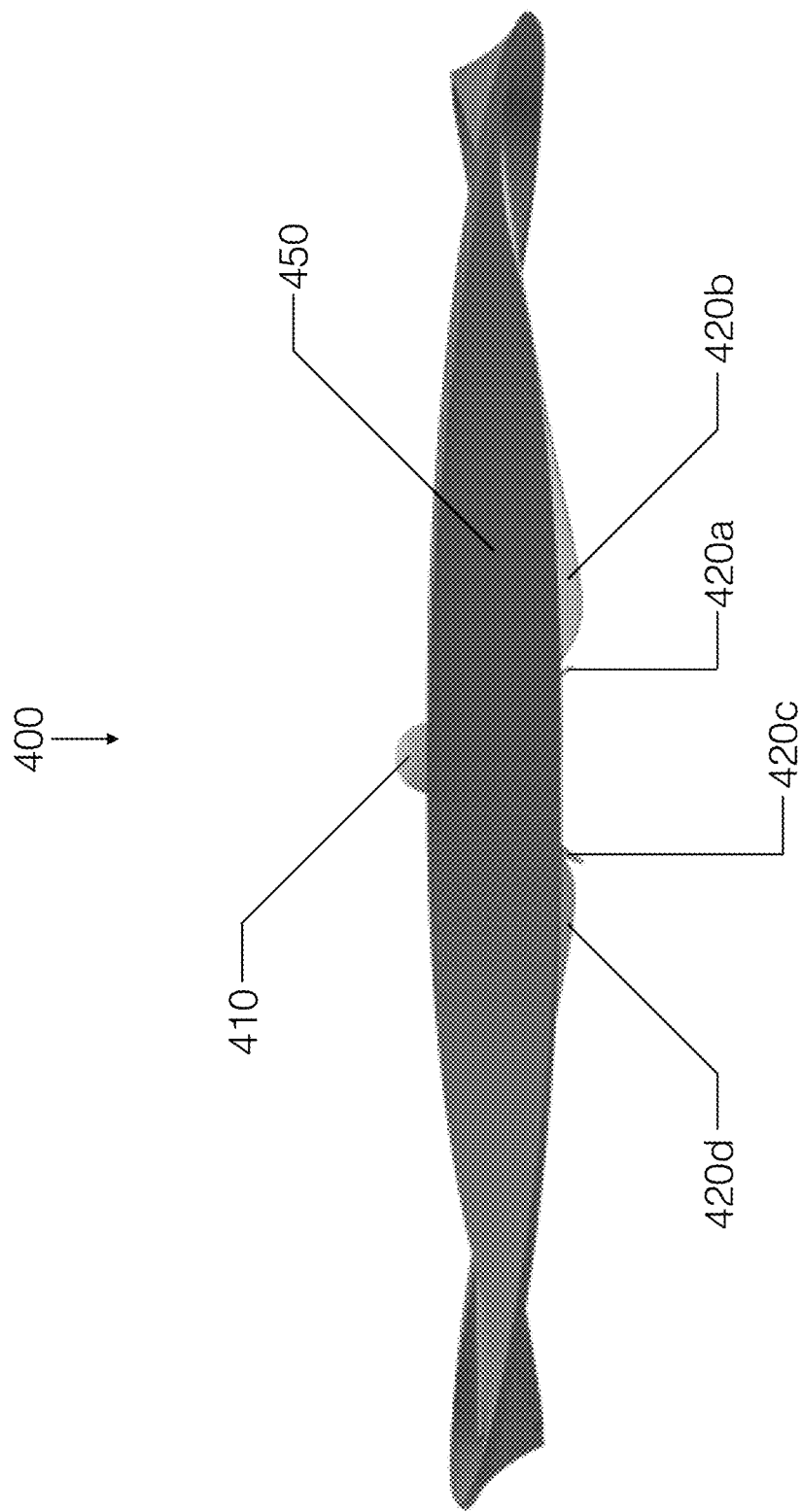
FIG. 4C shows a side view of an embodiment of a 4 blade propeller with a continuous Pressure Modifying Element having a 180 degree clockwise twist between adjacent blades, and that is attached to the blade tips in an orientation that is perpendicular to the plane of rotation.

FIG. 4C shows a side view of an embodiment of a 4 blade propeller 400 with a continuous pressure modifying element 450 having a 180 degree clockwise twist between adjacent blades 420a, 420b, 420c, 420d (2.0 degrees of clockwise twist for every 1.0 degree of arc moving in a clockwise direction). In FIG. 4C, the propeller 400 has a central hub 410, and each of four blades 420a, 420b, 420c, 420d emanate out from the hub 410. The continuous pressure modifying element 450 is attached to each blade 420a, 420b, 420c, 420d distal end in an orientation (of the long axis of the cross-section of the pressure modifying element 450) that is substantially perpendicular to the plane of rotation of the propeller embodiment 400.

Figure 5A:
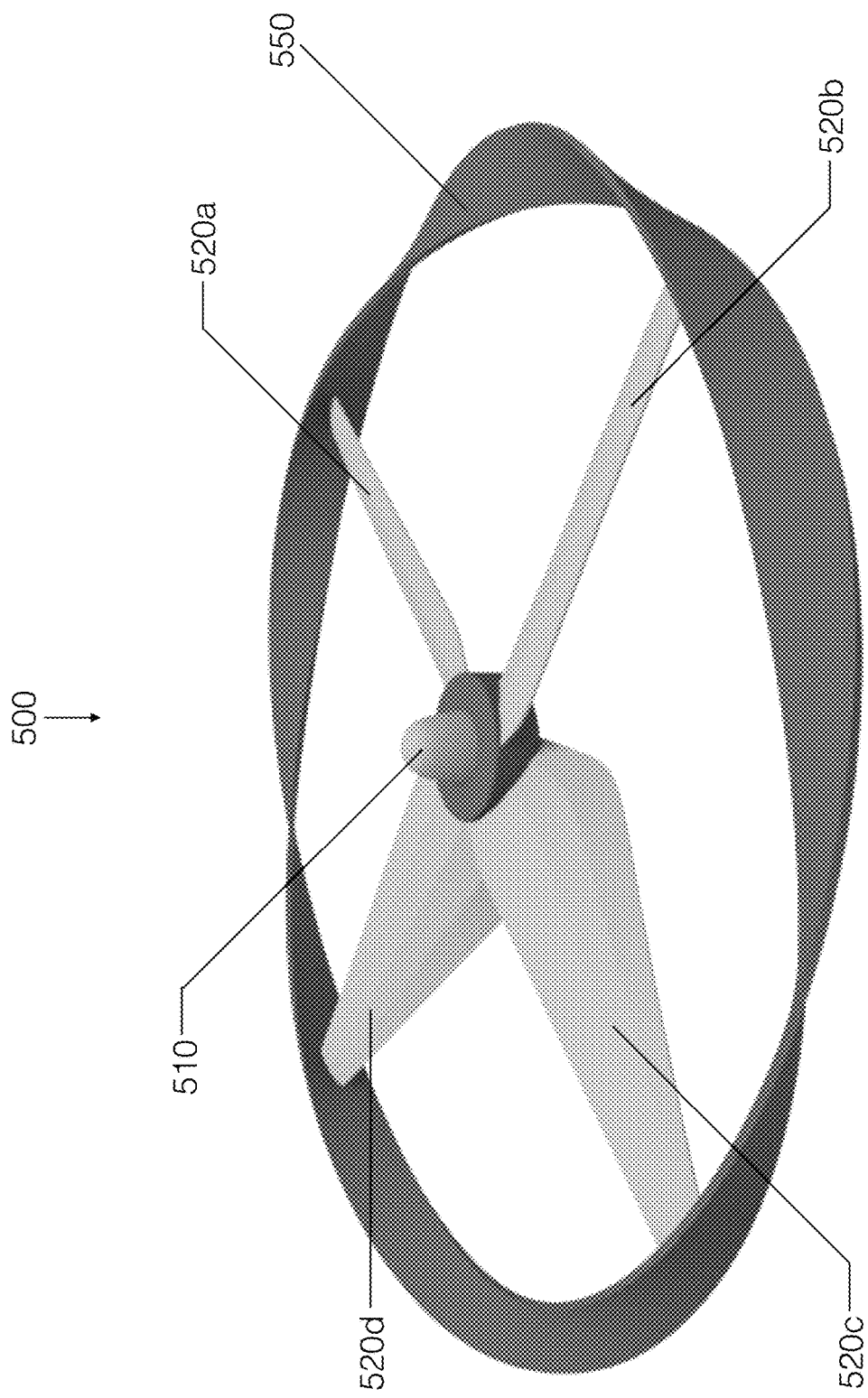
FIG. 5A shows a perspective view of an embodiment of a 4 blade propeller with a continuous Pressure Modifying Element having a 180 degree clockwise twist between adjacent blades, and that is attached to the blade tips in an orientation that is parallel to the plane of rotation.

FIG. 5A shows a perspective view of an embodiment of a 4 blade propeller 500 with a continuous pressure modifying element 550 having a 180 degree clockwise twist between adjacent blades 520a, 520b, 520c, 520d (2.0 degrees of clockwise twist for every 1.0 degree of arc moving in a clockwise direction). In FIG. 5A, the propeller 500 has a central hub 510, and each of four blades 520a, 520b, 520c, 520d extend out from the hub 510. The continuous pressure modifying element 550 is attached to each blade 520a, 520b, 520c, 520d tip in an orientation (of the long axis of the chord of the shown pressure modifying element 550) that is substantially perpendicular to the plane of rotation of the propeller embodiment 500. Note that the propeller embodiment 500 shown in FIGS. 5A-C has its blades 520a, 520b, 520c, 520d oriented in the opposite direction as the propeller embodiment 400 shown in FIGS. 4A-C.

Figure 5B:
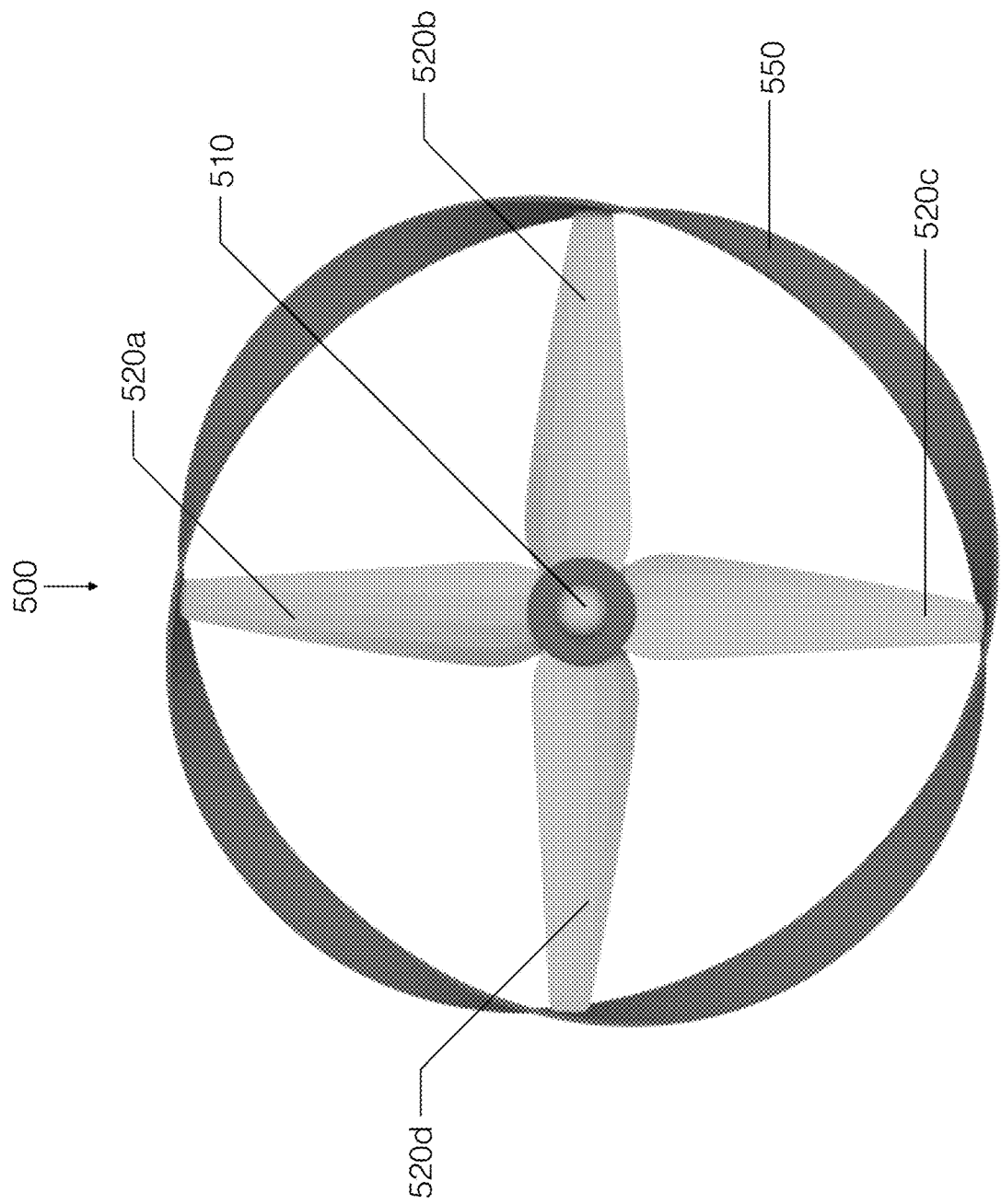
FIG. 5B shows a top down view of an embodiment of a 4 blade propeller with a continuous Pressure Modifying Element having a 180 degree clockwise twist between adjacent blades, and that is attached to the blade tips in an orientation that is parallel to the plane of rotation.

FIG. 5B shows a top down view of an embodiment of a 4 blade propeller 500 with a continuous pressure modifying element 550 having a 180 degree clockwise twist between adjacent blades 520a, 520b, 520c, 520d (2.0 degrees of clockwise twist for every 1.0 degree of arc moving in a clockwise direction). In FIG. 5B, the propeller 500 has a central hub 510, and each of four blades 520a, 520b, 520c, 520d extend out from the hub 510. The continuous pressure modifying element 550 is attached to each blade 520a, 520b, 520c, 520d tip in an orientation (of the long axis of the chord of the shown pressure modifying element 550) that is substantially perpendicular to the plane of rotation of the propeller embodiment 500. Note that the propeller embodiment 500 shown in FIGS. 5A-C has its blades 520a, 520b, 520c, 520d oriented in the opposite direction as the propeller embodiment 400 shown in FIGS. 4A-C.

Figure 5C:
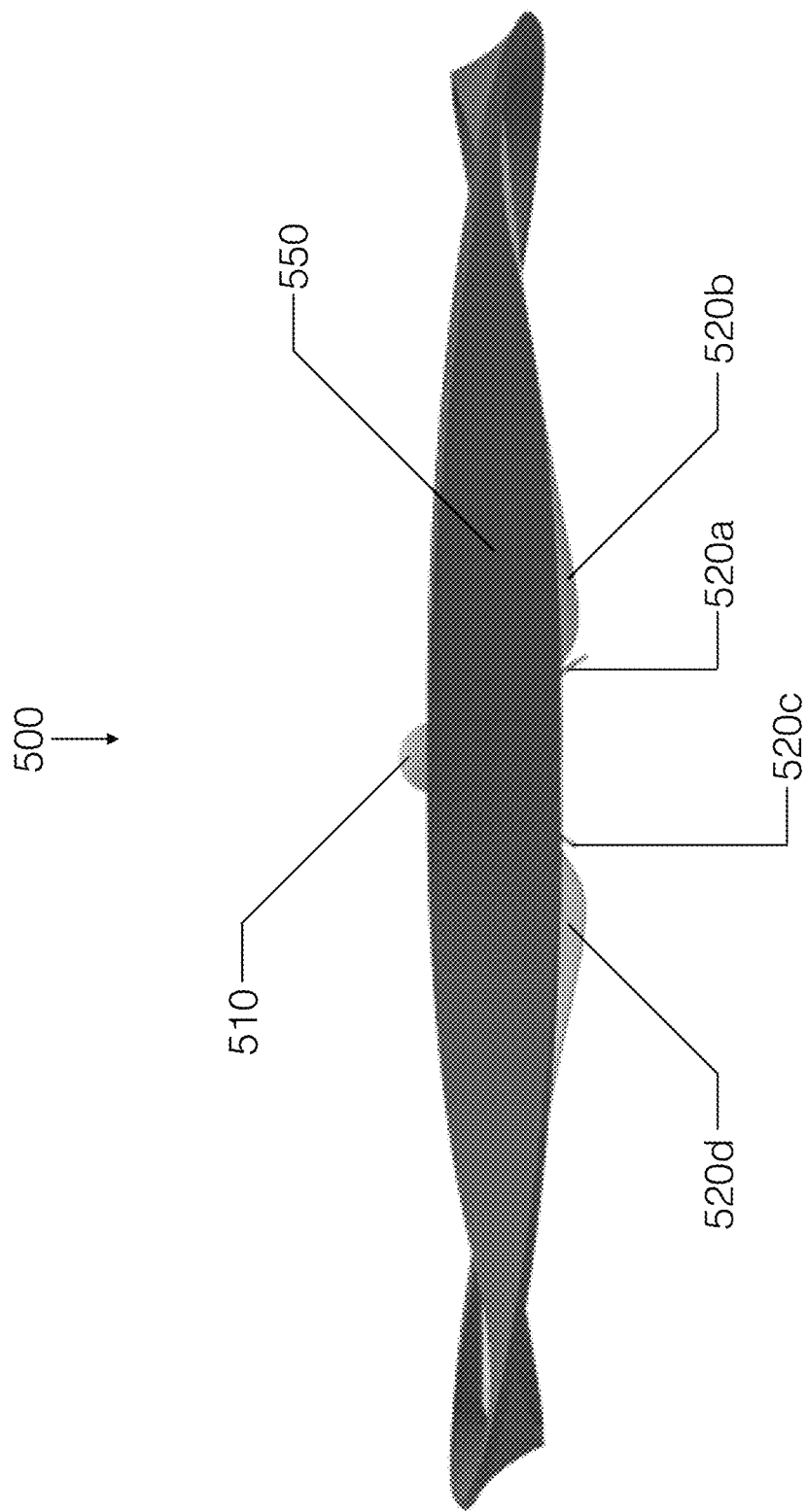
FIG. 5C shows a side view of an embodiment of a 4 blade propeller with a continuous Pressure Modifying Element having a 180 degree clockwise twist between adjacent blades, and that is attached to the blade tips in an orientation that is parallel to the plane of rotation.

FIG. 5C shows a side view of an embodiment of a 4 blade propeller 500 with a continuous pressure modifying element 550 having a 180 degree clockwise twist between adjacent blades 520a, 520b, 520c, 520d (2.0 degrees of clockwise twist for every 1.0 degree of arc moving in a clockwise direction). In FIG. 5C, the propeller 500 has a central hub 510, and each of four blades 520a, 520b, 520c, 520d extend out from the hub 510. The continuous pressure modifying element 550 is attached to each blade 520a, 520b, 520c, 520d tip in an orientation (of the long axis of the chord of the shown pressure modifying element 550) that is substantially perpendicular to the plane of rotation of the propeller embodiment 500. Note that the propeller embodiment 500 shown in FIGS. 5A-C has its blades 520a, 520b, 520c, 520d oriented in the opposite direction as the propeller embodiment 400 shown in FIGS. 4A-C.

Figure 6A:
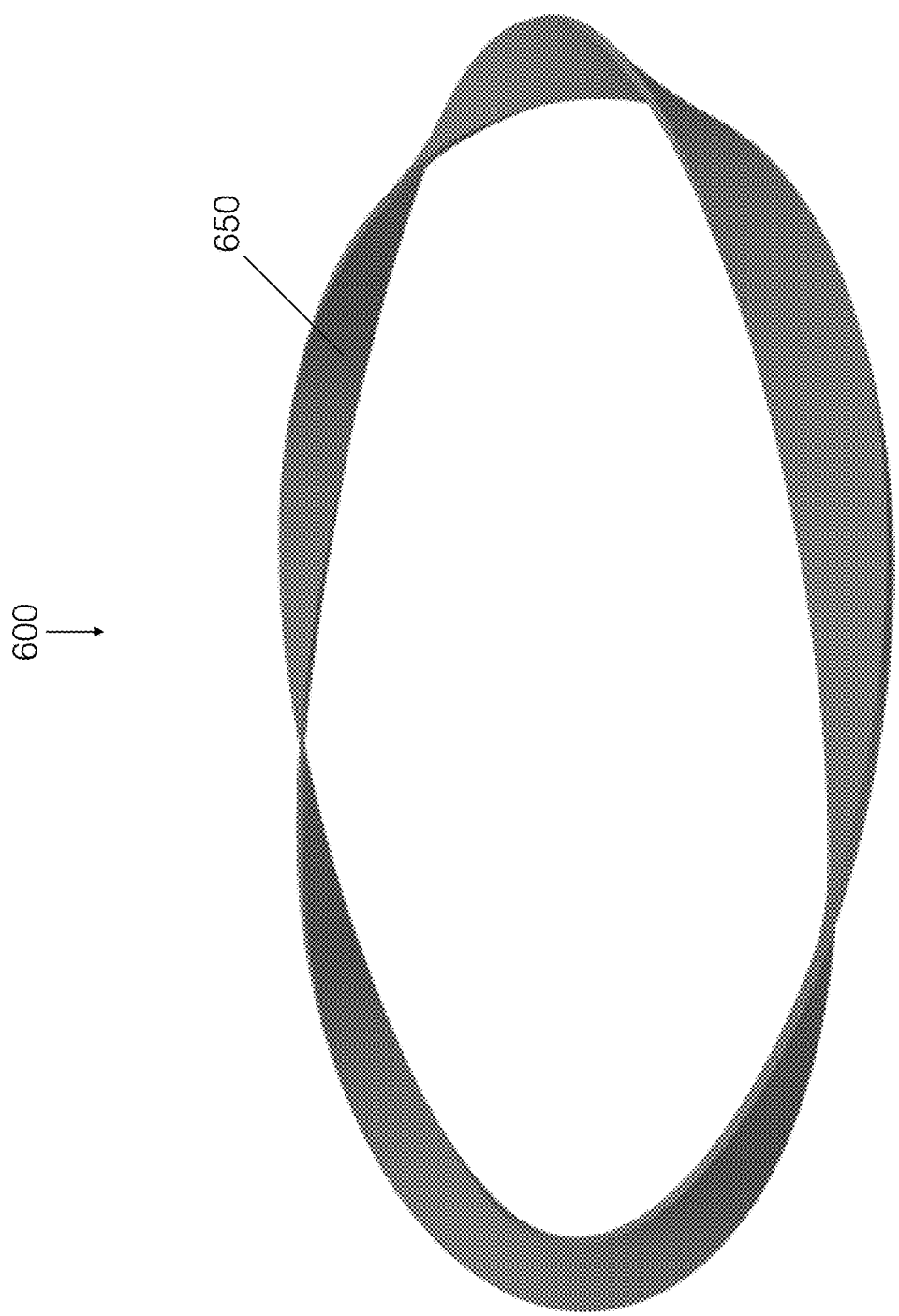
FIG. 6A shows a perspective view of an embodiment of a continuous Pressure Modifying Element having 720 degrees of clockwise twist over its entire arc.

FIG. 6A shows a perspective view 600 of an embodiment of a continuous Pressure Modifying Element 650 having 720 degrees of clockwise twist over its entire arc of 360 degrees.

Figure 6B:
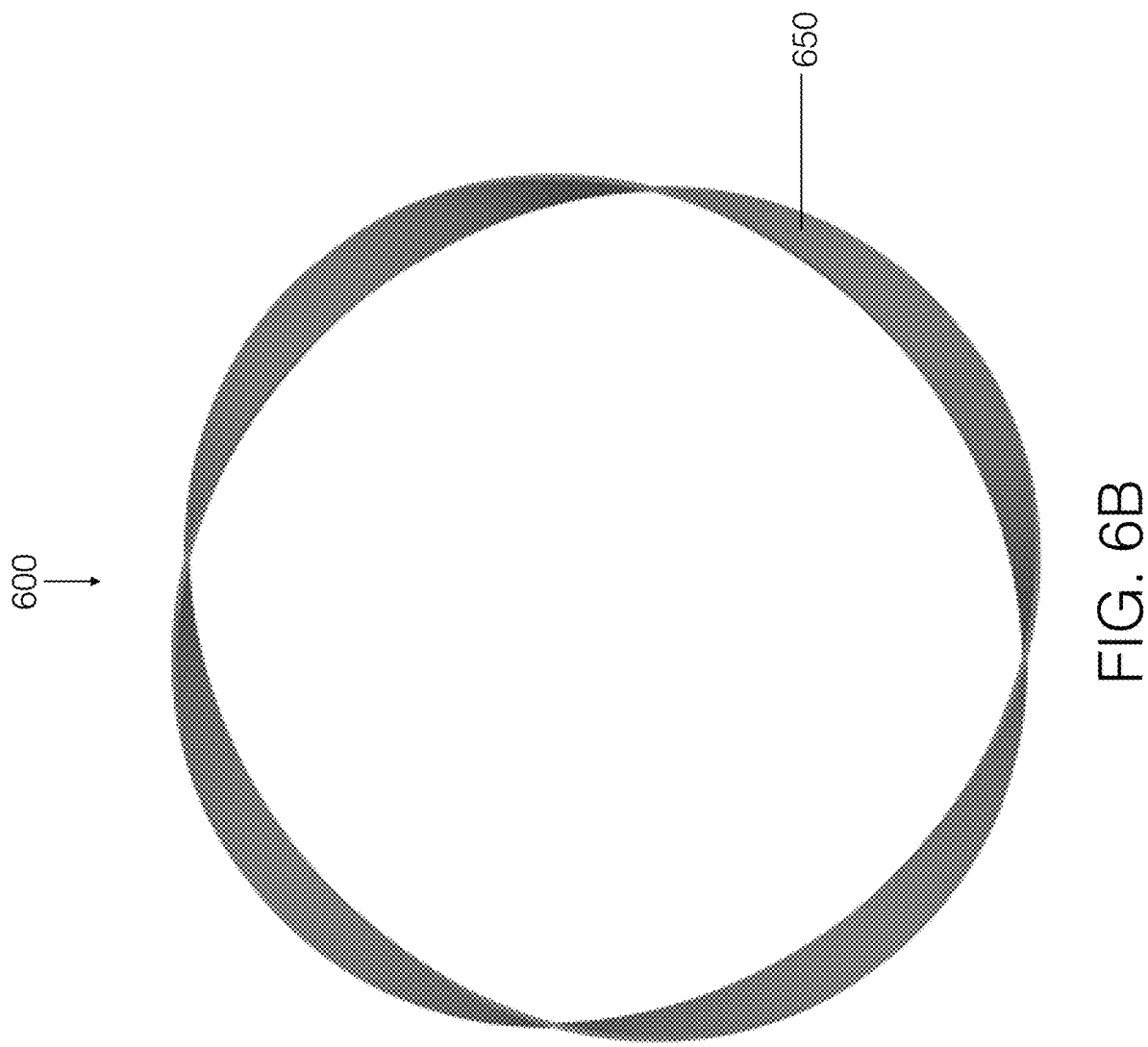
FIG. 6B shows a top down view of an embodiment of a continuous Pressure Modifying Element having 720 degrees of clockwise twist over its entire arc.

FIG. 6B shows a top down view 600 of an embodiment of a continuous Pressure Modifying Element 650 having 720 degrees of clockwise twist over its entire arc of 360 degrees.

Figure 6C:
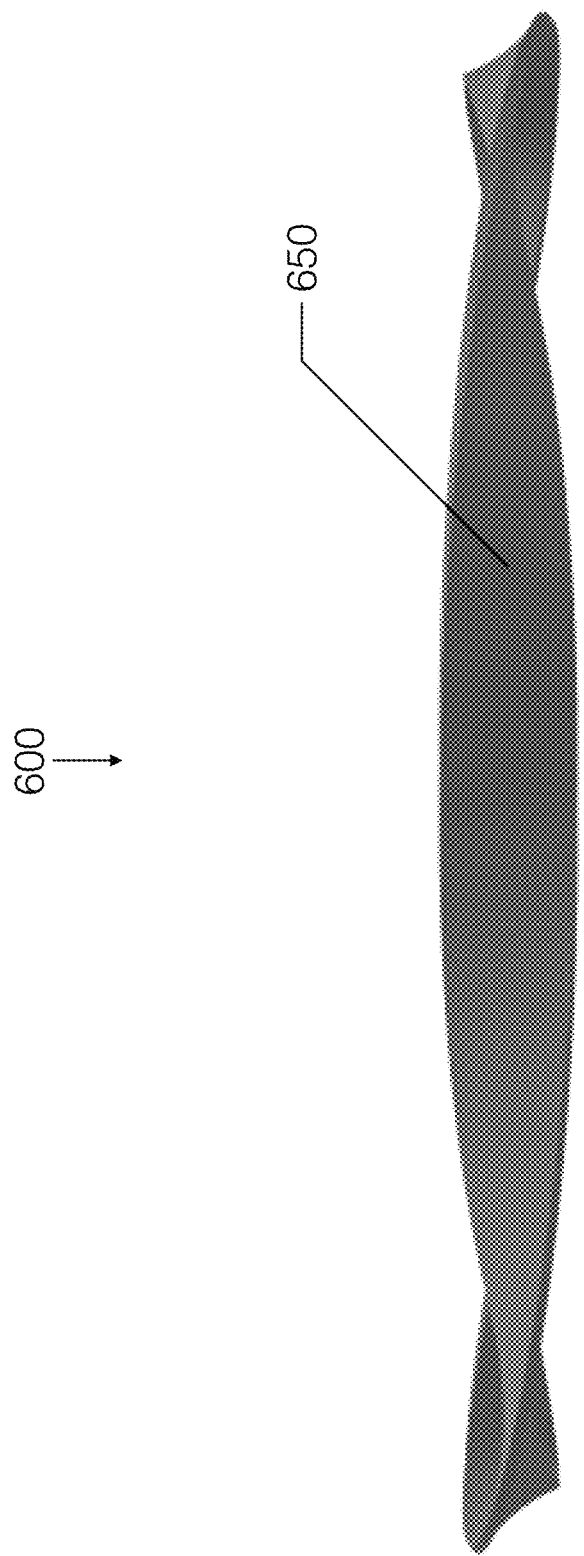
FIG. 6C shows a side view of an embodiment of a continuous Pressure Modifying Element having 720 degrees of clockwise twist over its entire arc.

FIG. 6C shows a side view 600 of an embodiment of a continuous Pressure Modifying Element 650 having 720 degrees of clockwise twist over its entire arc of 360 degrees.

Figure 7A:
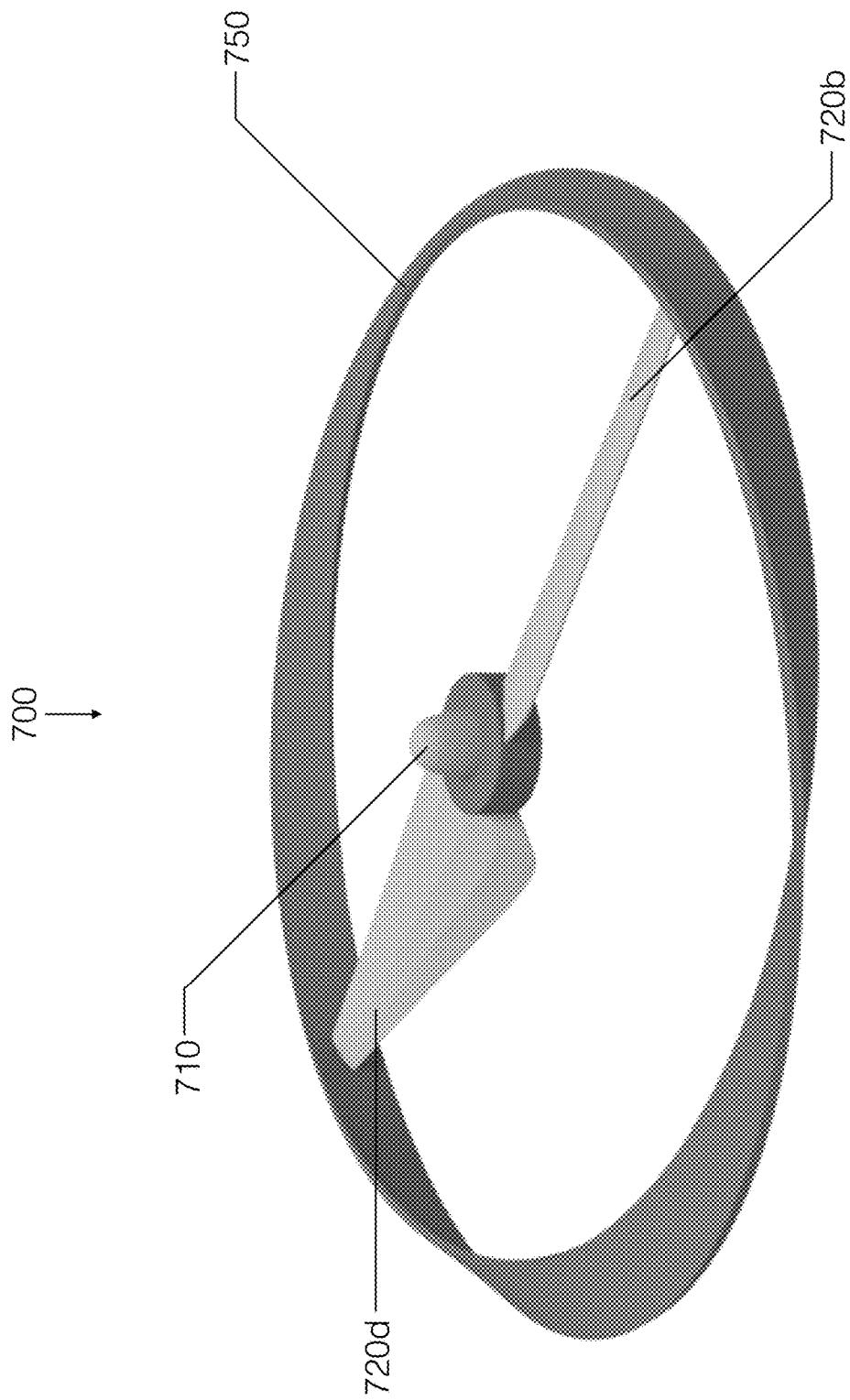
FIG. 7A shows a perspective view of an embodiment of a 2 blade propeller with a continuous Pressure Modifying Element having a 180 degree counterclockwise twist between adjacent blades, and that is attached to the blade tips in an orientation that is perpendicular to the plane of rotation.

FIG. 7A shows a perspective view of an embodiment of a 2 blade propeller 700 with a continuous pressure modifying element 750 having a 180 degree counterclockwise twist between adjacent blades 720b, 720d (1.0 degree of counterclockwise twist for every 1.0 degree of arc moving in a clockwise direction). In FIG. 7A, the propeller 700 has a central hub 710, and each of four blades 720b, 720d extend out from the hub 710. The continuous pressure modifying element 750 is attached to each blade 720b, 720d distal end in an orientation (of the generally flat outer surfaces of the shown pressure modifying element 750) that is substantially perpendicular to the plane of rotation of the propeller embodiment 700.

FIG. 7B shows a top down view of an embodiment of a 2 blade propeller 700 with a continuous pressure modifying element 750 having a 180 degree counterclockwise twist between adjacent blades 720b, 720d (1.0 degree of counterclockwise twist for every 1.0 degree of arc moving in a clockwise direction). In FIG. 7B, the propeller 700 has a central hub 710, and each of four blades 720b, 720d extend out from the hub 710. The continuous pressure modifying element 750 is attached to each blade 720b, 720d distal end in an orientation (of the generally flat outer surfaces of the shown pressure modifying element 750) that is substantially perpendicular to the plane of rotation of the propeller embodiment 700.

Figure 7C:
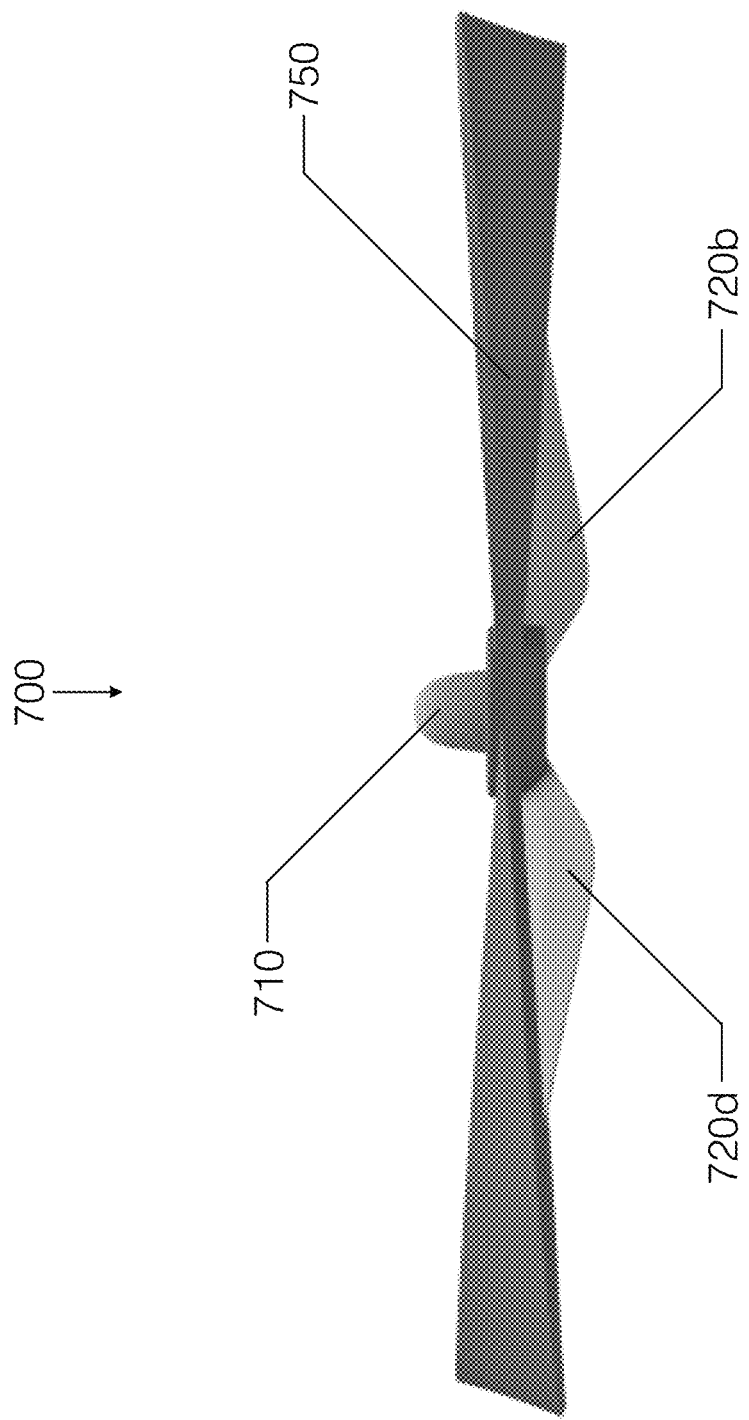
FIG. 7C shows a side view of an embodiment of a 2 blade propeller with a continuous Pressure Modifying Element having a 180 degree counterclockwise twist between adjacent blades, and that is attached to the blade tips in an orientation that is perpendicular to the plane of rotation.

FIG. 7C shows a side view of an embodiment of a 2 blade propeller 700 with a continuous pressure modifying element 750 having a 180 degree counterclockwise twist between adjacent blades 720b, 720d (1.0 degree of counterclockwise twist for every 1.0 degree of arc moving in a clockwise direction). In FIG. 7C, the propeller 700 has a central hub 710, and each of four blades 720b, 720d extend out from the hub 710. The continuous pressure modifying element 750 is attached to each blade 720b, 720d distal end in an orientation (of the generally flat outer surfaces of the shown pressure modifying element 750) that is substantially perpendicular to the plane of rotation of the propeller embodiment 700.

Figure 8A:
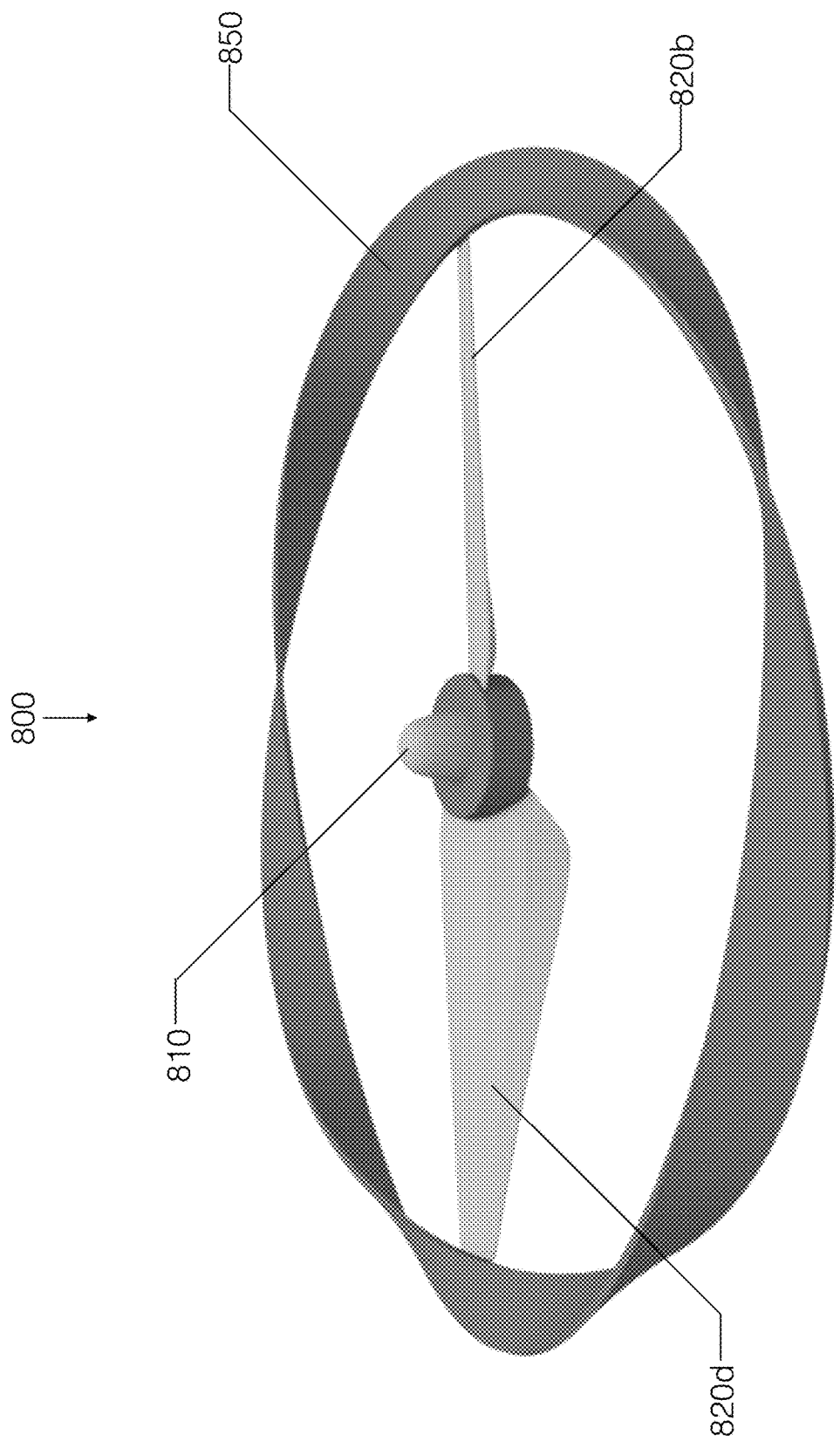
FIG. 8A shows a perspective view of an embodiment of a 2 blade propeller with a continuous Pressure Modifying Element having a 360 degree counterclockwise twist between adjacent blades, and that is attached to the blade tips in an orientation that is parallel to the plane of rotation.

FIG. 8A shows a perspective view of an embodiment of a 2 blade propeller 800 with a continuous pressure modifying element 850 having a 180 degree counterclockwise twist between adjacent blades 820b, 820d (1.0 degree of counterclockwise twist for every 1.0 degree of arc moving in a clockwise direction). In FIG. 8A, the propeller 800 has a central hub 810, and each of four blades 820b, 820d extend out from the hub 810. The continuous pressure modifying element 850 is attached to each blade 820b, 820d distal end in an orientation (of the generally flat outer surfaces of the shown pressure modifying element 850) that is substantially parallel to the plane of rotation of the propeller embodiment 800.

Figure 8B:
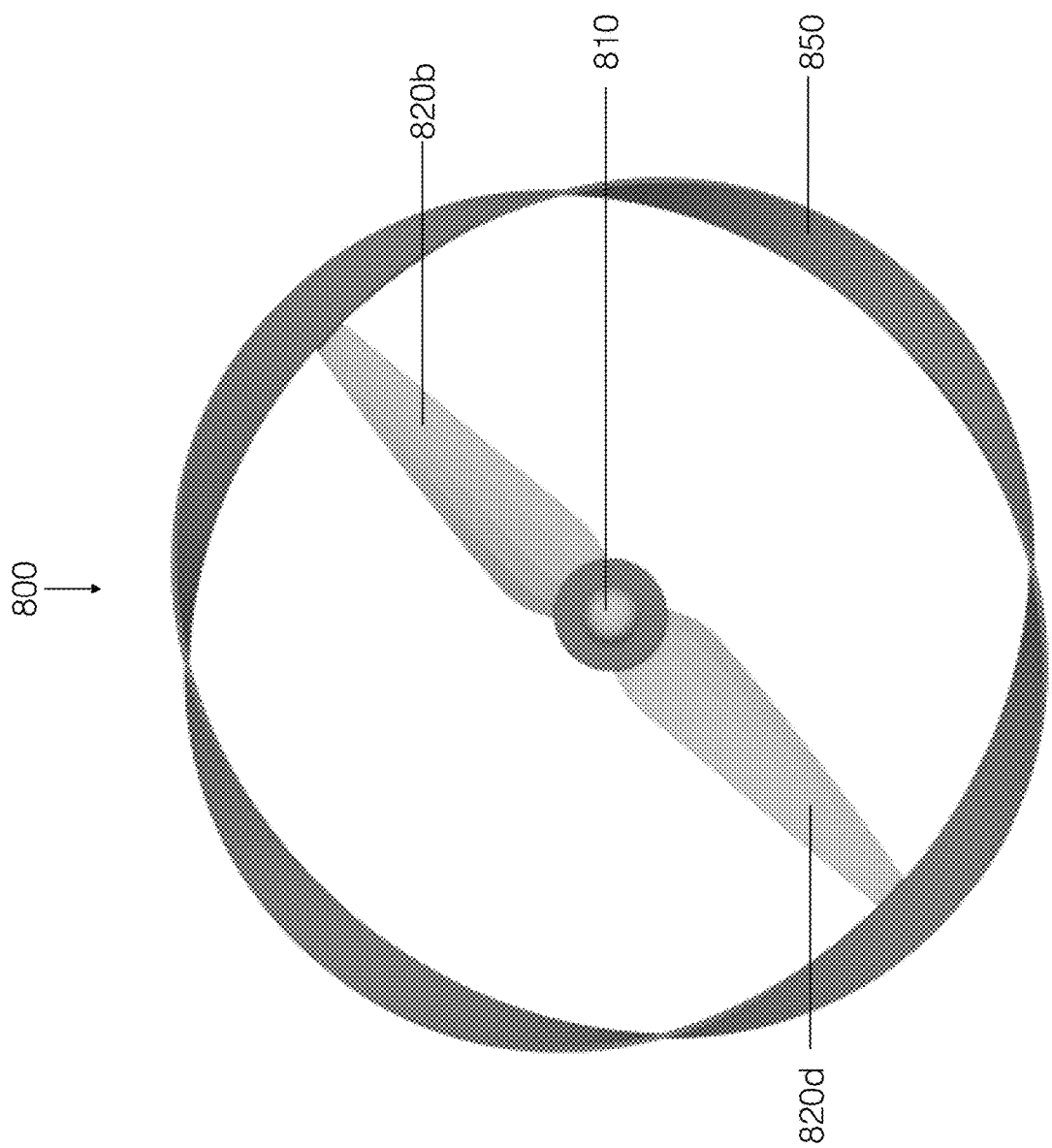
FIG. 8B shows a top down view of an embodiment of a 2 blade propeller with a continuous Pressure Modifying Element having a 360 degree counterclockwise twist between adjacent blades, and that is attached to the blade tips in an orientation that is parallel to the plane of rotation.

FIG. 8B shows a top down view of an embodiment of a 2 blade propeller 800 with a continuous pressure modifying element 850 having a 180 degree counterclockwise twist between adjacent blades 820b, 820d (1.0 degree of counterclockwise twist for every 1.0 degree of arc moving in a clockwise direction). In FIG. 8B, the propeller 800 has a central hub 810, and each of four blades 820b, 820d extend out from the hub 810. The continuous pressure modifying element 850 is attached to each blade 820b, 820d distal end in an orientation (of the generally flat outer surfaces of the shown pressure modifying element 850) that is substantially parallel to the plane of rotation of the propeller embodiment 800.

Figure 8C:
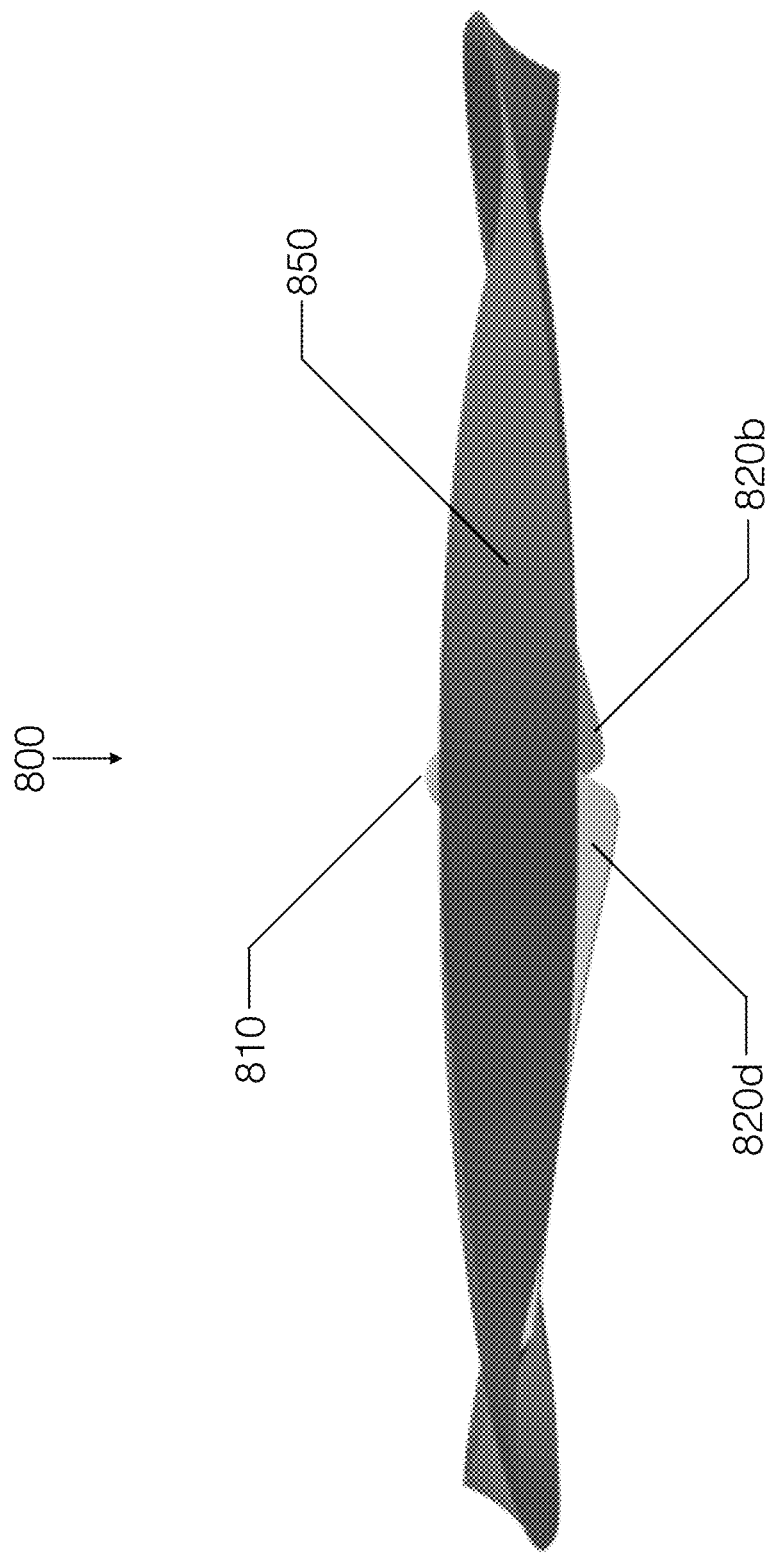
FIG. 8C shows a side view of an embodiment of a 2 blade propeller with a continuous Pressure Modifying Element having a 360 degree counterclockwise twist between adjacent blades, and that is attached to the blade tips in an orientation that is parallel to the plane of rotation.

FIG. 8C shows a side view of an embodiment of a 2 blade propeller 800 with a continuous pressure modifying element 850 having a 180 degree counterclockwise twist between adjacent blades 820b, 820d (1.0 degree of counterclockwise twist for every 1.0 degree of arc moving in a clockwise direction). In FIG. 8C, the propeller 800 has a central hub 810, and each of four blades 820b, 820d extend out from the hub 810. The continuous pressure modifying element 850 is attached to each blade 820b, 820d distal end in an orientation (of the generally flat outer surfaces of the shown pressure modifying element 850) that is substantially parallel to the plane of rotation of the propeller embodiment 800.

Figure 9A:
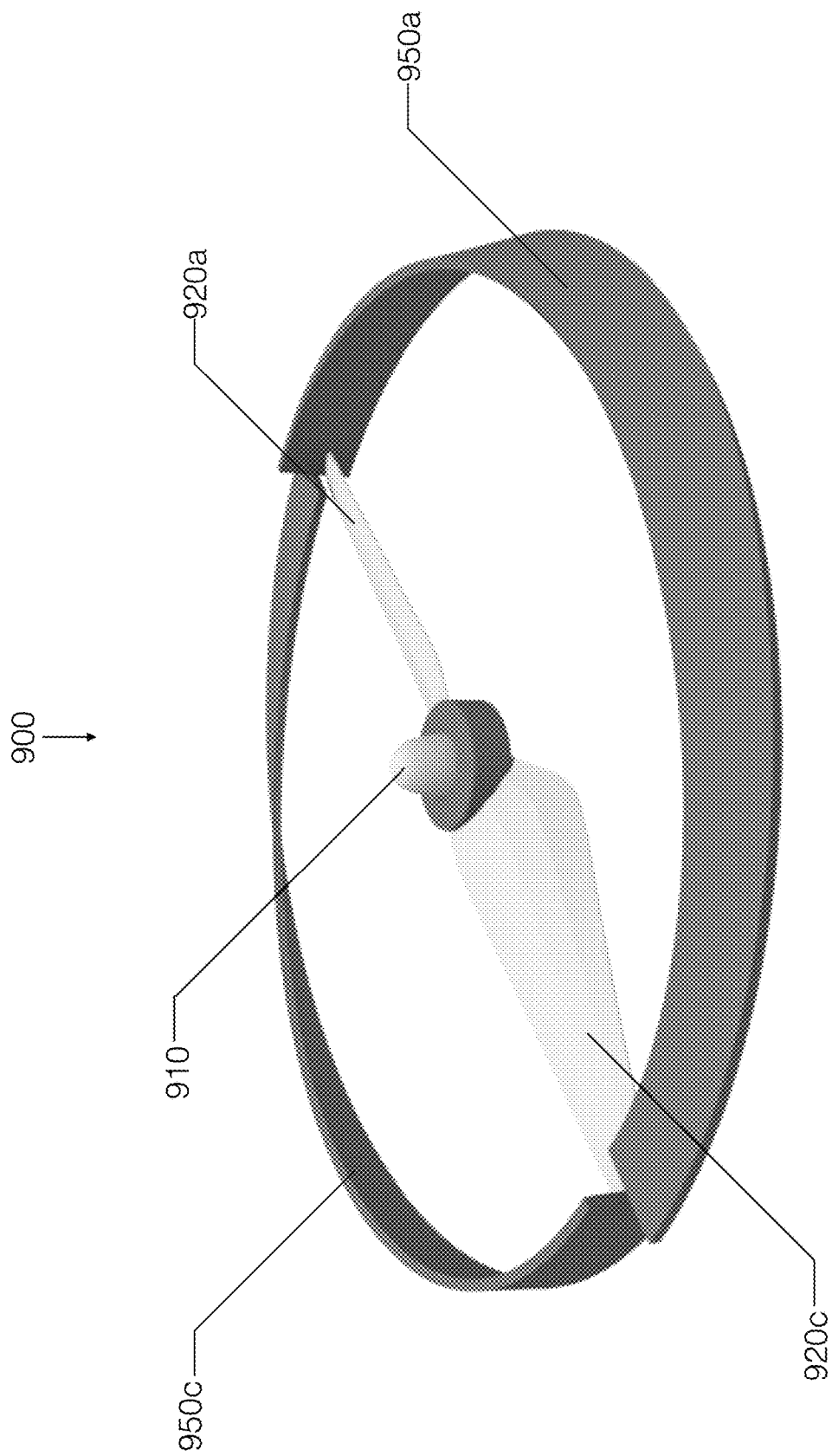
FIG. 9A shows a perspective view of an embodiment of a 2 blade propeller with a discontinuous Pressure Modifying Elements with 90 degrees of clockwise twist between adjacent blades, with each Pressure Modifying Element section attached to one blade tip in a first orientation that is perpendicular to the plane of rotation, and another blade tip in a second orientation that is parallel to the plane of rotation.

FIG. 9A shows a perspective view of an embodiment of a 2 blade propeller 900 with a pressure modifying element first segment 950a and second segment 950c, having a 90 degree clockwise twist between adjacent blades 920a, 920c (0.5 degree of clockwise twist for every 1.0 degree of arc moving in a clockwise direction). In FIG. 9A, the propeller 900 has a central hub 910, and each of two blades 920a, 920c extend out from the hub 910. The pressure modifying element 950 has two segments (sections, portions). A first PME segment 950a is attached at a first blade 920a first attachment point (at the tip of the blade) in an orientation that is substantially perpendicular to the propeller's 900 (and blades 920a, 920c) plane of rotation, and at a second blade 920c first attachment point (at the tip of the blade) in an orientation that is substantially parallel to the propeller's 900 plane of rotation. Similarly, a second PME segment 950c is attached to a second blade 920c second attachment point (at the tip of the blade) in an orientation that is substantially perpendicular to the propeller's 900 (and blades 920a, 920c) plane of rotation, and at a first blade 920a second attachment point (at the tip of the blade) in an orientation that is substantially parallel to the propeller's 900 plane of rotation.

Figure 9B:
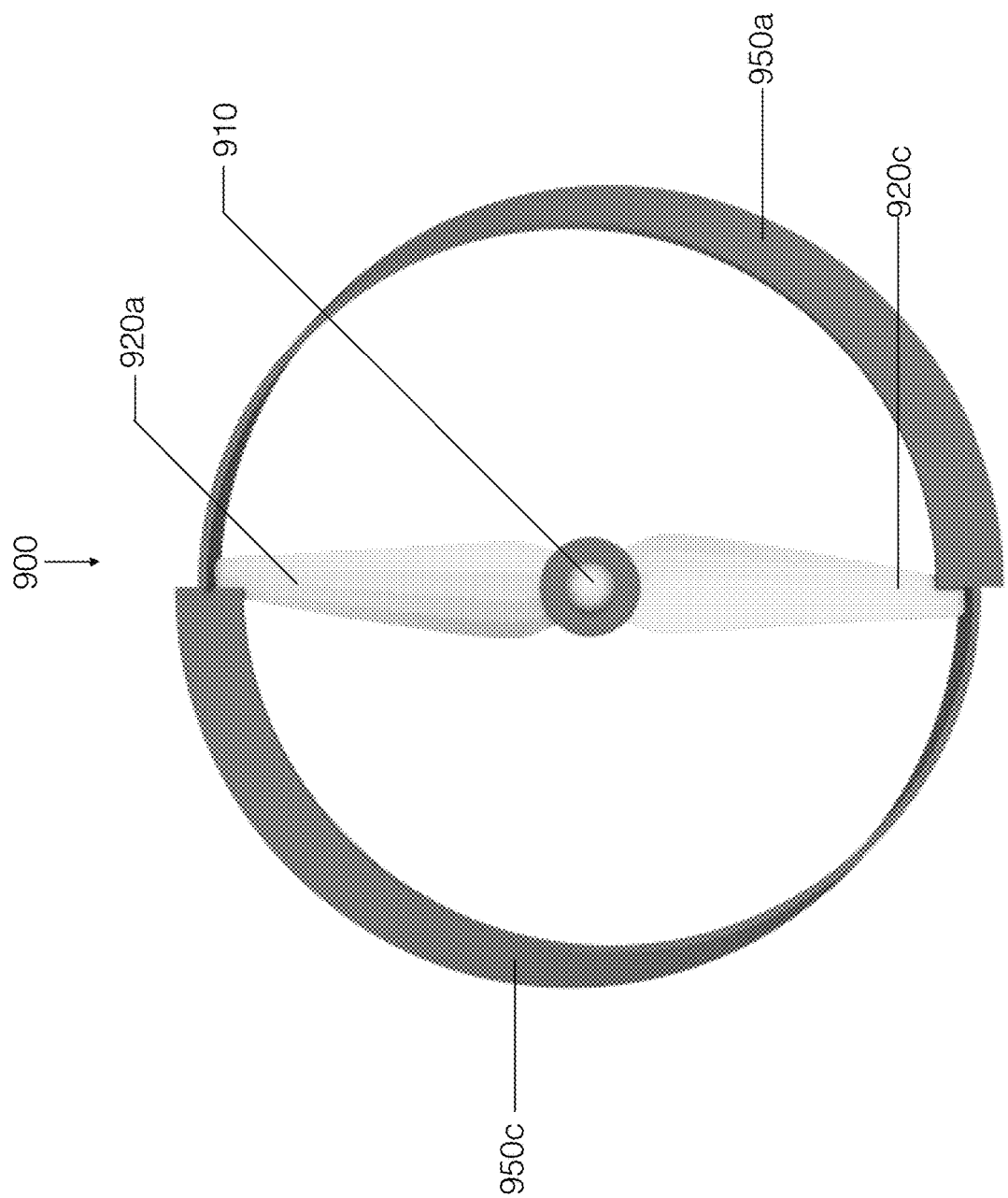
FIG. 9B shows a top down view of an embodiment of a 2 blade propeller with a discontinuous Pressure Modifying Elements with 90 degrees of clockwise twist between adjacent blades, with each Pressure Modifying Element section attached to one blade tip in a first orientation that is perpendicular to the plane of rotation, and another blade tip in a second orientation that is parallel to the plane of rotation.

FIG. 9B shows a top down view of an embodiment of a 2 blade propeller 900 with a pressure modifying element first segment 950a and second segment 950c, having a 90 degree clockwise twist between adjacent blades 920a, 920c (0.5 degree of clockwise twist for every 1.0 degree of arc moving in a clockwise direction). In FIG. 9B, the propeller 900 has a central hub 910, and each of two blades 920a, 920c extend out from the hub 910. The pressure modifying element 950 has two segments (sections, portions). A first PME segment 950a is attached at a first blade 920a first attachment point (at the tip of the blade) in an orientation that is substantially perpendicular to the propeller's 900 (and blades 920a, 920c) plane of rotation, and at a second blade 920c first attachment point (at the tip of the blade) in an orientation that is substantially parallel to the propeller's 900 plane of rotation. Similarly, a second PME segment 950c is attached to a second blade 920c second attachment point (at the tip of the blade) in an orientation that is substantially perpendicular to the propeller's 900 (and blades 920a, 920c) plane of rotation, and at a first blade 920a second attachment point (at the tip of the blade) in an orientation that is substantially parallel to the propeller's 900 plane of rotation.

Figure 9C:
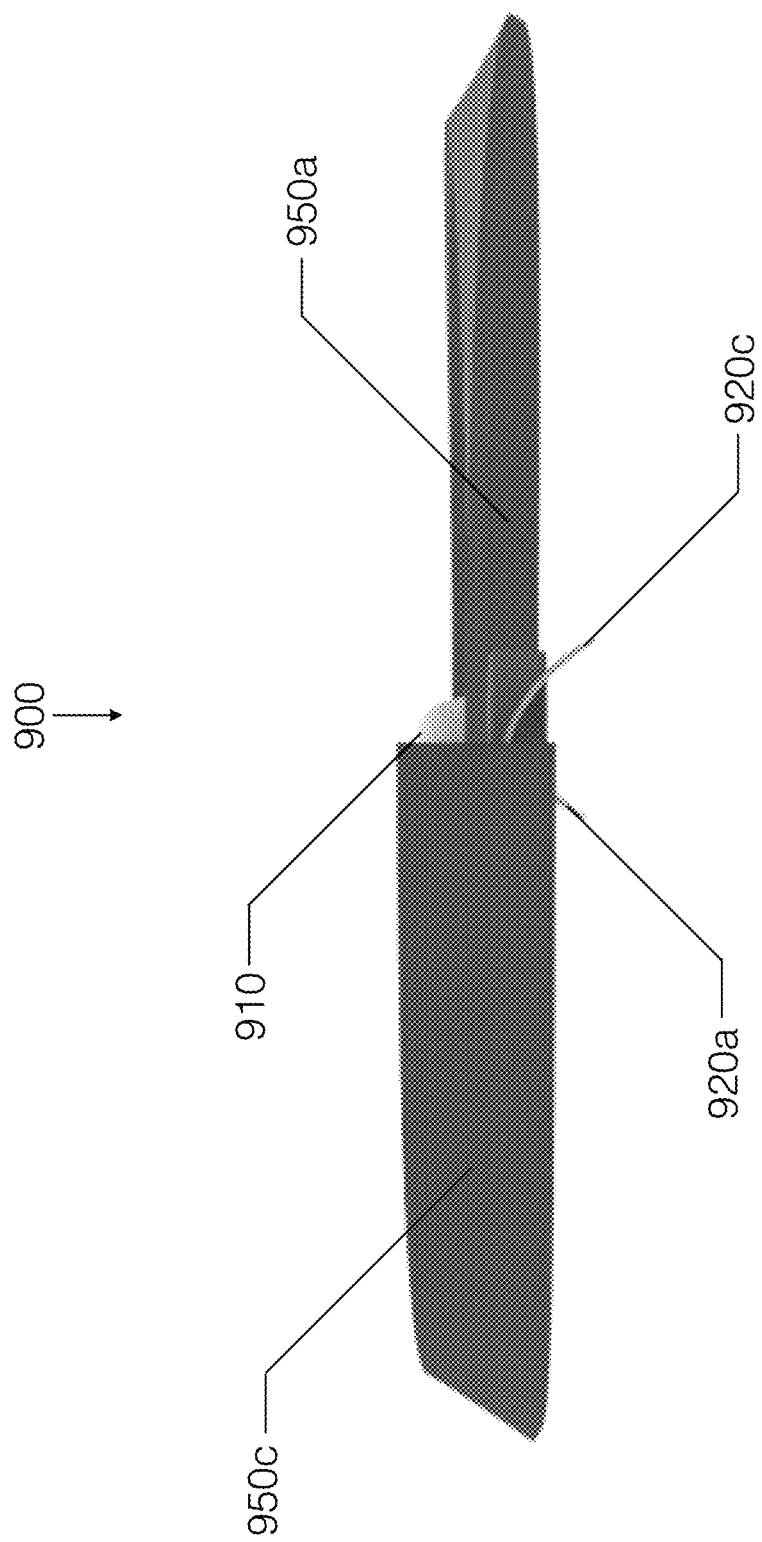
FIG. 9C shows a side view of an embodiment of a 2 blade propeller with a discontinuous Pressure Modifying Elements with 90 degrees of clockwise twist between adjacent blades, with each Pressure Modifying Element section attached to one blade tip in a first orientation that is perpendicular to the plane of rotation, and another blade tip in a second orientation that is parallel to the plane of rotation.

FIG. 9C shows a side view of an embodiment of a 2 blade propeller 900 with a pressure modifying element first segment 950a and second segment 950c, having a 90 degree clockwise twist between adjacent blades 920a, 920c (0.5 degree of clockwise twist for every 1.0 degree of arc moving in a clockwise direction). In FIG. 9C, the propeller 900 has a central hub 910, and each of two blades 920a, 920c extend out from the hub 910. The pressure modifying element 950 has two segments (sections, portions). A first PME segment 950a is attached at a first blade 920a first attachment point (at the tip of the blade) in an orientation that is substantially perpendicular to the propeller's 900 (and blades 920a, 920c) plane of rotation, and at a second blade 920c first attachment point (at the tip of the blade) in an orientation that is substantially parallel to the propeller's 900 plane of rotation. Similarly, a second PME segment 950c is attached to a second blade 920c second attachment point (at the tip of the blade) in an orientation that is substantially perpendicular to the propeller's 900 (and blades 920a, 920c) plane of rotation, and at a first blade 920a second attachment point (at the tip of the blade) in an orientation that is substantially parallel to the propeller's 900 plane of rotation.

Figure 10A:
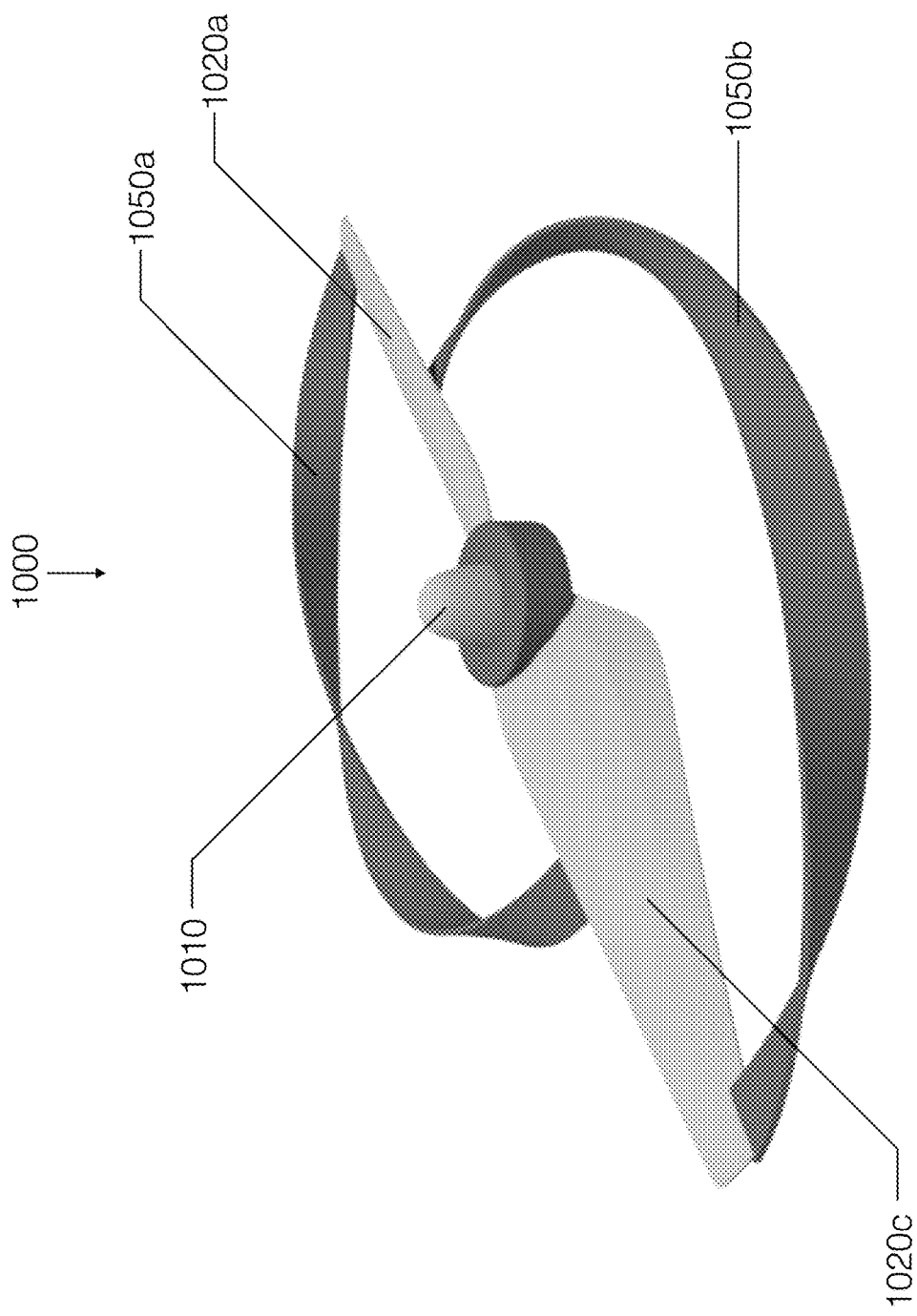
FIG. 10A shows a perspective view of an embodiment of a 2 blade propeller with 2 Pressure Modifying Elements, each PME having 360 degrees of counterclockwise twist between blades, with each PME attached at one end to a blade tip and attached at the other end to a blade middle section.

FIG. 10A shows a perspective view of an embodiment of a propeller 1000 having a first blade 1020a and a second blade 1020c, along with a first pressure modifying element 1050a and a second pressure modifying element 1050b. The first pressure modifying element 1050a has a first end that is attached to the first blade 1020a at a first blade first attachment point near the first blade 1020a distal end, and a second end that is attached to the second blade 1020c at a second blade first attachment point that is near the second blade's 1020c mid-section (e.g., middle of the length of the blade). Similarly, the second pressure modifying element 1050b has a first end that is attached to the second blade 1020c at a second blade second attachment point near the second blade's 1020c distal end, and a second end that is attached to the first blade 1020a at a first blade second attachment point that is near the first blade's 1020a mid-section (e.g., middle of the length of the blade). The embodiment also has a hub 1010.

Figure 10B:
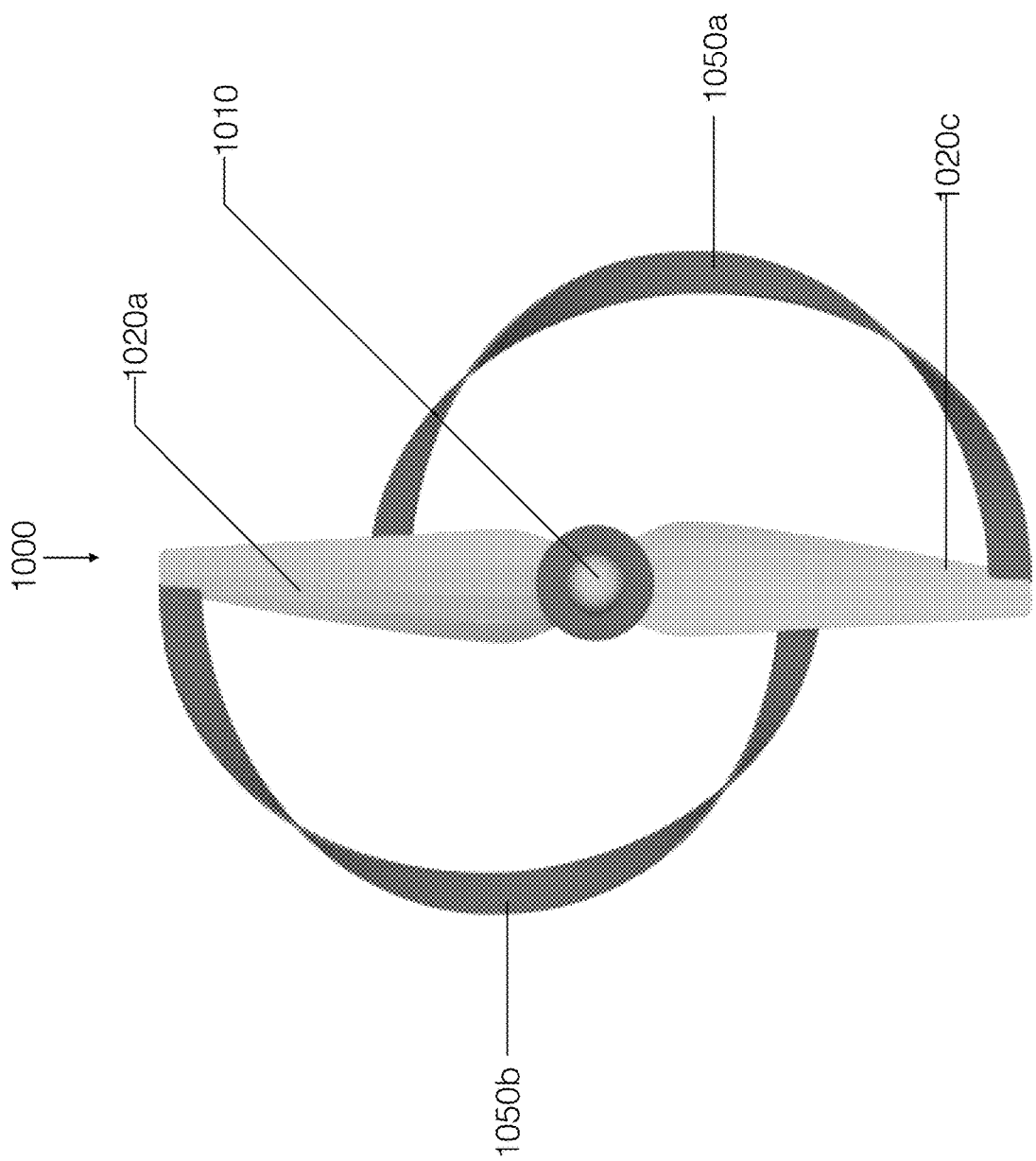
FIG. 10B shows a top down view of an embodiment of a 2 blade propeller with 2 Pressure Modifying Elements, each PME having 360 degrees of counterclockwise twist between blades, with each PME attached at one end to a blade tip and attached at the other end to a blade middle section.

FIG. 10B shows a top down view of an embodiment of a propeller 1000 having a first blade 1020a and a second blade 1020c, along with a first pressure modifying element 1050a and a second pressure modifying element 1050b. The first pressure modifying element 1050a has a first end that is attached to the first blade 1020a at a first blade first attachment point near the first blade 1020a distal end, and a second end that is attached to the second blade 1020c at a second blade first attachment point that is near the second blade's 1020c mid-section (e.g., middle of the length of the blade). Similarly, the second pressure modifying element 1050b has a first end that is attached to the second blade 1020c at a second blade second attachment point near the second blade's 1020c distal end, and a second end that is attached to the first blade 1020a at a first blade second attachment point that is near the first blade's 1020a mid-section (e.g., middle of the length of the blade). The embodiment also has a hub 1010.

Figure 10C:
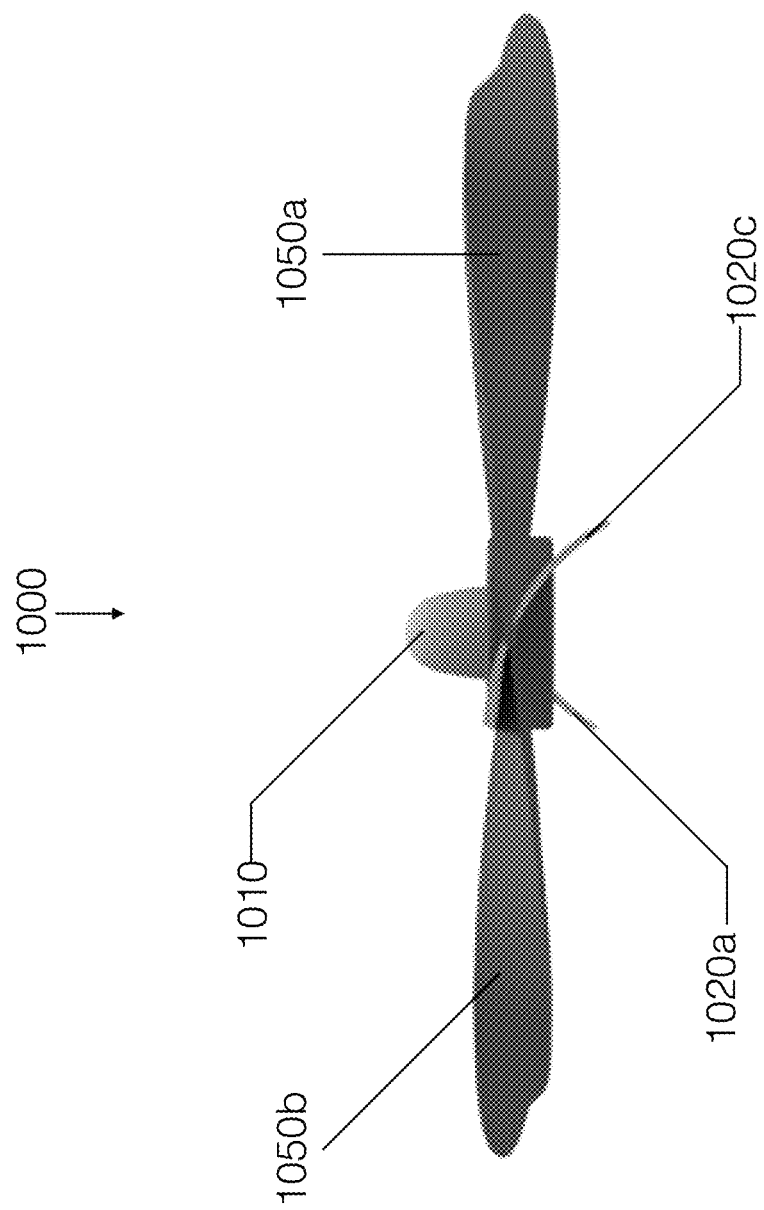
FIG. 10C shows a side view of an embodiment of a 2 blade propeller with 2 Pressure Modifying Elements, each PME having 360 degrees of counterclockwise twist between blades, with each PME attached at one end to a blade tip and attached at the other end to a blade middle section.

FIG. 10C shows a side view of an embodiment of a propeller 1000 having a first blade 1020a and a second blade 1020c, along with a first pressure modifying element 1050a and a second pressure modifying element 1050b. The first pressure modifying element 1050a has a first end that is attached to the first blade 1020a at a first blade first attachment point near the first blade 1020a distal end, and a second end that is attached to the second blade 1020c at a second blade first attachment point that is near the second blade's 1020c mid-section (e.g., middle of the length of the blade). Similarly, the second pressure modifying element 1050b has a first end that is attached to the second blade 1020c at a second blade second attachment point near the second blade's 1020c distal end, and a second end that is attached to the first blade 1020a at a first blade second attachment point that is near the first blade's 1020a mid-section (e.g., middle of the length of the blade). The embodiment shown in FIGS. 10A-C also has a hub 1010.

Embodiments of propellers of the invention can include at least one pressure modifying element that is similar to the ones shown in FIGS. 10A-C, wherein the radius of the PME increases or decreases (depending on one's perspective) over the length of the PME. In other words, certain embodiments of a PME may curve inwards toward the hub, or outwards away from the hub. In other embodiments, a pressure modifying element's curve may be away from the hub, e.g., it has a radius originating from a center point that is not the hub (and could be a point that is in a space that is outside of the maximum diameter of the propeller itself). Other PME embodiments can curve out of a single plane, such as curving out of a plane that is parallel to the plane of rotation of the propeller irrespective of whether there is any change to the radius of the PME. Other curved pressure modifying element embodiments are anticipated by the invention.

Figure 11A:
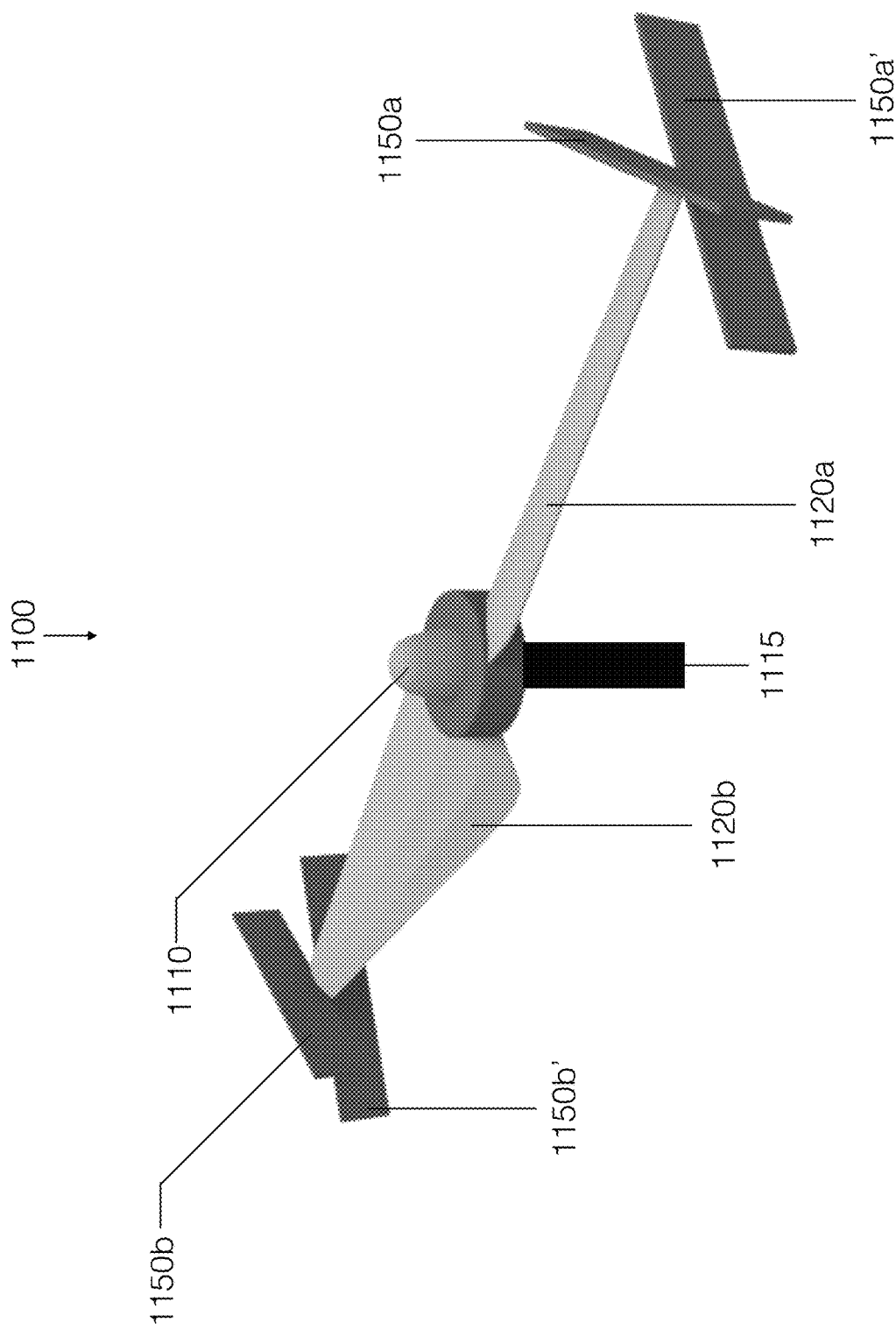
FIG. 11A shows a perspective view of an embodiment of a 2 blade propeller with 2 PME blade-like structures, each PME attached to a blade tip distal end.

FIG. 11A shows a perspective view of a propeller embodiment 1100 with a first blade 1120a and a second blade 1120b. A first blade-like structure has a first tab 1150a and a second tab 1150a' that are attached to the tip of the first blade 1120a. A second blade-like structure has a first tab 1150b and a second tab 1150b' that are attached to the tip of the second blade 1120b. This propeller embodiment 1100 includes a central hub 1110 that is attached to an elongated shaft 1115 (and the shaft 1115 could subsequently be attached to a motor or other power source, or an electrical generator, for example—although these are not shown in the drawing).

Figure 11B:
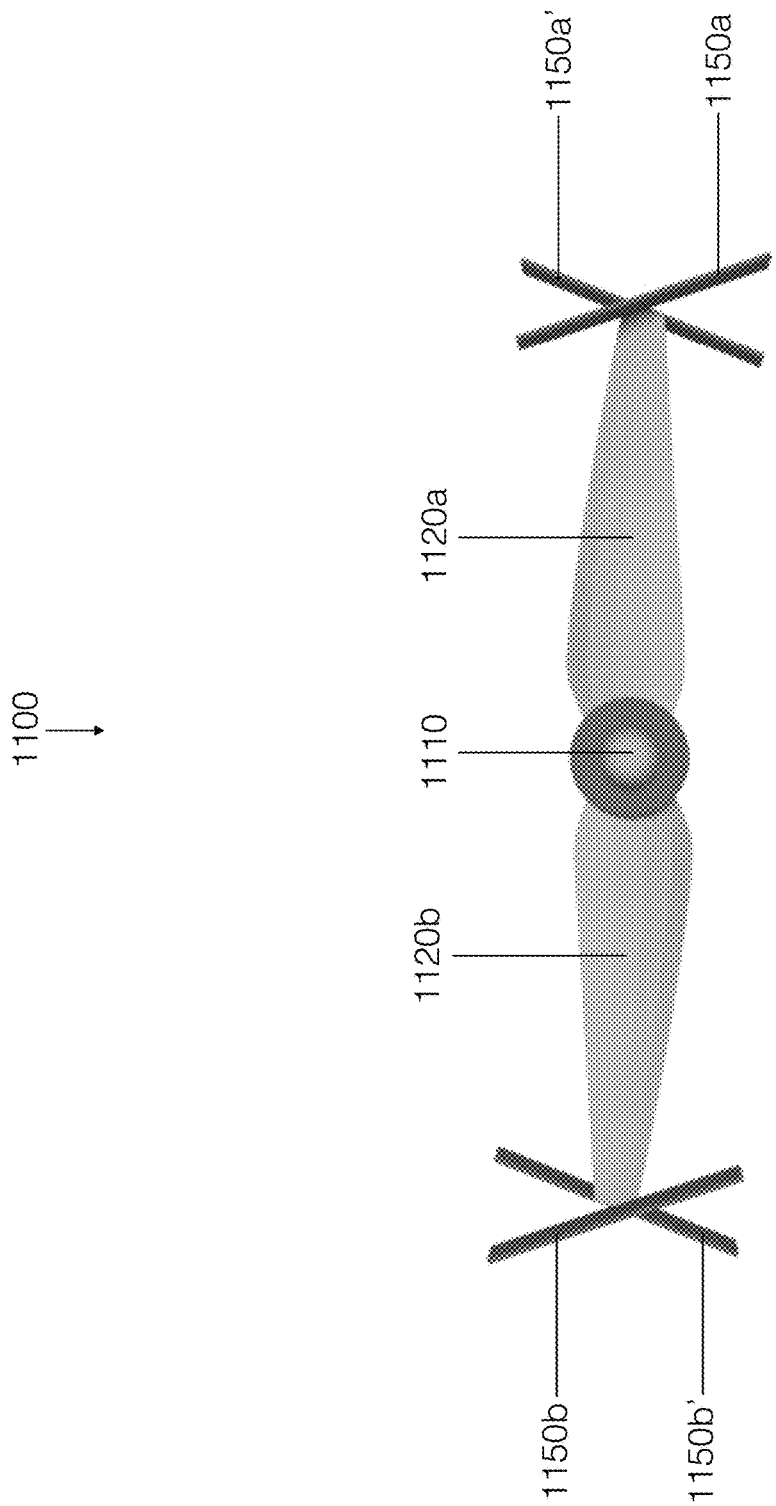
FIG. 11B shows a top down view of an embodiment of a 2 blade propeller with 2 PME blade-like structures, each PME attached to a blade tip distal end.
Figure 11C:
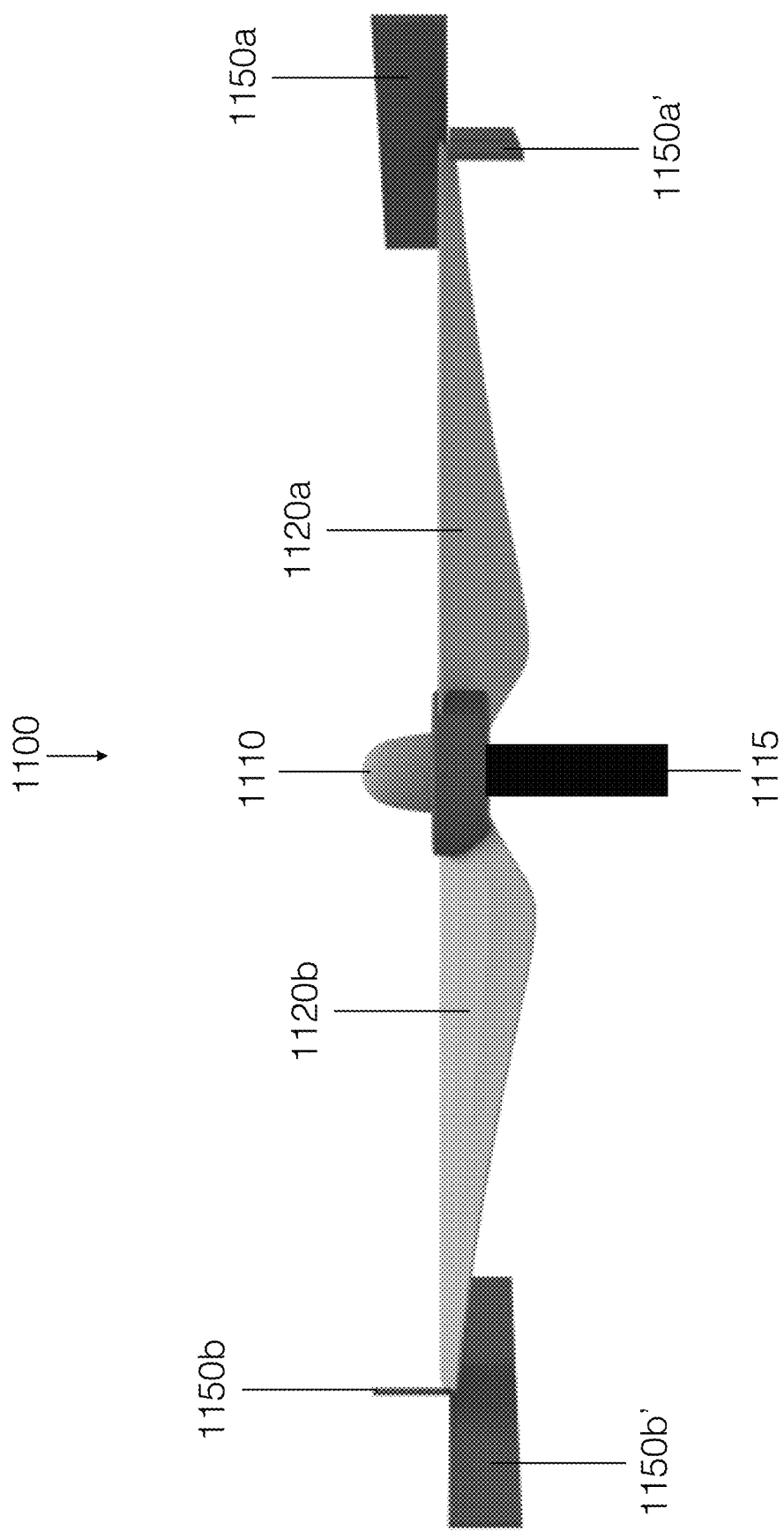
FIG. 11C shows a side view of an embodiment of a 2 blade propeller with 2 PME blade-like structures, each PME attached to a blade tip distal end.

In the embodiment shown in FIGS. 11A-C, a blade-like structure may serve as an alternative to (or an alternative version of) a pressure modifying element, wherein the blade-like structure causes an increase in pressure in a space that is generally to one side of the plane of rotation, and a decrease in pressure in a space that is generally to the other side of the plane of rotation. The twist of such an embodiment is measured relative to the deflection of its individual tabs.

FIG. 11B shows a top down view of a propeller embodiment 1100 with a first blade 1120a and a second blade 1120b. A first blade-like structure has a first tab 1150a and a second tab 1150a' that are attached to the tip of the first blade 1120a. A second blade-like structure has a first tab 1150b and a second tab 1150b' that are attached to the tip of the second blade 1120b. This propeller embodiment 1100 includes a central hub 1110 that is attached to an elongated shaft 1115 (and the shaft 1115 could subsequently be attached to a motor or other power source, or an electrical generator, for example—although these are not shown in the drawing).

FIG. 11C shows a side view of a propeller embodiment 1100 with a first blade 1120a and a second blade 1120b. A first blade-like structure has a first tab 1150a and a second tab 1150a' that are attached to the tip of the first blade 1120a. A second blade-like structure has a first tab 1150b and a second tab 1150b' that are attached to the tip of the second blade 1120b. This propeller embodiment 1100 includes a central hub 1110 that is attached to an elongated shaft 1115 (and the shaft 1115 could subsequently be attached to a motor or other power source, or an electrical generator, for example—although these are not shown in the drawing).

Figure 12A:
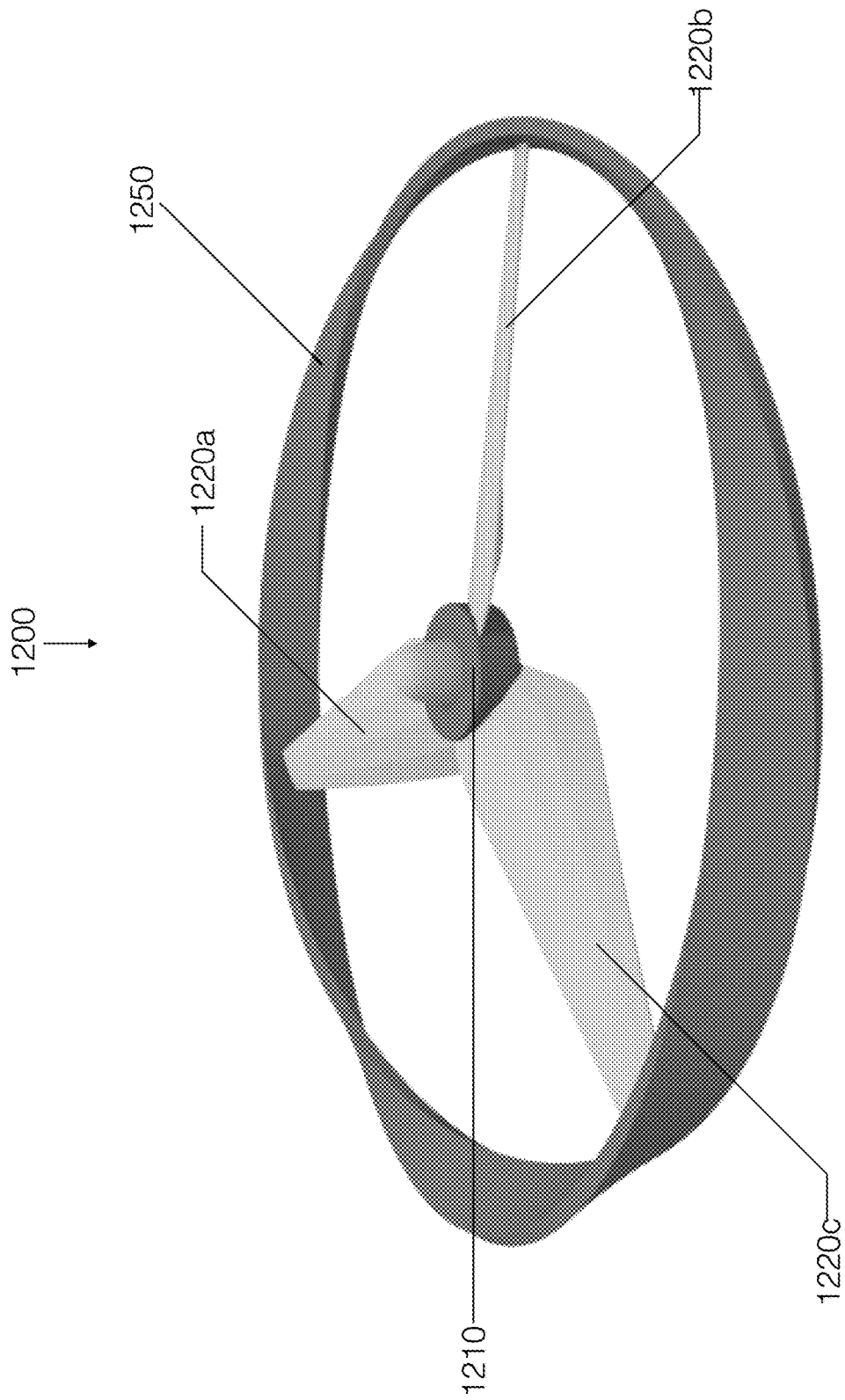
FIG. 12A shows a perspective view of an embodiment of a 3 blade propeller with a continuous Pressure Modifying Element having a 180 degree counterclockwise twist between adjacent blades, and that is attached to the propeller tips in an orientation that is perpendicular to the plane of rotation.

FIG. 12A shows a perspective view of an embodiment of a 3 blade propeller 1200 with a continuous pressure modifying element 1250 having a 180 degree counterclockwise twist between adjacent blades 1220a, 1220b, 1220c (1.5 degrees of clockwise twist for every 1.0 degree of arc moving in a clockwise direction). In FIG. 12A, the propeller 1200 has a central hub 1210, and each of the four blades 1220a, 1220b, 1220c extend out from the central hub 1210. The pressure modifying element 1250 is attached to each blade 1220a, 1220b, 1220c tip in an orientation (relative to the direction of a chord of the pressure modifying element 1250) that is substantially perpendicular to the plane of rotation of the propeller embodiment 1200.

Figure 12B:
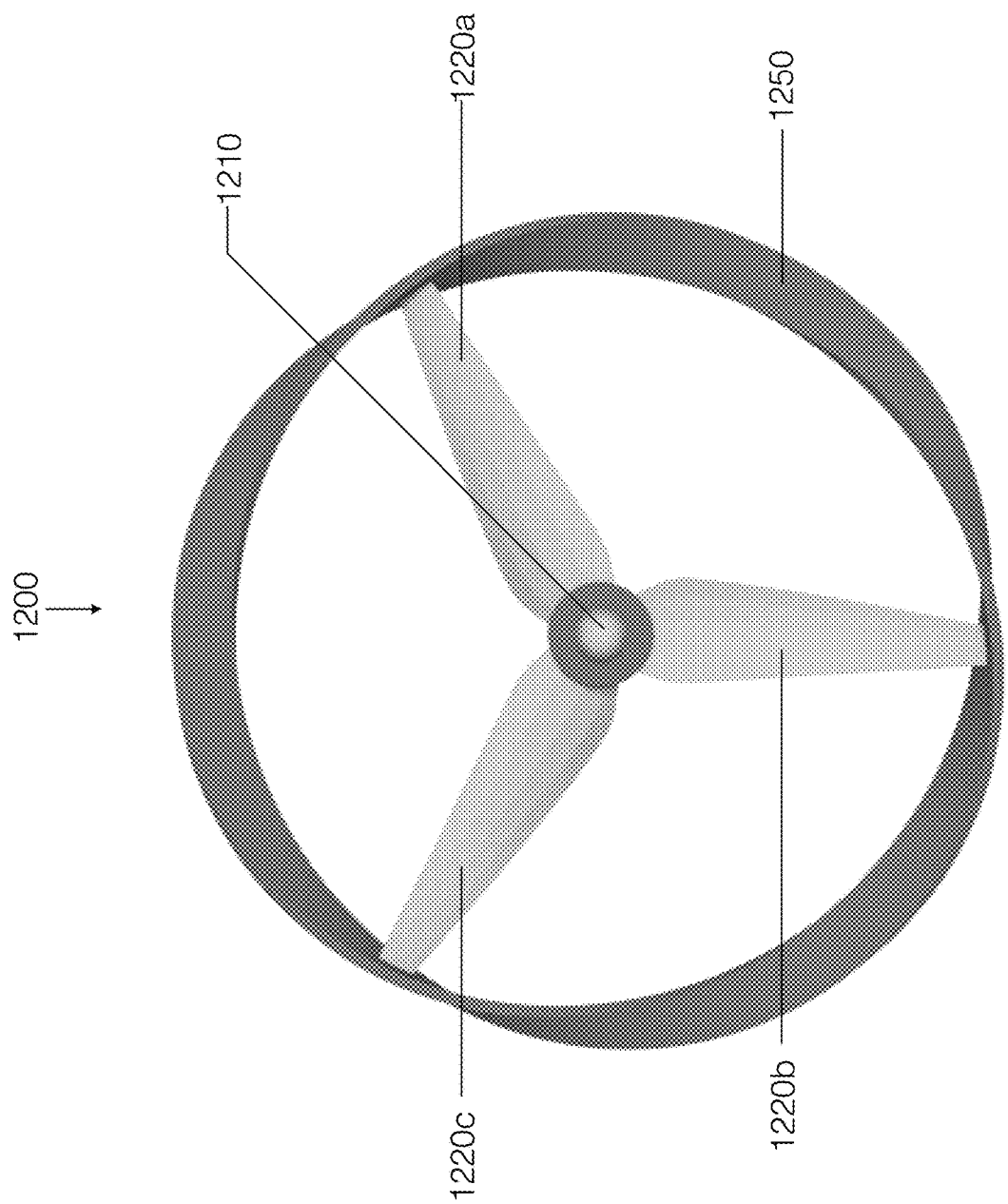
FIG. 12B shows a top down view of an embodiment of a 3 blade propeller with a continuous Pressure Modifying Element having a 180 degree counterclockwise twist between adjacent blades, and that is attached to the propeller tips in an orientation that is perpendicular to the plane of rotation.

FIG. 12B shows a top down view of an embodiment of a 3 blade propeller 1200 with a continuous pressure modifying element 1250 having a 180 degree counterclockwise twist between adjacent blades 1220a, 1220b, 1220c (1.5 degrees of clockwise twist for every 1.0 degree of arc moving in a clockwise direction). In FIG. 12B, the propeller 1200 has a central hub 1210, and each of the four blades 1220a, 1220b, 1220c extend out from the central hub 1210. The pressure modifying element 1250 is attached to each blade 1220a, 1220b, 1220c tip in an orientation (relative to the direction of a chord of the pressure modifying element 1250) that is substantially perpendicular to the plane of rotation of the propeller embodiment 1200.

Figure 12C:
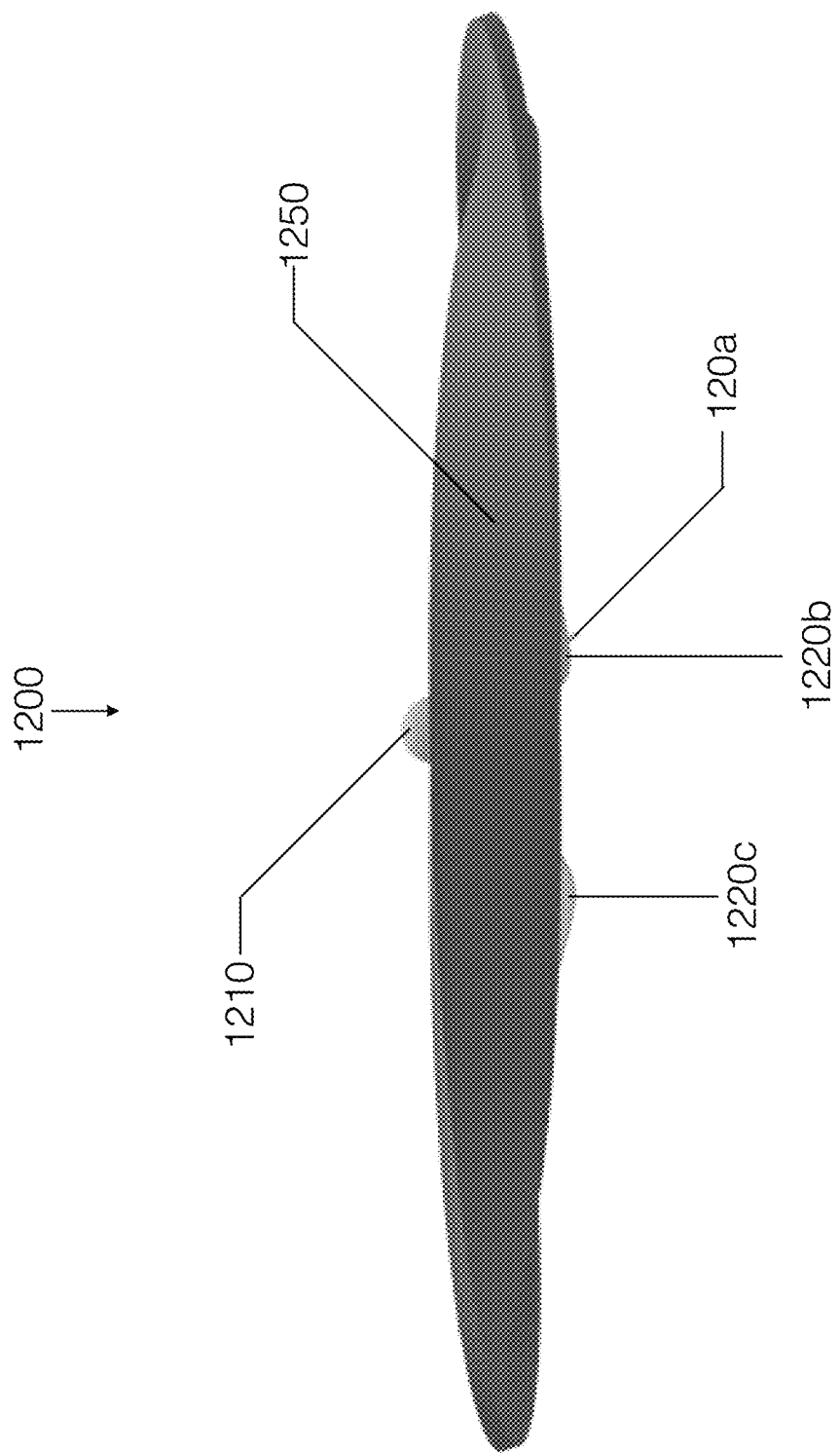
FIG. 12C shows a side view of an embodiment of a 3 blade propeller with a continuous Pressure Modifying Element having a 180 degree counterclockwise twist between adjacent blades, and that is attached to the propeller tips in an orientation that is perpendicular to the plane of rotation.

FIG. 12C shows a side view of an embodiment of a 3 blade propeller 1200 with a continuous pressure modifying element 1250 having a 180 degree counterclockwise twist between adjacent blades 1220a, 1220b, 1220c (1.5 degrees of clockwise twist for every 1.0 degree of arc moving in a clockwise direction). In FIG. 12C, the propeller 1200 has a central hub 1210, and each of the four blades 1220a, 1220b, 1220c extend out from the central hub 1210. The pressure modifying element 1250 is attached to each blade 1220a, 1220b, 1220c tip in an orientation (relative to the direction of a chord of the pressure modifying element 1250) that is substantially perpendicular to the plane of rotation of the propeller embodiment 1200.

Figure 13A:
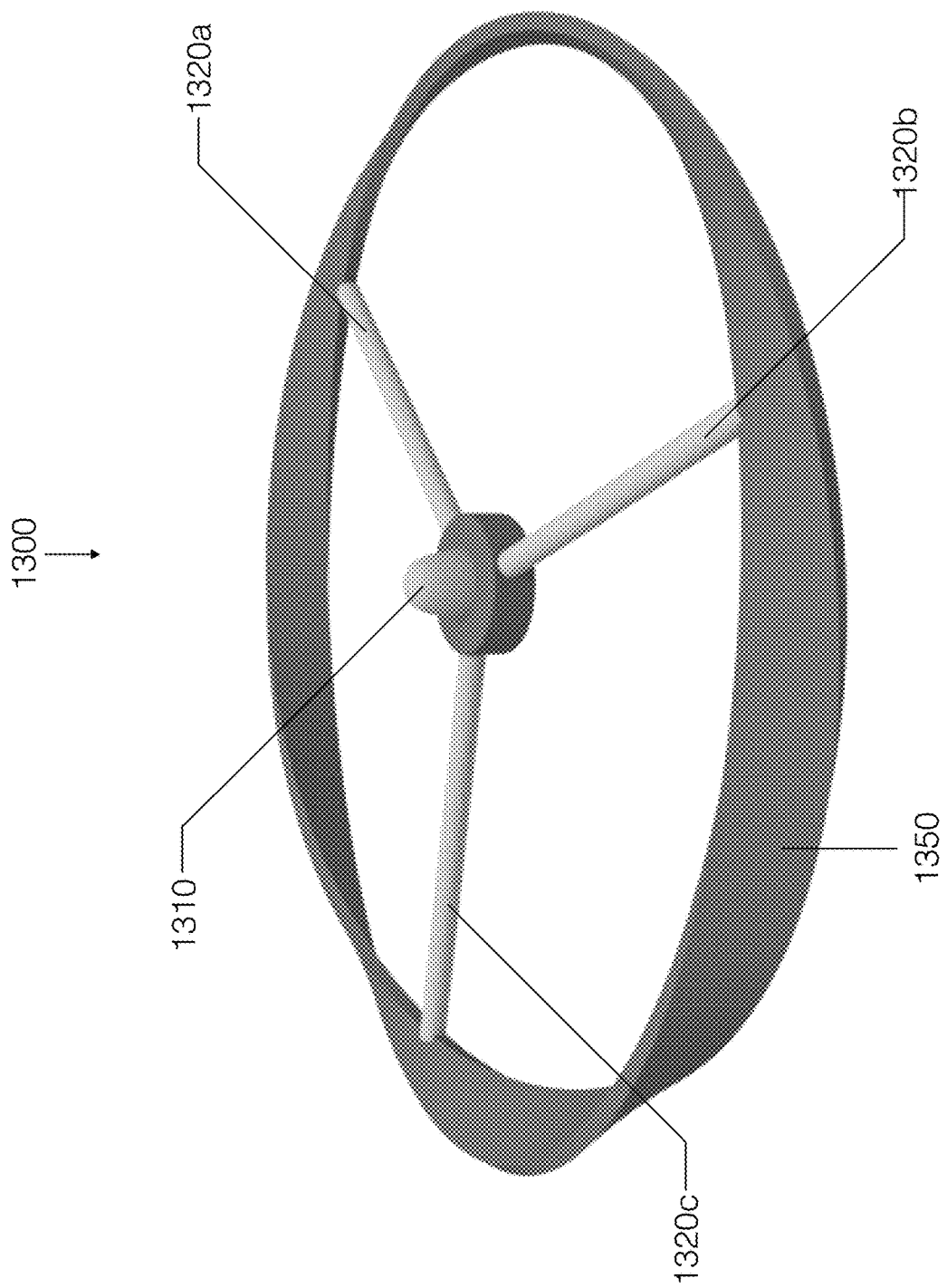
FIG. 13A shows a perspective view of an embodiment of a continuous Pressure Modifying Element with a 180 degree counterclockwise twist between adjacent attachment means, and with the continuous PME attached to each of the attachment means in an orientation that is parallel to the embodiment's plane of rotation.

FIG. 13A shows a perspective view of an embodiment of a propeller 1300 of the invention with a hub 1310 and 3 attachment means 1320a, 1320b, 1320c to which a continuous PME 1350 is attached. The pressure modifying element 1350 is attached to each attachment means (e.g., post) 1320a, 1320b, 1320c at its distal end, and in an orientation that is substantially parallel to the plane of rotation of the embodiment of the propeller 1300 of the invention.

Figure 13B:
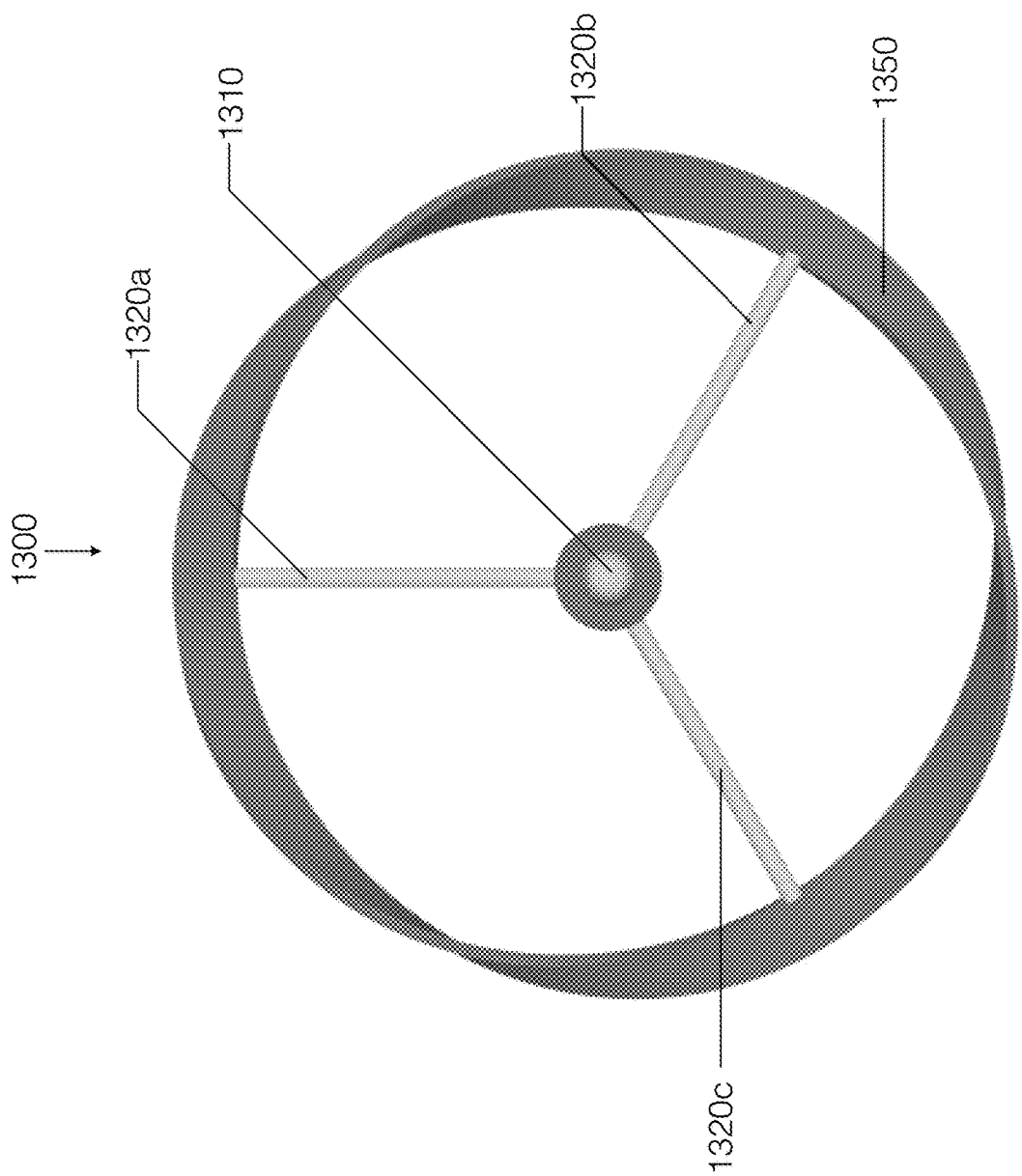
FIG. 13B shows a top down view of an embodiment of a continuous Pressure Modifying Element with a 180 degree counterclockwise twist between adjacent attachment means, and with the continuous PME attached to each of the attachment means in an orientation that is parallel to the embodiment's plane of rotation.

FIG. 13B shows a top down view of an embodiment of a propeller 1300 of the invention with a hub 1310 and 3 attachment means 1320a, 1320b, 1320c to which a continuous PME 1350 is attached. The pressure modifying element 1350 is attached to each attachment means (e.g., post) 1320a, 1320b, 1320c at its distal end, and in an orientation that is substantially parallel to the plane of rotation of the embodiment of the propeller 1300 of the invention.

Figure 13C:
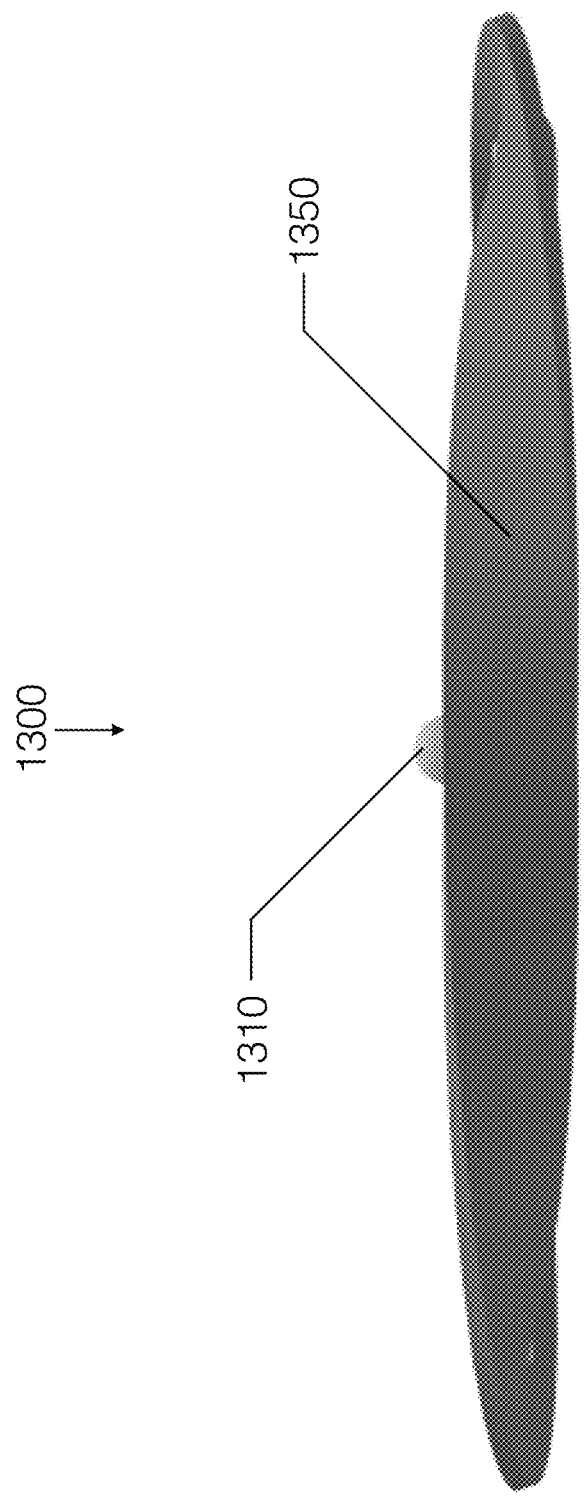
FIG. 13C shows a side view of an embodiment of a continuous Pressure Modifying Element with a 180 degree counterclockwise twist between adjacent attachment means, and with the continuous PME attached to each of the attachment means in an orientation that is parallel to the embodiment's plane of rotation.

FIG. 13C shows a side view of an embodiment of a propeller 1300 of the invention with a hub 1310 and 3 attachment means 1320a, 1320b, 1320c to which a continuous PME 1350 is attached. The pressure modifying element 1350 is attached to each attachment means (e.g., post) 1320a, 1320b, 1320c at its distal end, and in an orientation that is substantially parallel to the plane of rotation of the embodiment of the propeller 1300 of the invention.

Figure 14A:
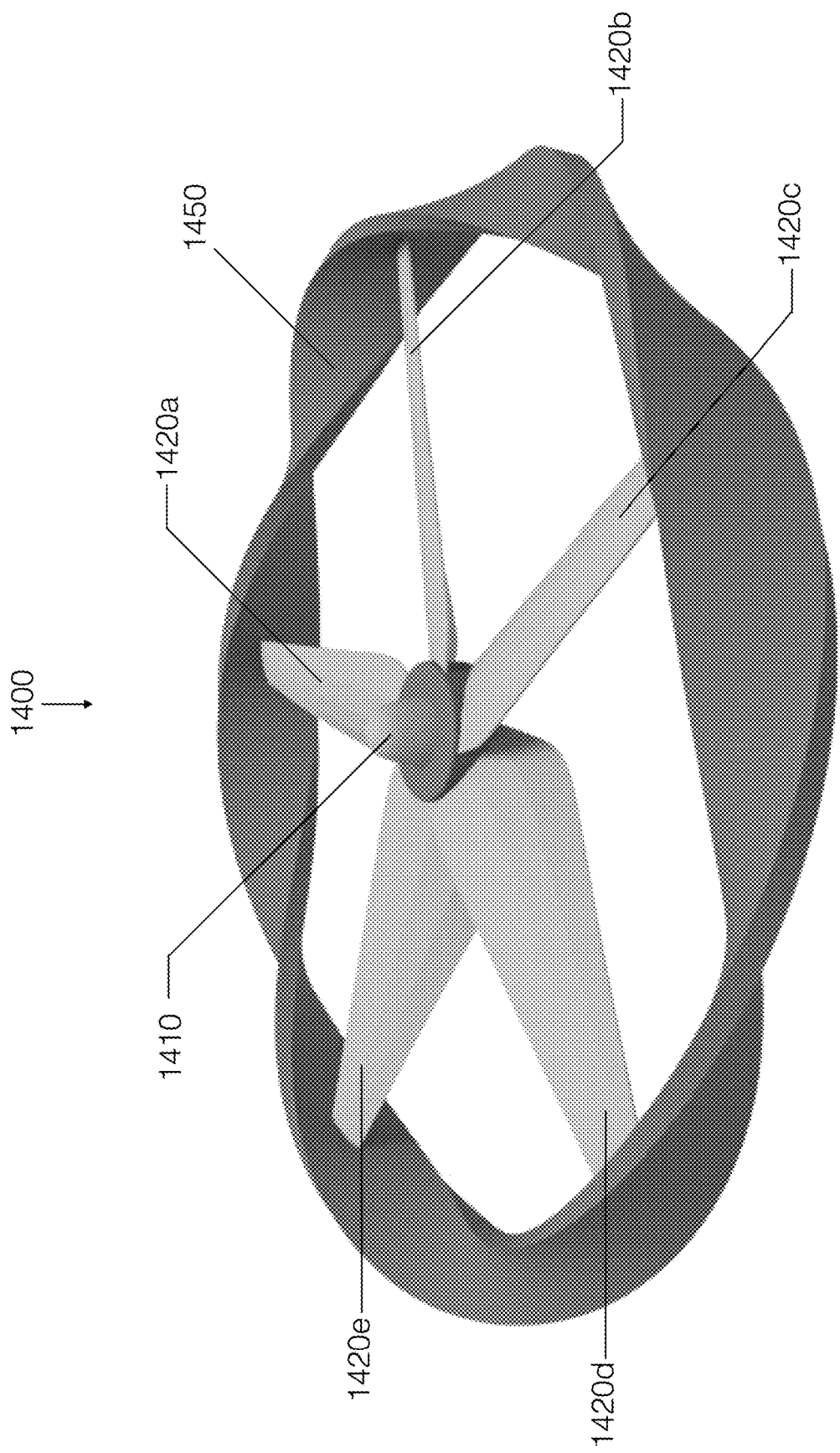
FIG. 14A shows a perspective view of an embodiment of a 5 blade propeller with a continuous Pressure Modifying Element having a 180 degree clockwise twist between adjacent blades, wherein the PME is attached to the blade tips in an orientation that is perpendicular to the plane of rotation.

FIG. 14A shows a perspective view of an embodiment of a 5 blade propeller 1400 with a continuous pressure modifying element 1450 having a 180 degree clockwise twist between adjacent blades 1420a, 1420b, 1420c, 1420d, 1420e. In FIG. 14A, the propeller 1400 has a central hub 1410, and each of five blades 1420a, 1420b, 1420c, 1420d, 1420e emanate out from the hub 1410. The continuous pressure modifying element 1450 is attached to each blade 1420a, 1420b, 1420c, 1420d, 1420e tip in an orientation that is substantially perpendicular (its longer flat surfaces at each tip region) to the plane of rotation of the propeller embodiment 400.

Figure 14B:
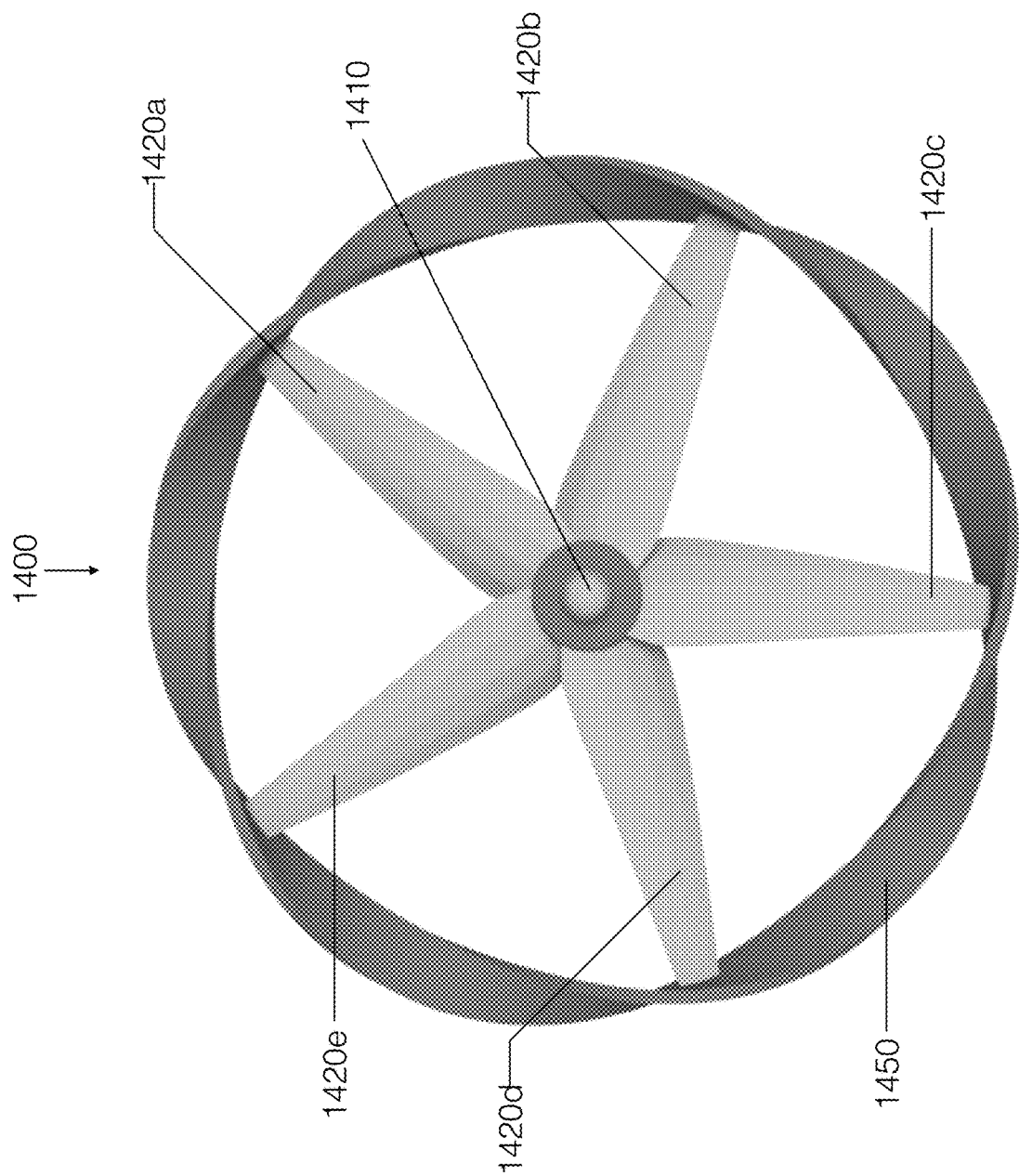
FIG. 14B shows a top down view of an embodiment of a 5 blade propeller with a continuous Pressure Modifying Element having a 180 degree clockwise twist between adjacent blades, wherein the PME is attached to the blade tips in an orientation that is perpendicular to the plane of rotation.

FIG. 14B shows a top down view of an embodiment of a 5 blade propeller 1400 with a continuous pressure modifying element 1450 having a 180 degree clockwise twist between adjacent blades 1420a, 1420b, 1420c, 1420d, 1420e. In FIG. 14B, the propeller 1400 has a central hub 1410, and each of five blades 1420a, 1420b, 1420c, 1420d, 1420e emanate out from the hub 1410. The continuous pressure modifying element 1450 is attached to each blade 1420a, 1420b, 1420c, 1420d, 1420e tip in an orientation that is substantially perpendicular (its longer flat surfaces at each tip region) to the plane of rotation of the propeller embodiment 400.

Figure 14C:
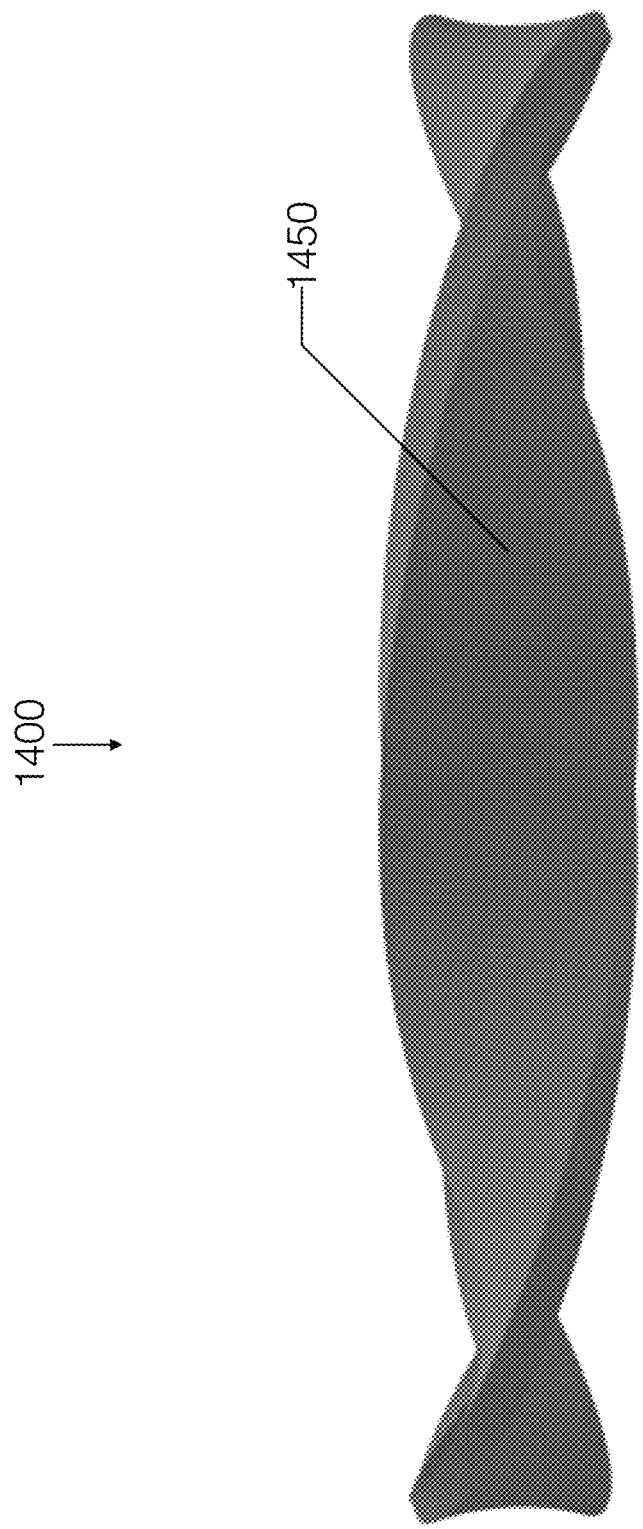
FIG. 14C shows a side view of an embodiment of a 5 blade propeller with a continuous Pressure Modifying Element having a 180 degree clockwise twist between adjacent blades, wherein the PME is attached to the blade tips in an orientation that is perpendicular to the plane of rotation.

FIG. 14C shows a side view of an embodiment of a 5 blade propeller 1400 with a continuous pressure modifying element 1450 having a 180 degree clockwise twist between adjacent blades 1420a, 1420b, 1420c, 1420d, 1420e. In FIG. 14C, the propeller 1400 has a central hub 1410, and each of five blades 1420a, 1420b, 1420c, 1420d, 1420e extend out from the hub 1410. The continuous pressure modifying element 1450 is attached to each blade 1420a, 1420b, 1420c, 1420d, 1420e tip in an orientation that is substantially perpendicular (per its elongated chord at each blade attachment point) to the plane of rotation of the propeller embodiment 400.

Figure 15A:
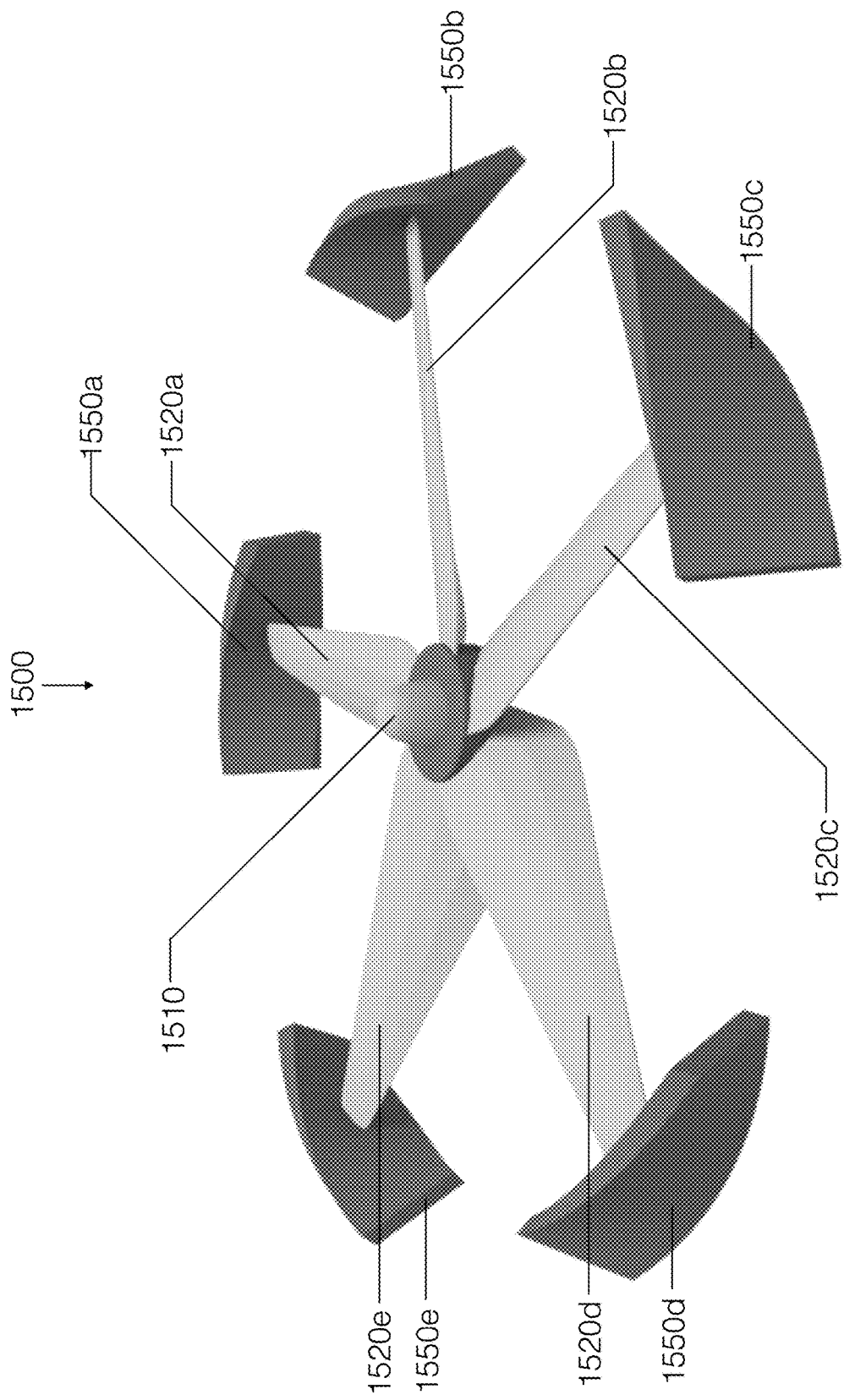
FIG. 15A shows a perspective view of an embodiment of a 5 blade propeller having discontinuous Pressure Modifying Element with a 180 degree clockwise twist between adjacent blades, wherein the PME exists consists of 5 discrete segments, with each of the segments attached to a propeller tip in an orientation that is perpendicular to the plane of rotation.

FIG. 15A shows a perspective view of an embodiment of a propeller 1500 of the invention that has a hub 1510, five blades 1520a, 1520b, 1520c, 1520d, 1520e, and five pressure modifying element segments 1550a, 1550b, 1550c, 1550d, 1550e. Each pressure modifying element segment is attached to a blade tip (one PME segment per blade tip, e.g., the first pressure modifying element 1550a is attached to the first blade 1520a, the second pressure modifying element 1550b is attached to the second blade 1520b, the third pressure modifying element 1550c is attached to the third blade 1520c, the fourth pressure modifying element 1550d is attached to the fourth blade 1520d, and the fifth pressure modifying element 1550e is attached to the fifth blade 1520e). Embodiments with another (greater or lesser) number of blades and pressure modifying elements can display a similar one-to-one arrangement. Other embodiments can include more than one pressure modifying element attached to each blade, as well. Such embodiments can have each blade's pressure modifying element(s) attached to any part of the blade, either directly or indirectly, e.g., proximal blade section, mid-section, or blade tip, or any other position along the length of a blade. Other similar embodiments of propellers of the invention having multiple PMEs or PME segments and anticipated by the invention.

Figure 15B:
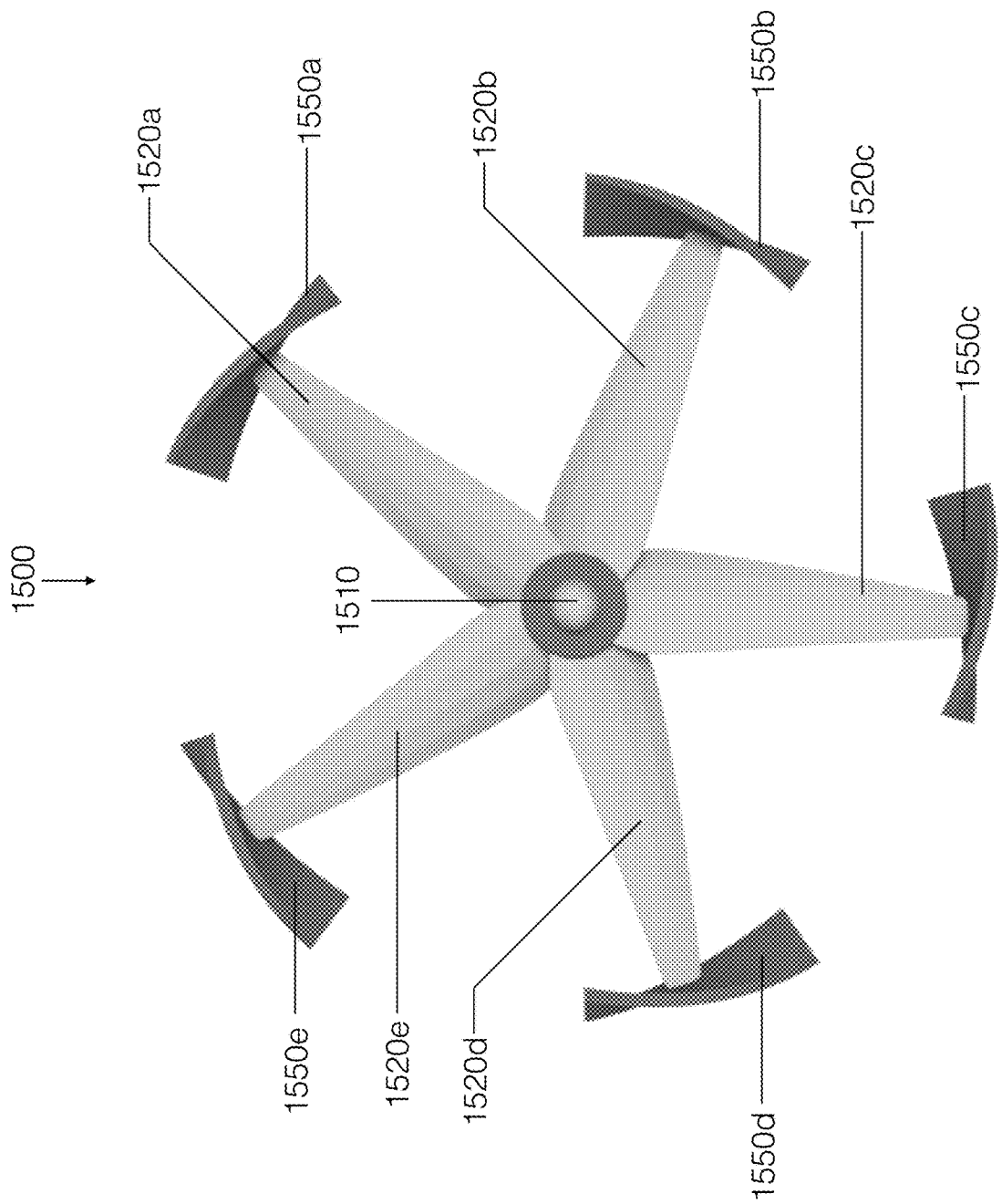
FIG. 15B shows a top down view of an embodiment of a 5 blade propeller having discontinuous Pressure Modifying Element with a 180 degree clockwise twist between adjacent blades, wherein the PME exists consists of 5 discrete segments, with each of the segments attached to a propeller tip in an orientation that is perpendicular to the plane of rotation.

FIG. 15B shows a top down view of an embodiment of a propeller 1500 of the invention that has a hub 1510, five blades 1520a, 1520b, 1520c, 1520d, 1520e, and five pressure modifying element segments 1550a, 1550b, 1550c, 1550d, 1550e. Each pressure modifying element segment is attached to a blade tip (one PME segment per blade tip, e.g., the first pressure modifying element 1550a is attached to the first blade 1520a, the second pressure modifying element 1550b is attached to the second blade 1520b, the third pressure modifying element 1550c is attached to the third blade 1520c, the fourth pressure modifying element 1550d is attached to the fourth blade 1520d, and the fifth pressure modifying element 1550e is attached to the fifth blade 1520e).

Figure 15C:
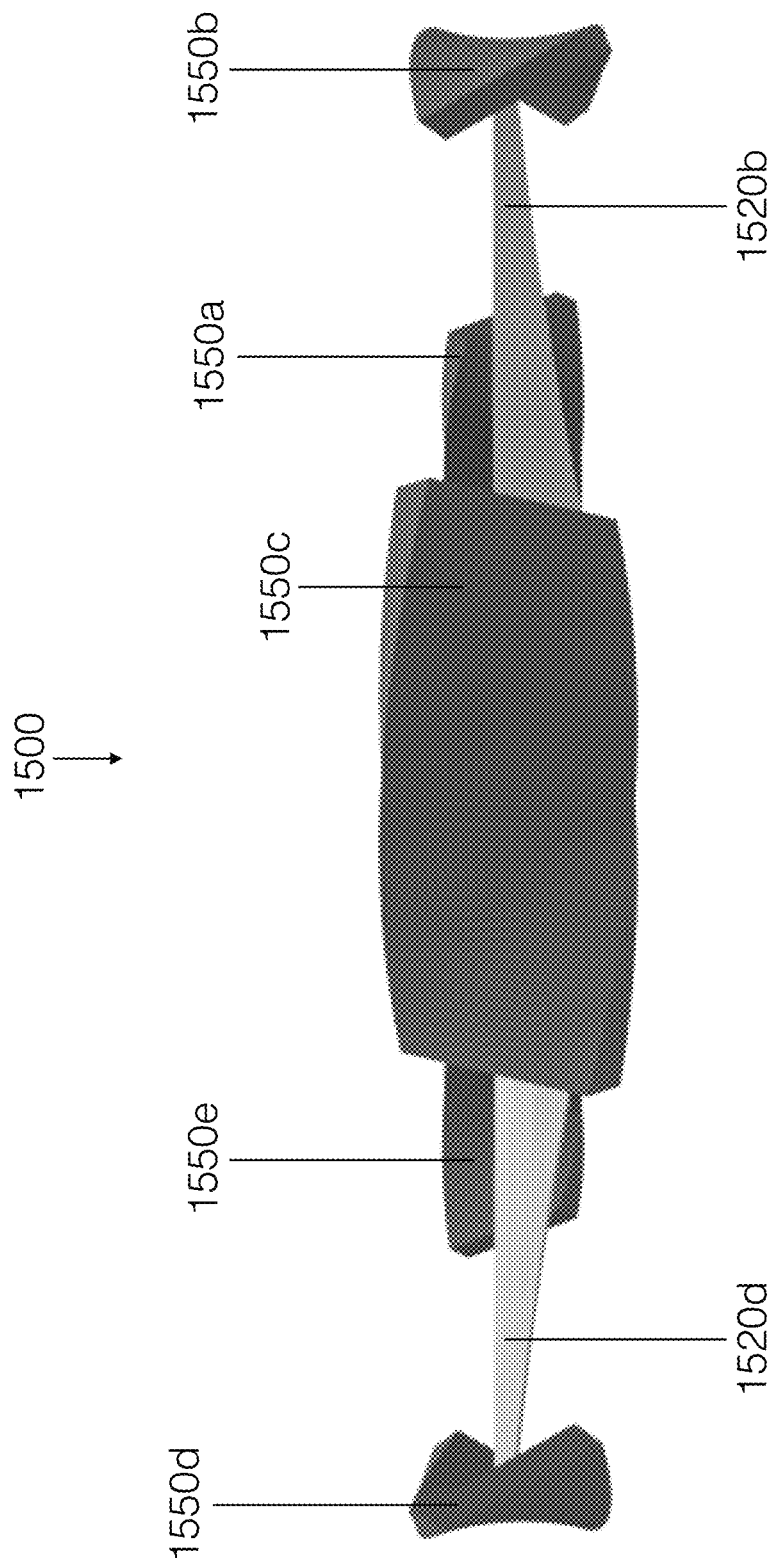
FIG. 15C shows a side view of an embodiment of a 5 blade propeller having discontinuous Pressure Modifying Element with a 180 degree clockwise twist between adjacent blades, wherein the PME exists consists of 5 discrete segments, with each of the segments attached to a propeller tip in an orientation that is perpendicular to the plane of rotation.

FIG. 15C shows a side view of an embodiment of a propeller 1500 of the invention that has a hub 1510, five blades 1520a, 1520b, 1520c, 1520d, 1520e, and five pressure modifying element segments 1550a, 1550b, 1550c, 1550d, 1550e. Each pressure modifying element segment is attached to a blade tip (one PME segment per blade tip, e.g., the first pressure modifying element 1550a is attached to the first blade 1520a, the second pressure modifying element 1550b is attached to the second blade 1520b, the third pressure modifying element 1550c is attached to the third blade 1520c, the fourth pressure modifying element 1550d is attached to the fourth blade 1520d, and the fifth pressure modifying element 1550e is attached to the fifth blade 1520e).

Figure 16A:
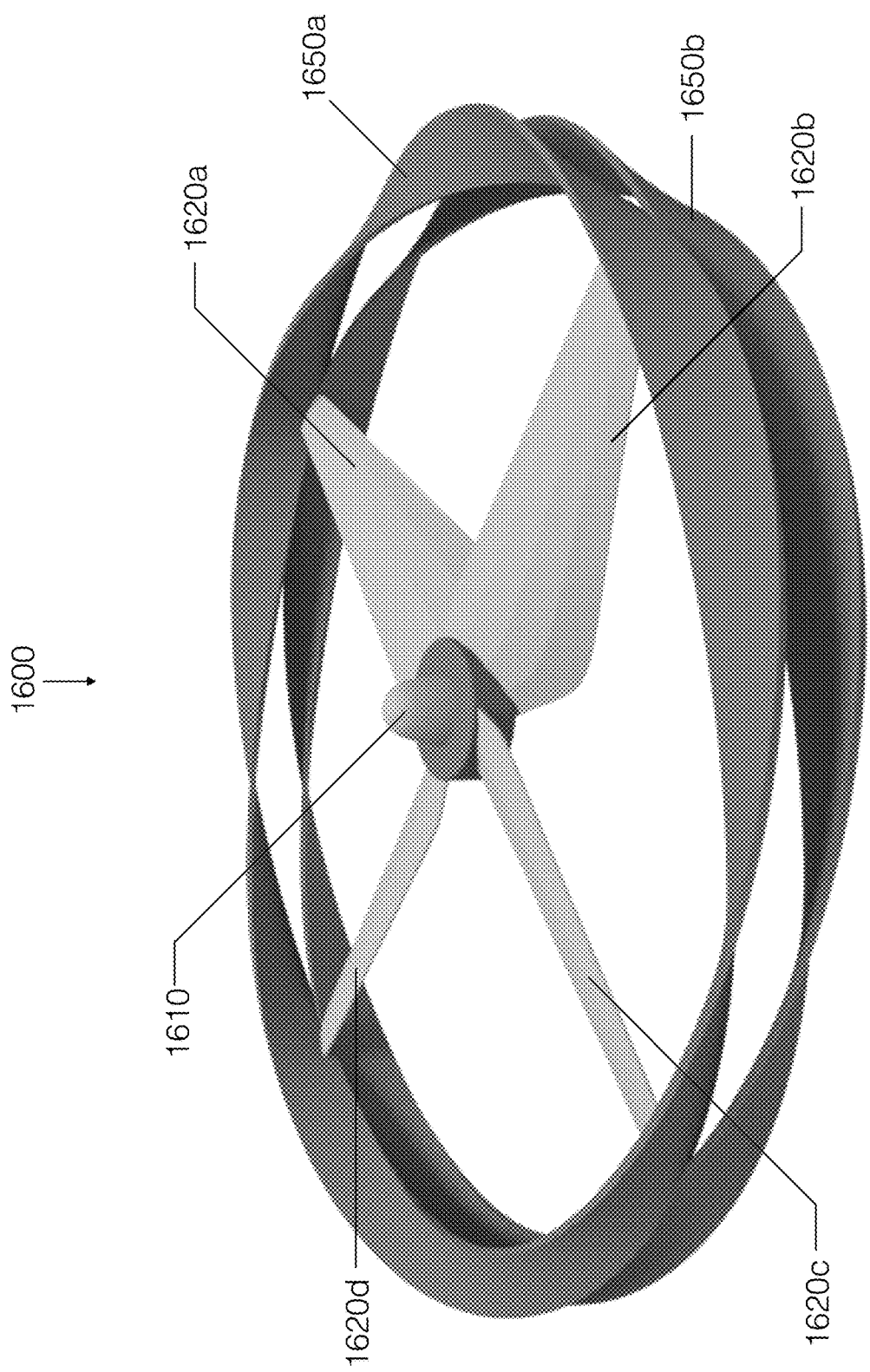
FIG. 16A shows a perspective view of an embodiment of a 4 blade propeller with 2 continuous Pressure Modifying Elements, each PME having 180 degrees of clockwise twist between adjacent blades.

FIG. 16A shows a perspective view of an embodiment 1600 of a 4 blade propeller with a hub 1610, a first blade 1620a, a second blade 1620b, a third blade 1620c, a fourth blade 1620d, a first pressure modifying element 1650a, and a second pressure modifying element 1650b. In this embodiment, both PMEs have 180 degrees of clockwise twist between adjacent blades.

Figure 16B:
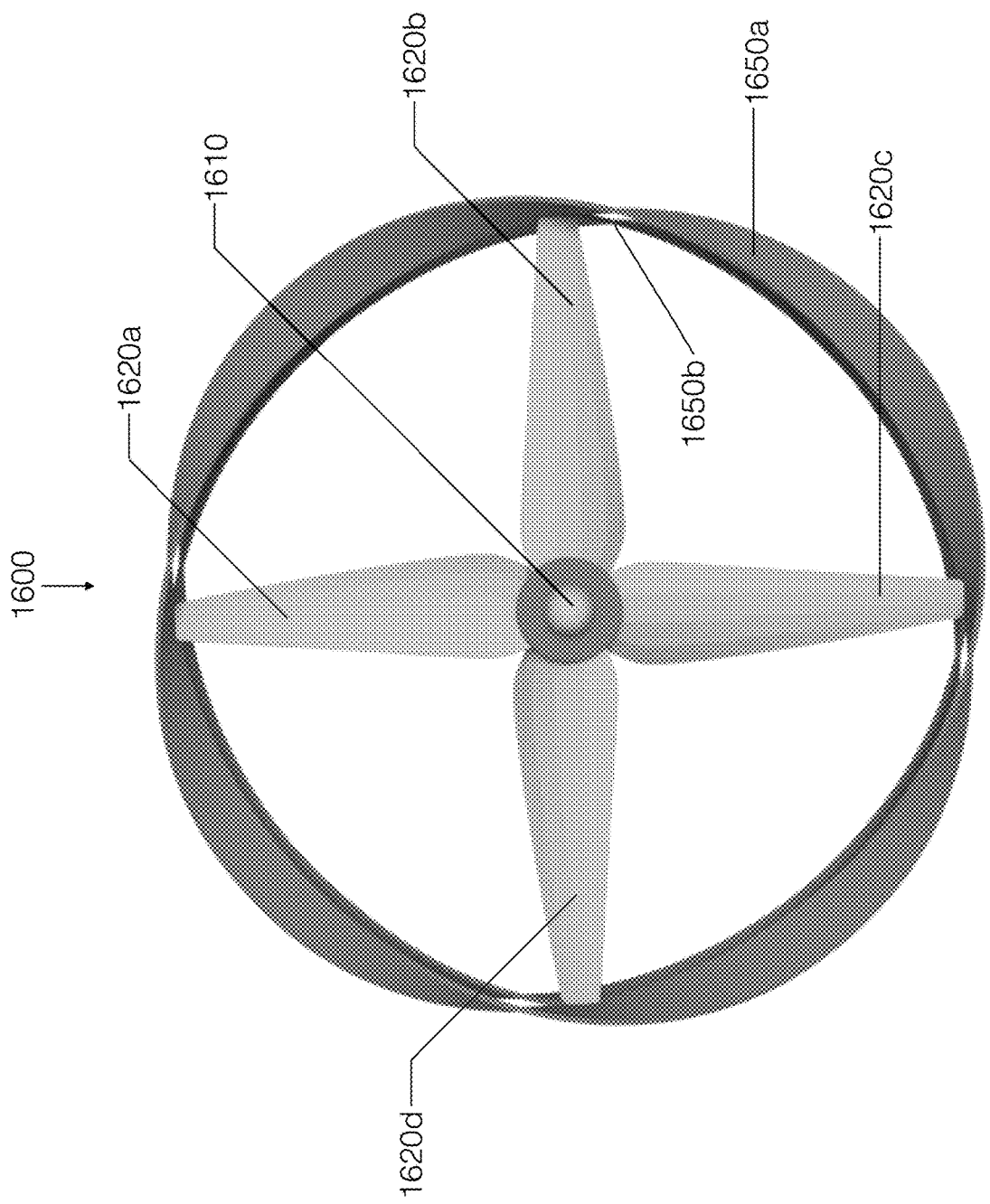
FIG. 16B shows a top down view of an embodiment of a 4 blade propeller with 2 continuous Pressure Modifying Elements, each PME having 180 degrees of clockwise twist between adjacent blades.

FIG. 16B shows a top down view of an embodiment 1600 of a 4 blade propeller with a hub 1610, a first blade 1620a, a second blade 1620b, a third blade 1620c, a fourth blade 1620d, a first pressure modifying element 1650a, and a second pressure modifying element 1650b. In this embodiment, both PMEs have 180 degrees of clockwise twist between adjacent blades.

Figure 16C:
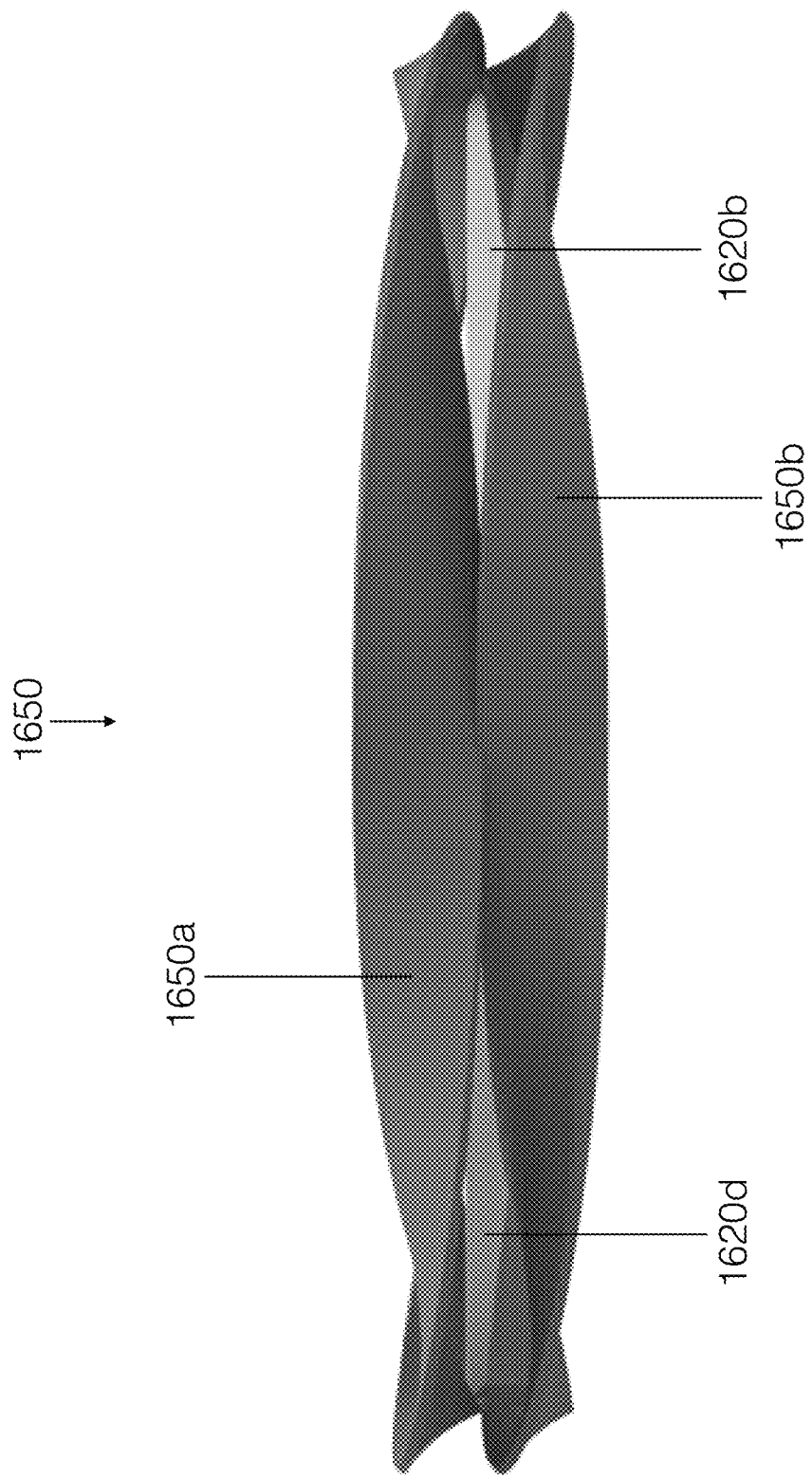
FIG. 16C shows a side view of an embodiment of a 4 blade propeller with 2 continuous Pressure Modifying Elements, each PME having 180 degrees of clockwise twist between adjacent blades.

FIG. 16C shows a side view of an embodiment 1600 of a 4 blade propeller with a hub 1610, a first blade 1620a, a second blade 1620b, a third blade 1620c, a fourth blade 1620d, a first pressure modifying element 1650a, and a second pressure modifying element 1650b. In this embodiment, both PMEs have 180 degrees of clockwise twist between adjacent blades.

In a similar embodiment to the one shown in FIGS. 16A-C, having two stacked PMEs, there can be more or less space between each of the PMEs. Embodiments with multiple stacked PMEs are anticipated by the invention. Such embodiments can have multiple layers of blades or other attachment means extending from a hub that support each PME in a stack, or the PMEs can be connected together to stabilize the stack, e.g., using connecting means that connect a PME with an adjacent PME, for example. The phrase "stacked pressure modifying elements" means, in general, that a first PME is attached to a hub (by means of blades, posts or other means, for example) at a first level (e.g., a first position along the central axis of the hub about which the propeller rotates), and a second PME is attached to the hub (by means of blades, posts or other means, for example) at a second level (e.g., second position along the central axis of the hub about which the propeller rotates, the second position being different from the first position). In such an embodiment, the first PME and the second PME may be close together or spaced apart. Other embodiments having more than two pressure modifying elements are anticipated by the invention. In these embodiments, PMEs may be the same or different, e.g., the same design or different design; the same size (e.g., radius) or different size; all continuous PMEs, a mix of both continuous and discontinuous PMES, or all discontinuous PMEs; the same PME direction of twist or different PME directions of twist. Additionally, PMEs of the invention may be concentrically arranged, e.g., a smaller radius PME and a larger radius PME attached to a hub at the same level. As noted previously, an embodiment of a propeller of the invention may have two or more blades. Additionally, an embodiment of a propeller of the invention may include attachment means that are other than blades, such as posts or other structures that retain or stabilize a PME to a hub of the invention (e.g., such an embodiment may have no blades).

Figure 17A:
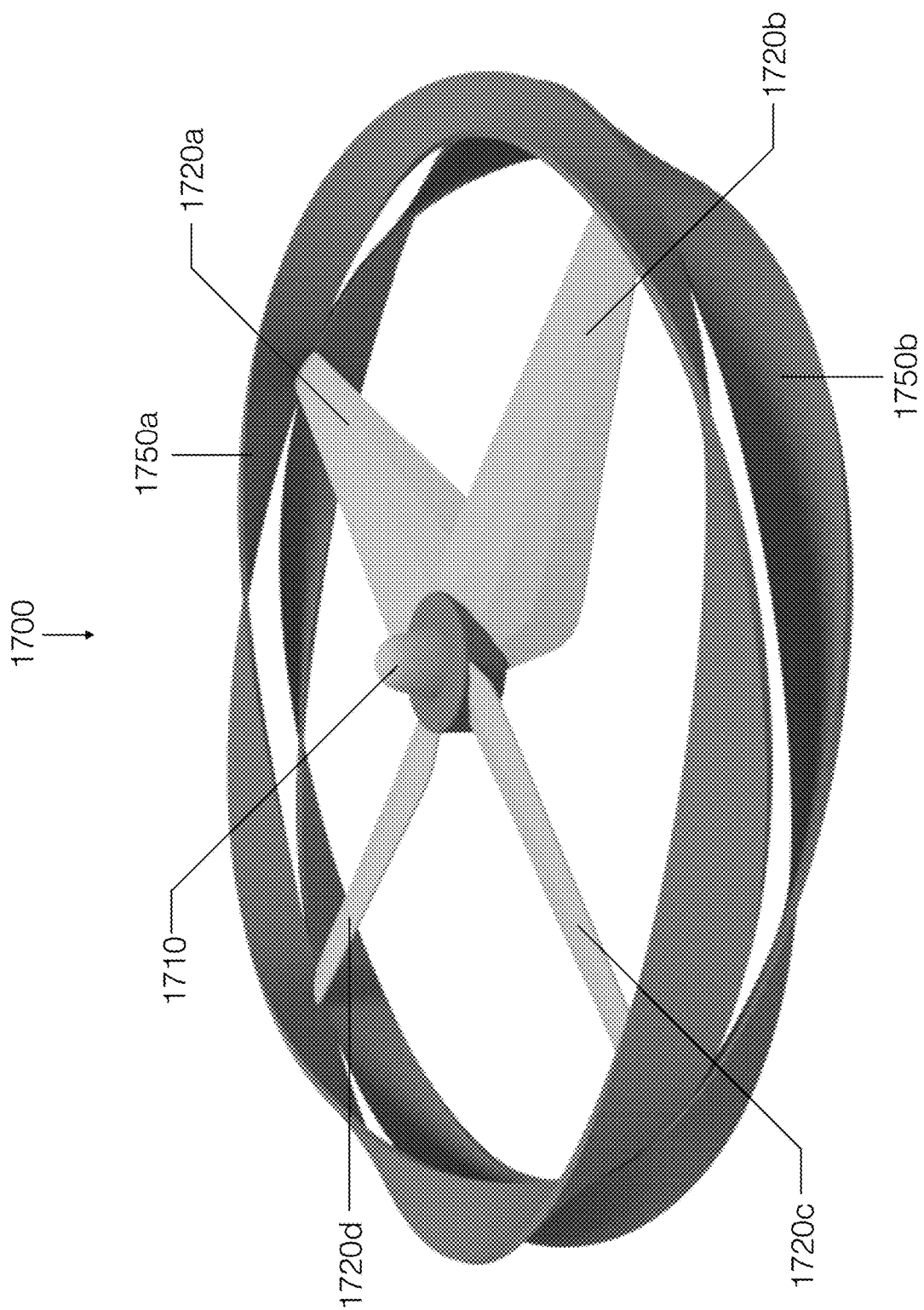
FIG. 17A shows a perspective view of an embodiment of a 4 blade propeller with 2 continuous Pressure Modifying Elements, a first PME having 180 degrees of clockwise twist between adjacent blades, and a second PME having 180 degrees of counterclockwise twist between adjacent blades.

FIG. 17A shows a perspective view of an embodiment 1700 of a 4 blade propeller with a hub 1710, a first blade 1720a, a second blade 1720b, a third blade 1720c, a fourth blade 1720d, a first pressure modifying element 1750a having a counterclockwise twist, and a second pressure modifying element 1750b having a clockwise twist.

Figure 17B:
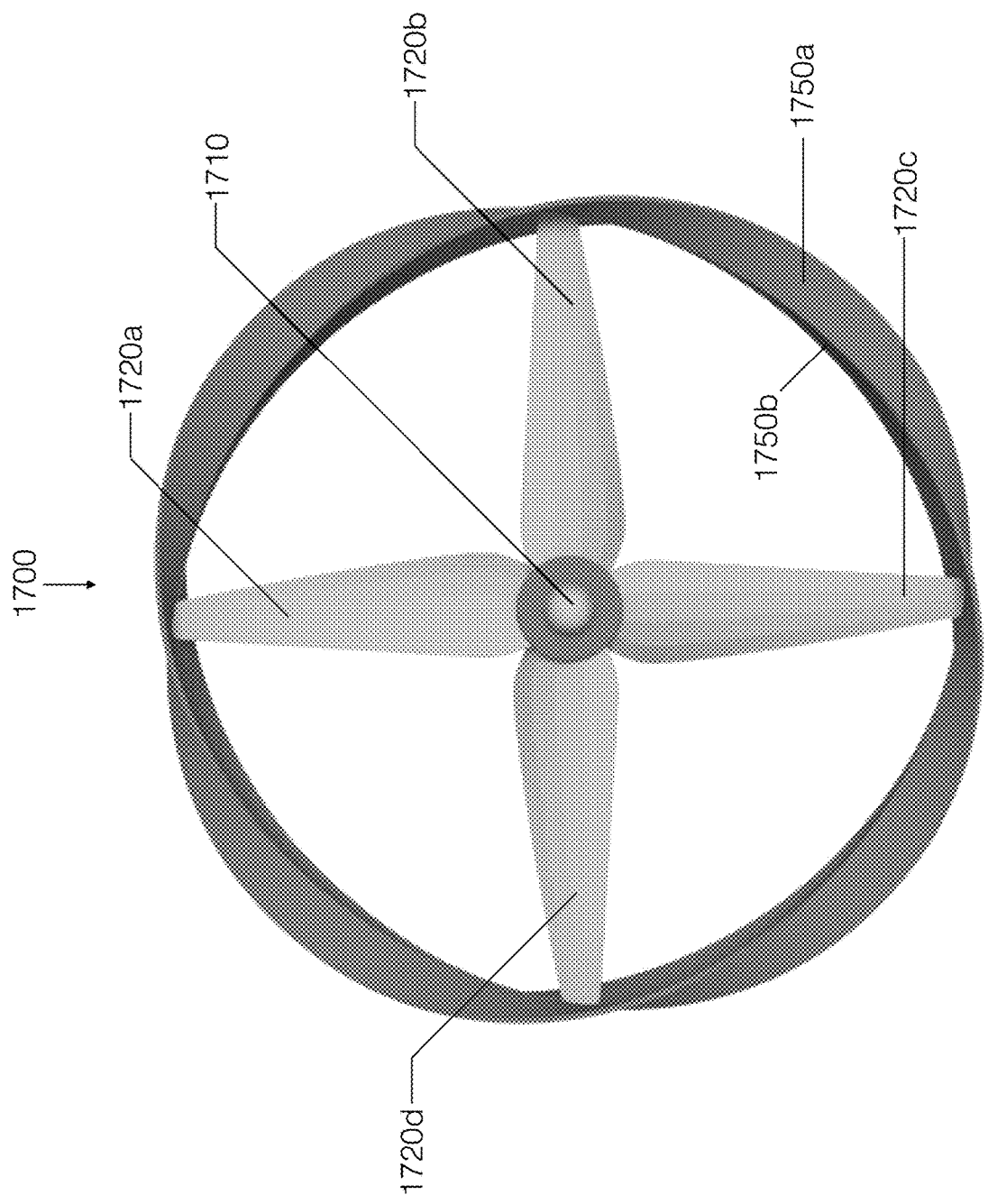
FIG. 17B shows a top down view of an embodiment of a 4 blade propeller with 2 continuous Pressure Modifying Elements, a first PME having 180 degrees of clockwise twist between adjacent blades, and a second PME having 180 degrees of counterclockwise twist between adjacent blades.

FIG. 17B shows a top down view of an embodiment 1700 of a 4 blade propeller with a hub 1710, a first blade 1720a, a second blade 1720b, a third blade 1720c, a fourth blade 1720d, a first pressure modifying element 1750a having a counterclockwise twist, and a second pressure modifying element 1750b having a clockwise twist.

Figure 17C:
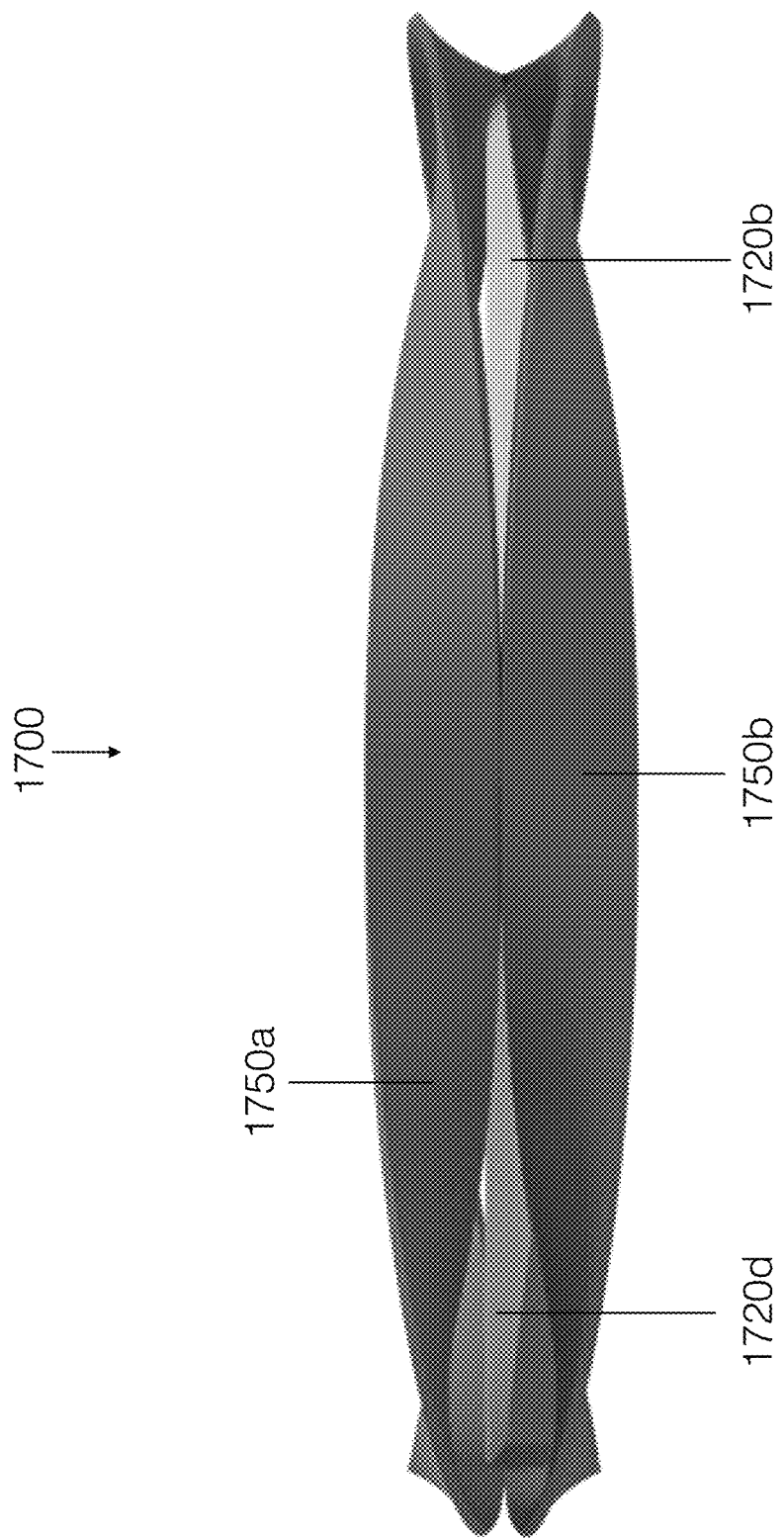
FIG. 17C shows a side view of an embodiment of a 4 blade propeller with 2 continuous Pressure Modifying Elements, a first PME having 180 degrees of clockwise twist between adjacent blades, and a second PME having 180 degrees of counterclockwise twist between adjacent blades.

FIG. 17C shows a side view of an embodiment 1700 of a 4 blade propeller with a hub 1710, a first blade 1720a, a second blade 1720b, a third blade 1720c, a fourth blade 1720d, a first pressure modifying element 1750a having a counterclockwise twist, and a second pressure modifying element 1750b having a clockwise twist.

Figure 18:
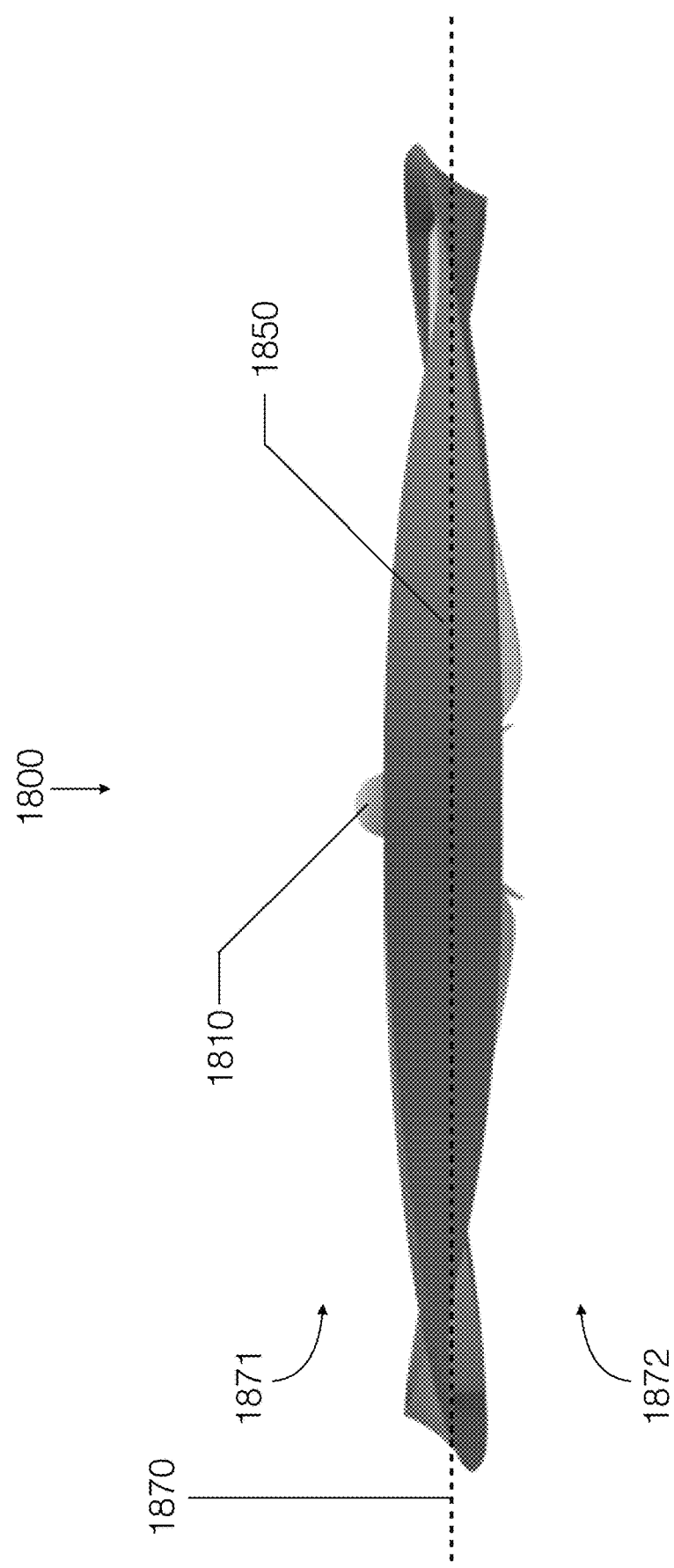
FIG. 18 shows a side view of an embodiment of a propeller of the invention having a PME, and a dotted line representing a plane of rotation (perpendicular to the page) of the embodiment.

FIG. 18 shows a side view of an embodiment of a propeller of the invention 1800 having a PME 1850 and a central hub 1810. In this drawing FIG. 18, the dotted line represents a plane (that is perpendicular to the page) of rotation 1870 of the embodiment 1800. A first space 1871 exists at a first side of the plane of rotation 1870 (above the dotted line, in the drawing), and a second space 1872 exists at a second side of the plane of rotation 1870 (below the dotted line, in the drawing). In embodiments of the invention, a rotating propeller of the invention causes a change in the pressure of a fluid (within which the propeller is rotating) in the space (region) to a first side (e.g., first space 1871) of a plane of rotation. Similarly, in the same or other embodiments of the invention, a rotating propeller causes a change in the pressure of a fluid (within which the propeller is rotating) in the space (region) to a second side (e.g., second space 1872) of a plane of rotation. Such a change in pressure may be an increase or decrease in pressure. In addition, such a change in pressure (up or down) may be considered in absolute terms, or relative to a comparable propeller that does not include a pressure modifying element, for example.

FIG. 19 shows a side view 1900 of an embodiment of a propeller (having a pressure modifying element similar to the one shown in FIGS. 1A-C) of the invention 1950 attached to an aircraft 1902 by means of a shaft 1915. While not shown in FIG. 19, the shaft 1915 could, for example, be attached to a transmission or engine (in the cowling of the aircraft 1902) to cause rotation of the shaft 1915, hub 1910, and propeller 1950 including its pressure modifying element.

While the previous paragraphs describe particular embodiments of the invention as shown in the drawing figures, these embodiments are intended to be representative only, to serve as examples, and to demonstrate the broad range of novel embodiments that are possible and anticipated by this disclosure and the invention. For example, propellers of the invention can include individual elements (e.g., hub, blade, shaft, attachment means, pressure modifying element) having many possible variations, including but not limited to any of a wide range of sizes, shapes, designs, details, materials, and more. Elements of the invention can also be configured, arranged, assembled, manufactured, attached and associated with other elements of the invention in any of a variety of ways. Furthermore, relating to the drawings and for clarity, note that at least some of the "top down" and "side" drawing views are better described as top down perspective views, and side perspective views, respectively (as opposed to an orthogonal projection, for example, which is the reason why certain blade-to-PME connection points may not appear aligned, since they are being presented as a perspective view, for example).

Embodiments of the invention provide benefits for a wide range of applications. Applications for propellers and pressure modifying element structures of the invention include, but are not limited to, use with: fans, pumps, watercraft, aircraft, rotorcraft, engines, turbines, autogyros, drones, medical devices, wind generators, mixers, blenders, excavators, drilling rigs, and more.

Embodiments of the invention may be used in a variety of aircraft applications. For example, embodiments of the invention are useful as airplane propellers. Embodiments of propellers of the invention may be useful as replacement (or retrofit) propellers for a variety of propeller-equipped aircraft. Embodiments of the invention may also be useful with drones. Embodiments of the invention may also benefit rotorcraft. Embodiments of propellers of the invention have blades that may be adjusted during operation, e.g., adjustable angle of attack of one or more blades, either concurrently or independently. Yet other embodiments of the invention may be useful for autogyros, and may improve the viability of autogyros. Additionally, embodiments of the invention can provide benefits for aircraft or watercraft, including to enhance a surface of an object (e.g., a wing, blade, or foil) to modify its lift or other aerodynamic or hydrodynamic characteristics. In yet another possible embodiment, a structure or frame can support multiple propeller assemblies of the invention (in two dimensions or three dimensions) to provide an assembly that efficiently generates lift, either actively or passively) as it is moved through air, e.g., an autogyro-like surface made of multiple pressure modifying elements of the invention.

Specific terms used herein are not intended to be limiting, and may represent two or more concepts (or elements of the invention) as an integrated whole, for example. As one example, a shaft of a propeller of the invention and a hub of a propeller of the invention may be integrated such that a portion of the shaft serves as a portion of the hub, and vice-versa. Similar situations may exist between blades and pressure modifying elements, blades and attachment means, pressure modifying elements and attachment means, hubs and blades, and more—often arising from the fact that many of these components may be manufactured as a whole, such that the physical boundaries of one overlap (or conflate) with the boundaries of the other. For example, in a three-dimensional printed propeller of the invention, it may be difficult (or even possible) to discern where a blade or attachment means ends, and where a pressure modifying element begins. In fact, elements of the invention may transition gradually or be continuous.

In addition, specific dimensions and measurements are intended as examples, and actual dimensions and measurements associated with a particular embodiment of the invention may be larger or smaller than any dimensions or measurements specified herein, and may be defined and described using other conventions or in other ways.

Any descriptions of a flow of a fluid relative to an embodiment of a propeller of the invention, or an embodiment of a PME of the invention, are also not intended to be limiting. For example, if a fluid flow (e.g., during rotation of a propeller) may be described as increasing the fluid pressure in a space on one side of a plane of rotation, this does not limit the possibility that fluid pressure changes in other ways in other spaces relative to the plane of rotation. For example, the fluid pressure may also increase in other spaces, including in a space on the other side of a plane of rotation. Also, as used herein and relative to some embodiments, a "plane of rotation" may be generalized to mean a region or zone that separates two spaces (e.g., a first space above the plane of rotation, and a second space below the plane of rotation). Related to this, while it may be stated and true that a fluid pressure increases in a space at one side of a plane of rotation, the fluid pressure may be unstable in proximity to such a plane of rotation. The concept of a pressure differential (e.g., to one side and the other side of a plane of rotation) relates to the physics of lift, wherein an object, such as a wing or blade, is affected by a fluid pressure difference at different (e.g., generally opposite) sides of such object. Fluid flow and pressure differences may also move an object, such as a propeller used to power a generator.

It is to be understood that although the invention is described herein in terms of particular embodiments, the foregoing embodiments are provided as illustrative only, and do not limit or define the scope of the invention. Many variations and modifications of the described embodiments are possible and anticipated by the present invention. These include, but are not limited to, variations and modifications relating to: propeller design, blade design, hub design, pressure modifying element design, pressure modifying element configuration, blade configuration, blade-to-pressure modifying element attachment means, materials of manufacture, methods of manufacture, methods of operation, modes of operation, airfoil characteristics, sizes and shapes of various elements, aerodynamic profiles, applications, uses, benefits, engines and drivers, aesthetic features, and more.

We claim:

1. A propeller assembly, comprising:
   a hub having an axis;
   a plurality of blades extending radially from the hub;
   a pressure modifying structure positioned generally at a distal end of at least one of the plurality of blades, said pressure modifying structure comprising a twist, with said twist progressing in a single direction along the length of the pressure modifying structure and having at least one pressure modifying structure chord angle perpendicular to the hub axis; and
   wherein said pressure modifying structure being positioned at a substantially consistent radial distance from the hub axis along the length of the pressure modifying structure.

2. The propeller assembly of claim 1, wherein said pressure modifying structure is continuous without segments or interruptions.

3. The propeller assembly of claim 1, wherein the pressure modifying structure is positioned on a substantially common plane.

4. The propeller assembly of claim 3, wherein the substantially common plane is perpendicular to the axis of the hub.

5. The propeller assembly of claim 1, wherein the pressure modifying structure comprises a plurality of uninterrupted segments.

6. The propeller assembly of claim 5, wherein the uninterrupted segments of the pressure modifying structure are not continuously twisted.

7. The propeller assembly of claim 5, wherein the uninterrupted segments of the pressure modifying structure include a substantially continuous twist.

8. The propeller assembly of claim 1, wherein the pressure modifying structure comprises a plurality of interrupted segments.

9. The propeller assembly of claim 8, wherein the plurality of interrupted segments comprise a generally continuous twist.

10. The propeller assembly of claim 8, wherein each interrupted segment of the pressure modifying structure is positioned at the distal end of a separate blade.

11. The propeller assembly of claim 1, wherein the pressure modifying structure comprises a plurality of structures arranged concentrically about the hub axis.

12. The propeller assembly of claim 11, wherein the plurality of concentric structures comprise a different twist from one another.

13. The propeller assembly of claim 1, wherein the direction of the twist of the pressure modifying structure is clockwise or counterclockwise.

14. The propeller assembly of claim 1, wherein the twist of the pressure modifying structure comprises at least 150-degrees along the length of the pressure modifying structure.

15. The propeller assembly of claim 1, wherein the twist of the pressure modifying structure comprises at least 300-degrees along the length of the pressure modifying structure.

16. The propeller assembly of claim 1, wherein the twist of the pressure modifying structure comprises at least 650-degrees along the length of the pressure modifying structure.

17. The propeller assembly of claim 1, wherein the twist of the pressure modifying structure comprises a substantially constant rate of change along the length of the structure.

18. The propeller assembly of claim 1, wherein the twist of the pressure modifying structure comprises a substantially variable rate of change along the length of the structure.

19. The propeller assembly of claim 1, wherein the pressure modifying structure comprises an endless member.

20. The propeller assembly of claim 1, wherein the plurality of blades comprises at least three radial blades.

* * * * *